United States Patent
McWilliams et al.

(10) Patent No.: US 10,011,758 B2
(45) Date of Patent: Jul. 3, 2018

(54) ALIPHATIC POLYCARBONATE-BASED SURFACE ACTIVE AGENTS

(71) Applicants: Sasol Chemicals (USA) LLC, Houston, TX (US); Novomer, Inc., Ithaca, NY (US)

(72) Inventors: Kurt McWilliams, Westlake, LA (US); Daniel T. Plummer, Westlake, LA (US); Kip D. Sharp, Westlake, LA (US); Scott D. Allen, Ithaca, NY (US); Christopher Simoneau, Ithaca, NY (US)

(73) Assignees: Sasol Chemicals (USA) LLC, Houston, TX (US); Novomer, Inc., Ithaca, NY (US)

(*) Notice: Subject to any disclaimer, the term of this patent is extended or adjusted under 35 U.S.C. 154(b) by 72 days.

(21) Appl. No.: 14/912,636

(22) PCT Filed: Aug. 26, 2014

(86) PCT No.: PCT/US2014/052684
§ 371 (c)(1),
(2) Date: Feb. 18, 2016

(87) PCT Pub. No.: WO2015/031348
PCT Pub. Date: Mar. 5, 2015

(65) Prior Publication Data
US 2016/0200962 A1     Jul. 14, 2016

Related U.S. Application Data

(60) Provisional application No. 61/869,964, filed on Aug. 26, 2013.

(51) Int. Cl.
| | |
|---|---|
| *C09K 8/584* | (2006.01) |
| *C09K 8/594* | (2006.01) |
| *C08G 64/34* | (2006.01) |
| *C08G 64/02* | (2006.01) |

(52) U.S. Cl.
CPC ........ *C09K 8/584* (2013.01); *C08G 64/0208* (2013.01); *C08G 64/34* (2013.01); *C09K 8/594* (2013.01); *Y02P 20/544* (2015.11)

(58) Field of Classification Search
CPC .... C08G 64/0208; C08G 64/34; C09K 8/584; C09K 8/594; Y02P 20/544
See application file for complete search history.

(56) References Cited

U.S. PATENT DOCUMENTS

| | | | |
|---|---|---|---|
| 4,876,018 A | 10/1989 | Karydas | |
| 4,891,049 A | 1/1990 | Dillon | |
| 4,895,970 A | 1/1990 | Harris | |
| 4,904,279 A | 2/1990 | Kanne | |
| 4,921,619 A | 5/1990 | Karydas | |
| 5,789,505 A | 8/1998 | Wilkinson | |
| 8,247,520 B2 * | 8/2012 | Allen | C08G 64/0208 528/196 |
| 2003/0220204 A1 | 11/2003 | Wilkinson | |
| 2010/0256329 A1 | 10/2010 | Nozaki | |
| 2011/0218127 A1 | 9/2011 | Allen et al. | |
| 2011/0230580 A1 | 9/2011 | Allen | |
| 2012/0226016 A1 | 9/2012 | Lee | |

FOREIGN PATENT DOCUMENTS

| | | |
|---|---|---|
| WO | WO2000/35998 | 6/2000 |
| WO | WO2010/062703 | 6/2010 |

* cited by examiner

*Primary Examiner* — Frances Tischler
(74) *Attorney, Agent, or Firm* — Bushman Werner, P.C.

(57) ABSTRACT

The present invention encompasses surface active agents useful in liquid or supercritical $CO_2$ applications. The surface active agents comprise compounds containing a hydrocarbon segment and an aliphatic polycarbonate segment: The invention also provides methods of making the surface active agents and of using them in supercritical $CO_2$ applications.

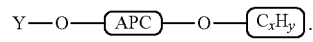

16 Claims, No Drawings

ALIPHATIC POLYCARBONATE-BASED SURFACE ACTIVE AGENTS

CROSS REFERENCE TO RELATED APPLICATION

This application is a U.S. national phase of PCT/US2014/052684 filed Aug. 26, 2014, which claims priority to U.S. Application No. 61/869,964 filed on Aug. 26, 2013 the disclosures of which are incorporated herein by reference for all purposes.

FIELD OF THE INVENTION

This invention pertains to surface active agents useful in liquid or supercritical $CO_2$ applications. The surface active agents comprise compounds containing a hydrocarbon segment and an aliphatic polycarbonate segment.

BACKGROUND OF THE INVENTION

The utilization of carbon dioxide as a useful material rather than a waste product has been of increasing interest in recent years. For example supercritical carbon dioxide (sc-$CO_2$) has been used in place of organic solvents for applications such as dry cleaning of clothes and high pressure liquid chromatography. The displacement of petroleum-based solvents has environmental benefits in itself and these are further enhanced if the $CO_2$ is obtained from a source that would otherwise release it as an atmospheric pollutant.

Another large application for $CO_2$ is as a flooding agent to obtain additional production from spent oil wells. It is estimated that several billion standard cubic feet of $CO_2$ are injected into U.S. oilfields each day with a concomitant recovery of several hundred thousand barrels of oil. It has been known for many years that if the viscosity of the $CO_2$ could be increased, the efficiency of the oil recovery would be greatly enhanced since it would reduce fingering and poor volumetric sweep efficiency. To this end, a great deal of resources have been spent researching the use of surfactants to increase the viscosity (thicken) of high pressure $CO_2$. Carbon dioxide foam floods are typically conducted via the alternate injection of aqueous surfactant solution slugs and pure $CO_2$ (SAG). The idea of adding surfactant to $CO_2$ for performance and/or mobility control was suggested decades ago and to this end there have been recent developments in the identification and design of $CO_2$ soluble surfactants that generate foams.

As is well known to those skilled in the art, oil bearing formations initially contain brine and years of enhanced recovery techniques, including water flooding have added additional fluids. This has necessitated the use of alternating slugs. For surfactants to be effective in downhole environments, the appropriate balance $CO_2$-philicity and hydrophilicity must be maintained. Maintaining this balance has proved difficult for existing surfactant technologies. Furthermore, this type of molecule is not readily soluble in $CO_2$ and must be injected into the formation in the brine phase.

The prior art comprises patents and patent applications issued on polycarbonates as surfactants, which generally teach that there needs to be a hydrophobic section and a hydrophilic section using a standard surfactant model which of course would mean that the surfactant is water soluble and/or miscible. In order to accomplish this result, the surfactant polycarbonates have polyether or epoxide sections and polycarbonate sections and generally specify that below 15 mol % $CO_2$ incorporation, the materials were hydrophilic and above 15 mol % $CO_2$ incorporation, they were hydrophobic. Based on that, if the molecule were greater than 15 mol % $CO_2$ they would not be surfactants since they would possess negligible hydrophilic character.

There remains a need for a $CO_2$-soluble surfactant which albeit hydrophobic in nature, still possesses surface activity, is readily biodegradable and wherein the surface activity allows the $CO_2$-containing surfactant to wet surfaces which prior art $CO_2$-containing surfactants have been unable to do. This ability to wet surfaces is extremely important in EOR operations employing $CO_2$ floods, foams, etc., since it allows the surfactants/$CO_2$ to extract oil from formations and interstices in the formation otherwise not amenable to extraction because of the inability for those surfaces to be adequately wetted.

There also remains a need for a $CO_2$ soluble surfactant which still possesses surface activity, is readily biodegradable and wherein the surface activity allows the $CO_2$ containing surfactant to predictably form foams in porous media for the purpose of controlling the mobility and improving the sweep efficiency of liquid or supercritical $CO_2$ when such $CO_2$ is injected into geological formations for the purpose of storage or sequestration of the $CO_2$.

Nonetheless, there remain challenges with the use of $CO_2$ in these and other applications. In particular, there are very few surfactants that work well with sc-$CO_2$. Those that have worked well, tend to be expensive and/or have drawbacks because of their potential to contaminate the environment or product streams.

Meanwhile, another strategy being explored for the productive use of $CO_2$ has been as a chemical feedstock for the manufacture of chemicals and polymers. In particular, aliphatic polycarbonates (APCs) manufactured by copolymerization of carbon dioxide and epoxides are emerging as promising materials since the polymers have the potential to replace traditional petrochemical polymers. The incorporation of $CO_2$ which accounts for up to 50% of the polymer masshas environmental benefits. $CO_2$-based polymers have been looked at in the past as $CO_2$-soluble surfactants e.g. (WO/2010/062703), but the approach taken has been to append a hydrophilic moiety such as PEG to the polycarbonate which is expected to act as a $CO_2$-phile. To date none of these materials has been found suitable for commercial application.

SUMMARY OF THE INVENTION

In one aspect, the present invention provides a $CO_2$ soluble surfactant possessing enhanced physical and interfacial tension properties that can overcome the limitations of current surfactants used in $CO_2$.

A further feature of the present invention is the ability to independently tailor the surfactant such that, depending upon the nature of the formation, the $CO_2$-soluble surfactant can be tweaked or adjusted so as to provide maximum oil extraction capability of the $CO_2$ foam in which its dispersed.

In yet another aspect, the present invention provides a surfactant containing $CO_2$-philic head groups ideally useful in $CO_2$ EOR operations.

In still another aspect, the present invention provides a $CO_2$ soluble surfactant having the ability to control mobility and create a piston-like flood, thus increasing the efficiency of $CO_2$ in extracting oil during EOR operations. It should be noted that this has two potential benefits: first, it will increase the efficiency of oil extraction beyond current $CO_2$ EOR efforts by improving the amount of oil extracted per $CO_2$ volume used; second, it will reduce the amount of water required since the surfactant will be delivered in the $CO_2$ phase. Since these surfactants will be added in the $CO_2$ phase, they will be present where the $CO_2$ flows in the formation, improving the extraction of oil in previously untouchable locations. Indeed it is envisioned that the present invention could completely eliminate the need for alternating brine injections and instead utilize the large amounts of brine already present in the pore space of formations.

In another aspect, the present invention provides a $CO_2$-soluble surfactant having the ability to predictably form foams in porous media for the purpose of controlling the mobility and improving the sweep efficiency of liquid or supercritical $CO_2$ when such $CO_2$ is injected into geological formations for the purpose of storage or sequestration of the $CO_2$.

In another aspect, the present invention provides a $CO_2$-soluble surfactant having unique and enhanced interfacial tension properties, exhibiting unusual surface wetting activity and which is biodegradable.

Another aspect of the present invention is the provision of a $CO_2$ soluble surfactant which is non-ionic, thus reducing the likelihood of adsorption on the formation surfaces, effectively reducing the amount of material needed downhole, and reducing the cost of a chemical flood.

Among other things, the present invention encompasses the recognition that aliphatic polycarbonate derivatives comprising a hydrocarbon and an aliphatic polycarbonate chain are effective surface active agents with good $CO_2$ solubility.

In one aspect, the present invention encompasses aliphatic polycarbonate derivatives with utility as surfactants. In certain embodiments, the derivatives have a formula I:

                                                                I where the moiety

comprises an alternating copolymer or co-oligomer of $CO_2$ and one or more epoxides;
the moiety

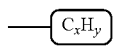

comprises a saturated or unsaturated hydrocarbon; and
—Y is selected from the group consisting of —H, optionally substituted $C_{1-12}$ aliphatic, optionally substituted aryl, optionally substituted $C_{1-12}$ acyl, $SO_2R$, —$SiR_3$, and a polyether chain, where R is, independently at each occurrence, optionally substituted aryl or optionally substituted $C_{1-12}$ aliphatic.

In another aspect, the present invention encompasses surfactant compositions comprising one or more aliphatic polycarbonate derivatives of formula I.

In another aspect, the present invention encompasses methods of making aliphatic polycarbonate derivatives of formula I. In certain embodiments, the methods include the step of copolymerizing or co-oligomerizing $CO_2$ and one or more epoxides in the presence of a chain transfer agent having the formula:

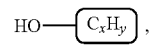

to provide a compound of formula

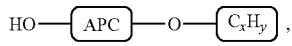

In certain embodiments, the methods comprise a further step of modifying the —OH group of the compound of formula

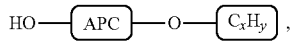

to provide a compound of formula I where —Y is other than —H.

In another aspect, the present invention encompasses methods of modifying the interfacial tension between liquid or supercritical $CO_2$ and an aqueous phase, the method comprising adding an effective amount of a surface active agent of formula I to a mixture of $CO_2$ and the aqueous phase. In certain embodiments, the step of adding the surface active agent of formula I comprises dissolving it in liquid or supercritical $CO_2$ and then mixing the $CO_2$ solution of I with the aqueous phase. In certain embodiments, the methods include adding an effective amount of a surface active agent of formula I to an oil-bearing geological formation. In certain embodiments, the surface active agent is added to the oil-bearing geological formation as part of the process of flooding an oil well with $CO_2$ to recover petroleum.

Definitions

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry, 5$^{th}$* Edition, John Wiley & Sons, Inc., New York, 2001; Larock, *Comprehensive Organic Transformations*, VCH Publishers, Inc., New York, 1989; Carruthers, *Some Modern Methods of Organic Synthesis,* 3$^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the abovementioned compounds per se, this invention also encompasses compositions comprising one or more compounds.

As used herein, the term "isomers" includes any and all geometric isomers and stereoisomers. For example, "isomers" include cis and transisomers, E and Z isomers, R- and Senantiomers, diastereomers, (D)isomers, (L)isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound or polymer is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGrawHill, N.Y., 1962); Wilen, S. H. *Tables of Resolving Agents and Optical Resolutions* p. 268 (E. L. Eliel, Ed., Univ. of Notre Dame Press, Notre Dame, Ind. 1972).

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of substantially alternating units derived from $CO_2$ and an epoxide (e.g., poly(ethylene carbonate). In certain embodiments, a polymer of the present invention is a copolymer, terpolymer, heteropolymer, block copolymer, or tapered heteropolymer incorporating two or more different epoxide monomers. With respect to the structural depiction of such polymers, the convention of showing enchainment of different monomer units or polymer blocks separated by a slash may be used herein:

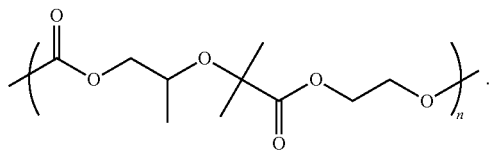

These structures are to be interpreted to encompass aliphatic polycarbonate derivatives incorporating any ratio of the different monomer units depicted unless otherwise specified. This depiction is also meant to represent random, tapered, block co-polymers, and combinations of any two or more of these and all of these are implied unless otherwise specified.

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spirofused polycyclic) and may be completely saturated or may contain one or more units of unsaturation, but which is not aromatic. Unless otherwise specified, aliphatic groups contain 1-40 carbon atoms. In certain embodiments, aliphatic groups contain 1-20 carbon atoms. In certain embodiments, aliphatic groups contain 3-20 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in some embodiments aliphatic groups contain 1-3 carbon atoms, and in some embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated or partially unsaturated groups.

As used herein, the term "bivalent $C_{1-8}$ (or $C_{1-3}$) saturated or unsaturated, straight or branched, hydrocarbon chain", refers to bivalent alkyl, alkenyl, and alkynyl, chains that are straight or branched as defined herein.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 7-membered carbocycle" refers to a 3- to 7-membered saturated or partially unsaturated monocyclic carbocyclic ring. In certain embodiments, the term "3- to 8-membered carbocycle" refers to a 3- to 8-membered saturated or partially unsaturated monocyclic carbocyclic ring. In certain embodiments, the terms "3- to 14-membered carbocycle" and "$C_3$-14 carbocycle" refer to a 3- to 8-membered saturated or partially unsaturated monocyclic carbocyclic ring, or a 7- to 14-membered saturated or partially unsaturated polycyclic carbocyclic ring.

The term "alkyl," as used herein, refers to saturated, straight or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in some embodiments alkyl groups contain 1-3 carbon atoms, and in some embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in some embodiments alkenyl groups contain 2-3 carbon atoms, and in some embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in some embodiments alkynyl groups contain 2-3 carbon atoms, and in some embodiments alkynyl groups contain 2 carbon atoms. Representative alkynyl groups include, but are not limited to, ethynyl, 2-propynyl (propargyl), 1-propynyl, and the like.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl", as used herein, refers to a carbonyl-containing functionality, e.g., —C(=O)R, wherein R is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3 (4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or +NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; $-(CH_2)_{0-4}R^{\circ}$; $-(CH_2)_{0-4}OR^{\circ}$; $-O-(CH_2)_{0-4}C(O)OR^{\circ}$; $-(CH_2)_{0-4}CH(OR^{\circ})_2$; $-(CH_2)_{0-4}SR^{\circ}$; $-(CH_2)_{0-4}Ph$, which may be substituted with $R^{\circ}$; $-(CH_2)_{0-4}O(CH_2)_{0-1}Ph$ which may be substituted with $R^{\circ}$; $-CH=CHPh$, which may be substituted with $R^{\circ}$; $-NO_2$; $-CN$; $-N_3$; $-(CH_2)_{0-4}N(R^{\circ})_2$; $-(CH_2)_{0-4}N(R^{\circ})C(O)R^{\circ}$; $-N(R^{\circ})C(S)R^{\circ}$; $-(CH_2)_{0-4}N(R^{\circ})C(O)NR^{\circ}_2$; $-N(R^{\circ})C(S)NR^{\circ}_2$; $-(CH_2)_{0-4}N(R^{\circ})C(O)OR^{\circ}$; $-N(R^{\circ})N(R^{\circ})C(O)R^{\circ}$; $-N(R^{\circ})N(R^{\circ})C(O)NR^{\circ}_2$; $-N(R^{\circ})N(R^{\circ})C(O)OR^{\circ}$; $-(CH_2)_{0-4}C(O)R^{\circ}$; $-C(S)R^{\circ}$; $-(CH_2)_{0-4}C(O)OR^{\circ}$; $-(CH_2)_{0-4}C(O)N(R^{\circ})_2$; $-(CH_2)_{0-4}C(O)SR^{\circ}$; $-(CH_2)_{0-4}C(O)OSiR^{\circ}_3$; $-(CH_2)_{0-4}OC(O)R^{\circ}$; $-OC(O)(CH_2)_{0-4}SR-$, $SC(S)SR^{\circ}$; $-(CH_2)_{0-4}SC(O)R^{\circ}$; $-(CH_2)_{0-4}C(O)NR^{\circ}_2$; $-C(S)NR^{\circ}_2$; $-C(S)SR^{\circ}$; $-SC(S)SR^{\circ}$, $-(CH_2)_{0-4}OC(O)NR^{\circ}_2$; $-C(O)N(OR^{\circ})R^{\circ}$; $-C(O)C(O)R^{\circ}$; $-C(O)CH_2C(O)R^{\circ}$; $-C(NOR^{\circ})R^{\circ}$; $-(CH_2)_{0-4}SSR^{\circ}$; $-(CH_2)_{0-4}S(O)_2R^{\circ}$; $-(CH_2)_{0-4}S(O)_2OR^{\circ}$; $-(CH_2)_{0-4}OS(O)_2R^{\circ}$; $-S(O)_2NR^{\circ}_2$; $-(CH_2)_{0-4}S(O)R^{\circ}$; $-N(R^{\circ})S(O)_2NR^{\circ}_2$; $-N(R^{\circ})S(O)_2R^{\circ}$; $-N(OR^{\circ})R^{\circ}$; $-C(NH)NR^{\circ}_2$; $-P(O)_2R^{\circ}$; $-P(O)R^{\circ}_2$; $-OP(O)R^{\circ}_2$; $-OP(O)(OR^{\circ})_2$; $SiR^{\circ}_3$; $-(C_{1-4}$ straight or branched alkylene)$O-N(R^{\circ})_2$; or $-(C_{1-4}$ straight or branched alkylene)$C(O)O-N(R^{\circ})_2$, wherein each $R^{\circ}$ may be substituted as defined below and is independently hydrogen, $C_{1-8}$ aliphatic, $-CH_2Ph$, $-O(CH_2)_{0-1}Ph$, or a 5-6-membered saturated, partially unsaturated, or aryl ring having 0-4 heteroatoms independently selected from nitrogen, oxygen, or sulfur, or, notwithstanding the definition above, two independent occurrences of $R^{\circ}$, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on $R^{\circ}$ (or the ring formed by taking two independent occurrences of $R^{\circ}$ together with their intervening atoms), are independently halogen, $-(CH_2)_{0-2}R^{\bullet}$, -(haloR$^{\bullet}$), $-(CH_2)_{0-2}OH$, $-(CH_2)_{0-2}OR^{\bullet}$, $-(CH_2)_{0-2}CH(OR^{\bullet})_2$; $-O(haloR^{\bullet})$, $-CN$, $-N_3$, $-(CH_2)_{0-2}C(O)R^{\bullet}$, $-(CH_2)_{0-2}C(O)OH$, $-(CH_2)_{0-2}C(O)OR^{\bullet}$, $-(CH_2)_{0-4}C(O)N(R^{\circ})_2$; $-(CH_2)_{0-2}SR^{\bullet}$, $-(CH_2)_{0-2}SH$, $-(CH_2)_{0-2}NH_2$, $-(CH_2)_{0-2}NHR^{\bullet}$, $-(CH_2)_{0-2}NR^{\bullet}_2$, $-NO_2$, $-SiR^{\bullet}_3$, $-OSiR^{\bullet}_3$, $-C(O)SR^{\bullet}$, $-(C_{1-4}$ straight or branched alkylene)$C(O)OR^{\bullet}$, or $-SSR^{\bullet}$ wherein each $R^{\bullet}$ is unsubstituted or where preceded by "halo" is substituted only with one or more halogens, and is independently selected from $C_{1-4}$ aliphatic, $-CH_2Ph$, $-O(CH_2)_{0-1}Ph$, or a 5-6-membered saturated, partially unsaturated, or aryl ring having 0-4 heteroatoms independently selected from nitrogen, oxygen, or sulfur. Suitable divalent substituents on a saturated carbon atom of $R^{\circ}$ include $=O$ and $=S$.

Suitable divalent substituents on a saturated carbon atom of an "optionally substituted" group include the following: $=O$, $=S$, $=NNR^*_2$, $=NNHC(O)R^*$, $=NNHC(O)OR^*$, $=NNHS(O)_2R^*$, $=NR^*$, $=NOR^*$, $-O(C(R^*_2))_{2-3}O-$, or $-S(C(R^*_2))_{2-3}S-$, wherein each independent occurrence of $R^*$ is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R•, -(haloR•), —OH, —OR•, —O(haloR•), —CN, —C(O)OH, —C(O)OR•, —NH$_2$, —NHR•, ing an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

As used herein, the "term head-to-tail" or "HT", refers to the regiochemistry of adjacent repeating units in a polymer chain. For example, in the context of poly(propylene carbonate) (PPC), the term head-to-tail is based on the three regiochemical possibilities depicted below:

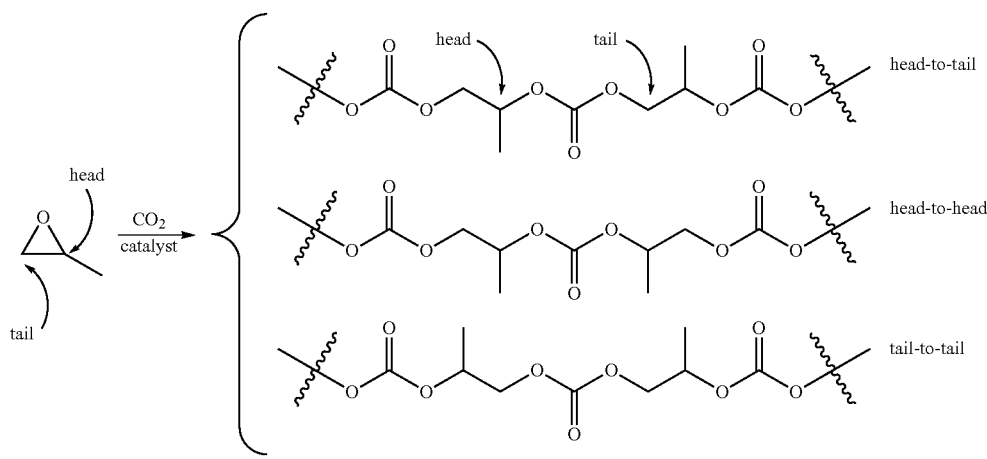

—NR•$_2$, or —NO$_2$, wherein each R• is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R†, —NR†$_2$, —C(O)R†, —C(O)OR†, —C(O)C(O)R†, —C(O)CH$_2$C(O)R†, —S(O)$_2$R†, —S(O)$_2$NR†$_2$, —C(S)NR†$_2$, —C(NH)NR†$_2$, or —N(R†)S(O)$_2$R†; wherein each R† is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R†, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R† are independently halogen, —R•, -(haloR•), —OH, —OR•, —O(haloR•), —CN, —C(O)OH, —C(O)OR•, —NH$_2$, —NHR•, —NR•$_2$, or —NO$_2$, wherein each R• is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

When substituents are described herein, the term "radical" or "optionally substituted radical" is sometimes used. In this context, "radical" means a moiety or functional group hav- The term head-to-tail ratio (H:T) refers to the proportion of head-to-tail linkages to the sum of all other regiochemical possibilities. With respect to the depiction of polymer structures, while a specific regiochemical orientation of monomer units may be shown in the representations of polymer structures herein, this is not intended to limit the polymer structures to the regiochemical arrangement shown but is to be interpreted to encompass all regiochemical arrangements including that depicted, the opposite regiochemistry, random mixtures, isotactic materials, syndiotactic materials, racemic materials, and/or enantioenriched materials and combinations of any of these unless otherwise specified.

As used herein the term "alkoxylated" means that one or more functional groups on a molecule (usually the functional group is an alcohol, amine, or carboxylic acid, but is not strictly limited to these) has appended to it a hydroxy-terminated alkyl chain. Alkoxylated compounds may comprise a single alkyl group or they may be oligomeric moieties such as hydroxyl-terminated polyethers. Alkoxylated materials can be derived from the parent compounds by treatment of the functional groups with epoxides.

As used herein the term "surface active agent" means any compound that reduces surface tension when dissolved in water or water solutions, or that reduces interfacial tension between two liquids, or between a liquid and a solid, or between a liquid and a gas. There are several categories of surface-active agents, including, but not limited to: detergents, wetting agents, bubble stabilizers, and emulsifiers. All use the same basic chemical mechanism and differ chiefly in the nature of the surfaces involved." *Adapted from Hawley's Condensed Chemical Dictionary*, Richard Lewis ed, 13$^{th}$ edition, 1997, Van Nostrand Reinhold, N.Y.

Unless otherwise specified, "a," "an," "the," and "at least one" are used interchangeably and mean one or more than one.

DETAILED DESCRIPTION OF CERTAIN EMBODIMENTS

I. Aliphatic Polycarbonate Derivatives

In one aspect, the present invention encompasses aliphatic polycarbonate derivatives with utility as surfactants. In certain embodiments, the derivatives have a formula I:

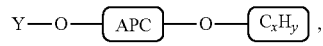

where the moiety

comprises an alternating copolymer of $CO_2$ and one or more epoxides;

the moiety

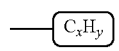

comprises a saturated or unsaturated hydrocarbon; and

—Y is selected from the group consisting of —H, optionally substituted aliphatic, optionally substituted aryl, optionally substituted acyl, $SO_2R$, $SO_3H$, —$SiR_3$, and a polyether chain, where R is, independently at each occurrence, optionally substituted aryl or optionally substituted $C_{1-12}$ aliphatic.

a. Description of the APC Segment

In certain embodiments, the moiety

in the aliphatic polycarbonate derivatives of the invention comprises repeating units having a structure:

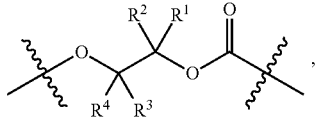

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with any intervening atoms to form one or more optionally substituted rings optionally containing one or more heteroatoms.

In certain embodiments, the moiety

is derived from copolymerization of carbon dioxide with ethylene oxide, propylene oxide, 1,2 butene oxide, 2,3 butene oxide, 1,2 hexene oxide, oxides of higher alpha olefins (e.g. $C_{7-40}$ alpha olefins), butadiene monoepoxide, epichlorohydrin, ethers or esters of glycidol, cyclopentene oxide, cyclohexene oxide, 3 vinyl cyclohexene oxide, 3-ethyl cyclohexene oxide, limonene oxide, or combinations of any two or more of these.

In certain embodiments, the moiety

is derived from propylene oxide. In certain embodiments, the moiety

is derived from propylene oxide and one or more additional epoxides. In certain embodiments, the moiety

is derived from ethylene oxide. In certain embodiments, the moiety

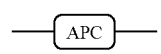

is derived from ethylene oxide and one or more additional epoxides.

In certain embodiments aliphatic polycarbonate derivatives of the invention have a formula P1:

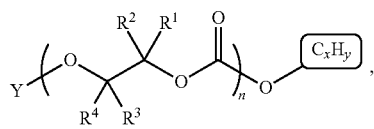

where each of $R^1$, $R^2$, $R^3$, $R^4$, —Y, and

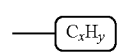

are as defined above and in the classes and n is an integer from about 1 to about 50.

In certain embodiments, aliphatic polycarbonate derivatives of the present invention have a formula P1a:

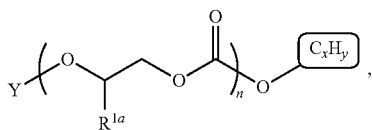

P1a where n, —Y, and

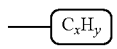

are as defined above and in the classes and subclasses herein; and $R^{1a}$ is, independently at each occurrence in the polymer chain, selected from the group consisting of —H, —$CH_3$, —$CH_2CH_3$, —$CH_2Cl$, —$CH_2OR^x$, —$CH_2OC(O)R^x$, and —$(CH_2)_qCH_3$, where each $R^x$ is independently an optionally substituted moiety selected from the group consisting of $C_{1-20}$ aliphatic, $C_{1-20}$ heteroaliphatic, 3- to 14-membered carbocyclic, 6- to 10-membered aryl, 5- to 10-membered heteroaryl, and 3- to 12-membered heterocyclic, and q is an integer from 2 to 40.

In certain embodiments, where aliphatic polycarbonate derivatives of the present invention have a formula P1a, $R^{1a}$ is —H. In certain embodiments, $R^{1a}$ is —$CH_3$. In certain embodiments, $R^{1a}$ is —$CH_2CH_3$. In certain embodiments, $R^{1a}$ is a mixture of —H and —$CH_3$. In certain embodiments, $R^{1a}$ is a mixture of H and —$CH_2CH_3$. In certain embodiments, $R^a$ is a mixture of H and —$CH_2Cl$. In certain embodiments, $R^{1a}$ is a mixture of —$CH_3$ and —$CH_2CH_3$. In certain embodiments, $R^{1a}$ is a mixture of —$CH_3$ and —$CH_2Cl$. In certain embodiments, $R^{1a}$ is —$CH_2OR^x$. In certain embodiments, $R^{1a}$ is a mixture of —$CH_3$ and —$CH_2OR^x$. In certain embodiments, $R^{1a}$ is a mixture of —H and —$CH_2OR^x$. In certain embodiments, $R^{1a}$ is —$CH_2OC(O)R^x$. In certain embodiments, $R^{1a}$ is a mixture of —$CH_3$ and —$CH_2OC(O)R^x$. In certain embodiments, $R^{1a}$ is a mixture of —H and —$CH_2OC(O)R^x$.

In certain embodiments for compounds of formulae P1 or P1a, n is an integer from 1 to about 50. In certain embodiments, n is not 1. For convenience, compositions of the present invention can be divided into a several categories based on the size of the APC segment and the character of the hydrocarbon moiety. In certain embodiments, compounds of the present invention comprise an APC segment that has a relatively low number of repeat units (e.g. the APC chains have an average of about 1 to about 10 repeat units) hereinafter such compounds are denoted as belonging to Category 1. For example, for a compound in Category 1, where the APC segment comprises poly(propylene carbonate) (PPC), the APC segment would have an average molecular weight in the range of about 100 g/mol (n~1) to about 1,000 g/mol (n~10). It will of course be understood that the molecular weight range will be different for other APCs (e.g. lower for poly(ethylene carbonate) and higher for other poly(hexene oxide). In certain embodiments, for compounds of Category 1, n is an integer from 2 to about 5. In certain embodiments, n is an integer from 3 to about 6. In certain embodiments, n is an integer from 5 to about 10. In certain embodiments, n is, on average in a composition comprising compounds of formulae P1 or P1a, about 2, about 3, about 4, or about 5. In certain embodiments, n is, on average in a composition comprising compounds of formulae P1 or P1a, between about 3 and about 5, between about 5 and about 8, or between about 7 and about 10.

In certain embodiments, compounds of the present invention comprise an APC segment that has between about 10 and about 30 repeat units. Hereinafter such compounds are denoted as belonging to Category 2. Where the compounds incorporate PPC as the APC segment, such materials contain PPC chains with average molecular weights in the range from about 1,000 g/mol to about 3,100 g/mol. In certain embodiments, n is an integer from 10 to about 15. In certain embodiments, n is an integer from 15 to about 20. In certain embodiments, n is an integer from 20 to about 30. In certain embodiments, n is, on average in a composition comprising compounds of formulae P1 or P1a, about 10, about 15, about 20, about 25, or about 30.

In certain embodiments, compounds of the present invention comprise an APC segment that has a number of repeat units between about 30 and about 50. Hereinafter such compounds are denoted as belonging to Category 3. Where the compounds incorporate PPC as the APC segment, such materials contain PPC chains with average molecular weights in the range from about 3,100 g/mol to about 5,100 g/mol. In certain embodiments, n is an integer from 30 to about 40. In certain embodiments, n is an integer from 40 to about 50. In certain embodiments, n is, on average in a composition comprising compounds of formulae P1 or P1a, about 30, about 40, or about 50.

In certain embodiments, compositions of formulae P1, or P1a are further characterized by how highly alternating the APC chains are. During copolymerization of epoxides with $CO_2$ certain catalysts and polymerization conditions lead to the sequential incorporation of two or more epoxides without an interceding carbon dioxide molecule. This results in ether linkages in the polymer chain. There exists a continuum from pure polycarbonates with perfectly alternating structures through polyether-polycarbonates containing proportions of ether and carbonate linkages to pure polyethers where no $CO_2$ is incorporated.

In certain embodiments, compositions of the present invention contain highly alternating APC segments. Without being bound by theory or thereby limiting the scope of the invention, it is believed that highly alternating epoxide $CO_2$ oligomers impart enhanced $CO_2$ solubility to compounds of the invention. In certain embodiments, compounds of the present invention comprise APC chains containing greater than 90% carbonate linkages and less than 10% ether linkages. In certain embodiments, such compositions comprise APC chains containing greater than 92%, greater than 93%, greater than 94%, greater than 95%, greater than 96%, greater than 97%, greater than 98%, greater than 99%, or greater than 99.5% carbonate linkages. In certain embodiments, the compositions comprise APC chains with essentially no ether linkages. In certain embodiments, the compositions comprise APC chains with no detectable ether linkages (e.g. as determined by $^1H$ or $^{13}C$ NMR spectroscopy).

In certain embodiments, compounds of the present invention contain APC segments containing ether linkages. In certain embodiments, such compounds comprise APC segments containing between about 40% and about 90% carbonate linkages with the balance comprising ether linkages. In certain embodiments, such compounds comprise APC segments containing between about 50% and about 90% carbonate linkages, between about 50% and about 80% carbonate linkages carbonate linkages, between about 60% and about 80% carbonate linkages, between about 40% and about 60% carbonate linkages, or between about 80% and about 90% carbonate linkages.

In certain embodiments, compositions of the present invention containing compounds of formulae I, P1, or P1a, are further characterized by the distribution of APC chain lengths in the composition. This distribution of chain lengths (and therefore molecular weight) can be assessed by measurement of the polydispersity index (PDI) of the composition. In certain embodiments, compositions of the present invention contain APC segments with a narrow molecular weight distribution. In certain embodiments, the PDI of the composition is less than about 2. In certain embodiments, the PDI is less than about 1.6, less than about 1.4, less than about 1.3, less than about 1.2, or less than about 1.1.

In certain instances, it may be desirable to have a relatively broad PDI. This can be controlled using methods described in U.S. Pat. No. 7,858,729. Therefore, in certain embodiments, compositions of the present invention contain APC segments with a relatively broad molecular weight distribution. In certain embodiments, the PDI is between about 2 and about 8. In certain embodiments, the PDI is between about 2 and about 5, between about 2 and about 4, between about 2 and about 3, or between about 3 and about 5.

b. Description of the Hydrocarbon Moiety

In its broadest embodiment, the moiety

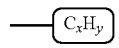

comprises a saturated or unsaturated hydrocarbon containing between 2 and about 40 carbon atoms. Compositions of the present invention contain hydrocarbon moieties

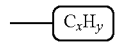

that can be regarded as falling into at least two categories: a first category encompasses saturated hydrocarbons; a second category encompasses hydrocarbon moieties with one or more sites of unsaturation; additional distinctions can be made based on whether the hydrocarbons are linear or branched.

In certain embodiments, aliphatic polycarbonate derivatives of the present invention contain a moiety

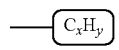

that is a saturated hydrocarbon. In certain embodiments, for materials of formulae I, P1, and P1a, the moiety

comprises a saturated $C_4$ to $C_{40}$ aliphatic group. In certain embodiments, for materials of formulae I, P1, and P1a, the moiety

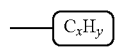

comprises a straight-chain saturated $C_4$ to $C_{40}$ aliphatic group.

A readily available source of the hydrocarbon moiety,

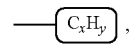

is a monohydric alcohol, be it aliphatic or aromatic. These moieties can be derived from natural, synthetic sources or combinations of both.

A non-limiting source of aliphatic alcohols suitable for use to provide the hydrocarbon moiety of surface active agents of the present invention is via Fischer Tropsch (FT) processes. Aliphatic alcohols containing from about 3 to more than 30 carbon atoms are obtained commercially by FT processes for example, as direct products of the FT process, or by conversion of FT olefins to alcohols through such processes as hydroformylation (oxo process). Such alcohols, either singly or as mixtures, can be used to provide the hydrocarbon moiety of the surface active agents of the present invention. Other non-limiting examples of aliphatic alcohols suitable for use are those prepared via hydroformylation (oxo process) of olefins, oxidation of aluminum alkyls (Ziegler process), hydrogenation of methyl or wax esters, dimerization of aldehydes (aldol process), fermentation of simple or complex carbohydrates by yeast or bacteria, or olefin metathesis conversions of unsaturated compounds.

In certain embodiments, where for compounds of formulae I, P1, and P1a,

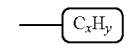

comprises a straight-chain aliphatic group, such aliphatic groups comprise 6 to 40 carbon atoms. In certain embodiments,

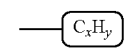

comprises a $C_{7-12}$ straight-chain saturated aliphatic group. In certain embodiments,

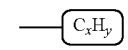

comprises a $C_{10-14}$ straight-chain saturated aliphatic group. In certain embodiments,

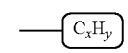

comprises a $C_{12-16}$ straight-chain saturated aliphatic group. In certain embodiments,

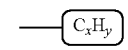

comprises a $C_{16-20}$ straight-chain saturated aliphatic group. In certain embodiments,

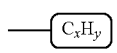

comprises a $C_{20-24}$ straight-chain saturated aliphatic group, a $C_{24-28}$ straight-chain saturated aliphatic group, a $C_{28-36}$ straight-chain saturated aliphatic group, or a $C_{36-40}$ straight-chain saturated aliphatic group.

In certain embodiments, for compounds of formulae I, P1, and P1a,

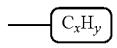

comprises a straight chain moiety derived from an alcohol in Table 1.

TABLE 1

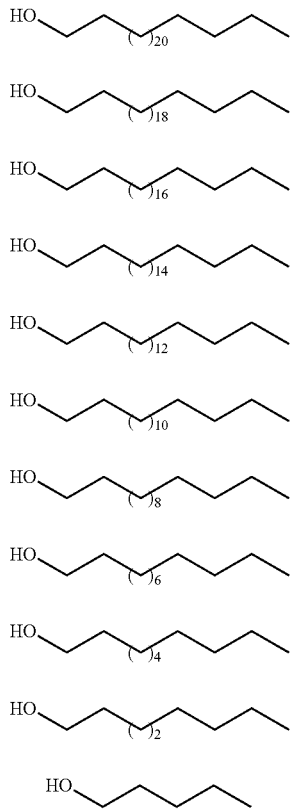

To avoid ambiguity, it is to be understood that if one of the alcohols described herein is the source of the hydrocarbon moiety in a surface active agent of the present invention, then for compounds of formula I, the hydrocarbon portion of the alcohol will become the

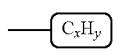

moiety and the —OH group of the alcohol will be replaced by the group

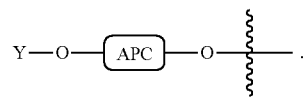

Thus if the alcohol were

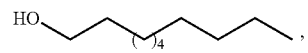

the corresponding compound of formula I would have a formula:

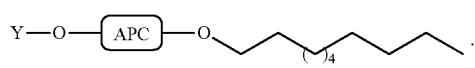

In embodiments where

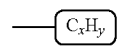

comprises a saturated straight aliphatic chain, suitable chains include, but are not limited to those corresponding to common saturated fatty acids. Fatty acids, some of which are abundant and inexpensive feedstocks, can be reduced to provide primary aliphatic alcohols (e.g. by hydride reduction). For example, caprylic acid ($CH_3(CH_2)_6CO_2H$) can be reduced to capryl alcohol $CH_3(CH_2)_7OH$. In certain embodiments suitable chains for compounds conforming to formula P1 include, but are not limited to those shown in Table 1a:

TABLE 1a

| Examples of Saturated Fatty Acids | |
|---|---|
| Common name of fatty acid | Hydrocarbon moiety |
| Caprylic acid | $CH_3(CH_2)_7-$ |
| Capric acid | $CH_3(CH_2)_9-$ |
| Lauric acid | $CH_3(CH_2)_{11}-$ |
| Myristic acid | $CH_3(CH_2)_{13}-$ |
| Palmitic acid | $CH_3(CH_2)_{15}-$ |
| Stearic acid | $CH_3(CH_2)_{17}-$ |
| rachidic acid | $CH_3(CH_2)_{19}-$ |
| Behenic acid | $CH_3(CH_2)_{21}-$ |
| Lignoceric acid | $CH_3(CH_2)_{23}-$ |
| Cerotic acid | $CH_3(CH_2)_{25}-$ |

In certain embodiments, for compounds of formulae I, P1, and P1a,

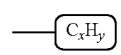

comprises a branched saturated aliphatic group. In certain embodiments, such aliphatic groups contain from 4 to about 40 carbon atoms. In certain embodiments,

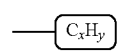

comprises a $C_{4-6}$ branched-chain saturated aliphatic group. In certain embodiments,

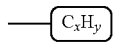

comprises a $C_{7-12}$ branched-chain saturated aliphatic group. In certain embodiments,

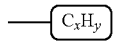

comprises a $C_{12-16}$ branched-chain saturated aliphatic group. In certain embodiments,

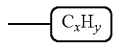

comprises a $C_{16-20}$ branched-chain saturated aliphatic group. In certain embodiments,

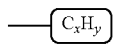

comprises a $C_{20-24}$ branched-chain saturated aliphatic group, a $C_{24-28}$ branched-chain saturated aliphatic group, a $C_{28-36}$ branched-chain saturated aliphatic group, or a $C_{36-40}$ branched-chain aliphatic group. In certain embodiments,

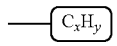

comprises a saturated aliphatic group with a branch present at the site of attachment of the

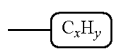

moiety to the aliphatic polycarbonate moiety. In certain other embodiments, the point of attachment of the

moiety to the aliphatic polycarbonate moiety is not a point of branching.

In certain embodiments where

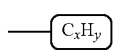

comprises a saturated aliphatic group with a branch present at a site other than the site of attachment to the polycarbonate moiety, the

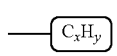

moiety comprises a $C_{3-40}$ straight carbon chain with one or more alkyl substituents. In certain embodiments, the

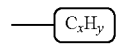

moiety comprises a $C_{4-40}$ straight carbon chain with 1-12 alkyl substituents. In certain embodiments, the

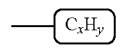

moiety comprises a $C_{4-40}$ straight carbon chain with 1-12 alkyl substituents, where each alkyl substituent is independently a $C_{1-12}$ straight or branched alkyl. In certain embodiments, the

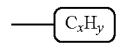

moiety comprises a $C_{4-20}$ straight carbon chain with 1-6 alkyl substituents, where each alkyl substituent is independently a $C_{1-4}$ straight or branched alkyl. In certain embodiments, the

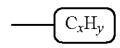

moiety comprises a $C_{6-12}$ straight carbon chain with 1-4 alkyl substituents, where each alkyl substituent is independently a $C_{1-4}$ straight or branched alkyl. In certain embodiments, the

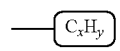

moiety comprises a $C_{4-20}$ straight carbon chain with 1-6 alkyl substituents, where each alkyl substituent is independently a methyl or ethyl group.

In certain embodiments where

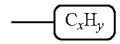

comprises a saturated aliphatic group with a branch present at a site other than the site of attachment to the polycarbonate moiety, it comprises a moiety selected from the group consisting of: sec-butyl, 2-methylbutyl, 3-methylbutyl, 2-methylpentyl, 3-methylpentyl, 4-methylpentyl, 2-methylhexyl, 3-methylhexyl, 4-methylhexyl, 5-methylhexyl, 2-methylheptyl, 3-methylheptyl, 4-methylheptyl, 5-methylheptyl, 6-methylheptyl, 2-methyloctyl, 3-methyloctyl, 4-methyloctyl, 5-methyloctyl, 6-methyloctyl, 7-methyloctyl, 2-methylnonyl, 3-methylnonyl, 4-methylnonyl, 5-methylnonyl, 6-methylnonyl, 7-methylnonyl, 8-methylnonyl, 2-methyldecyl, 3-methyldecyl, 4-methyldecyl, 5-methyldecyl, 6-methyldecyl, 7-methyldecyl, 8-methyldecyl, 9-methyldecyl, 2-methylundecyl, 3-methylundecyl, 4-methylundecyl, 5-methylundecyl, 6-methylundecyl, 7-methylundecyl, 8-methylundecyl, 9-methylundecyl, 10-methylundecyl, 2-methyldodecyl, 3-methyldodecyl, 4-methyldodecyl, 5-methyldodecyl, 6-methyldodecyl, 7-methyldodecyl, 8-methyldodecyl, 9-methyldodecyl, 10-methyldodecyl, 11-methyldodecyl, 2-ethylbutyl, 2-ethylpentyl, 3-ethylpentyl, 2-ethylhexyl, 3-ethylhexyl, 4-ethylhexyl, 2-ethylheptyl, 3-ethylheptyl, 4-ethylheptyl, 5-ethylheptyl, 2-ethyloctyl, 3-ethyloctyl, 4-ethyloctyl, 5-ethyloctyl, 6-ethyloctyl, 2-ethylnonyl, 3-ethylnonyl, 4-ethylnonyl, 5-ethylnonyl, 6-ethylnonyl, 7-ethylnonyl, 2-ethyldecyl, 3-ethyldecyl, 4-ethyldecyl, 5-ethyldecyl, 6-ethyldecyl, 7-ethyldecyl, 8-ethyldecyl, 2-ethylundecyl, 3-ethylundecyl, 4-ethylundecyl, 5-ethylundecyl, 6-ethylundecyl, 7-ethylundecyl, 8-ethylundecyl, 9-ethylundecyl, 2-ethyldodecyl, 3-ethyldodecyl, 4-ethyldodecyl, 5-ethyldodecyl, 6-ethyldodecyl, 7-ethyldodecyl, 8-ethyldodecyl, 9-ethyldodecyl, 10-ethyldodecyl, and combinations of any two or more of these.

For avoidance of doubt with respect to interpretation of chemical structures, where a

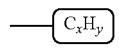

moiety is selected from the group above, the point of connection to the APC moiety is to be interpreted as C-1. Therefore, if

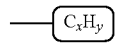

in a compound of formula P1 were chosen from the group above to be 5-methylheptyl, then the compound would have a structure:

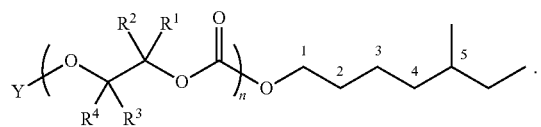

In certain embodiments where

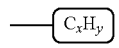

comprises a saturated aliphatic group with a branch present at a site other than the site of attachment to the polycarbonate moiety,

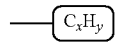

comprises a moiety selected from the group consisting of: a $C_5$ straight chain alkyl having two substituents independently selected from $C_{1-4}$ straight or branched alkyl; a $C_6$ straight chain alkyl having 2-3 substituents independently selected from $C_{1-4}$ straight or branched alkyl; a $C_7$ straight chain alkyl having 2-3 substituents independently selected from $C_{1-4}$ straight or branched alkyl; a $C_8$ straight chain alkyl having 2-4 substituents independently selected from $C_{1-4}$ straight or branched alkyl; a $C_6$ straight chain alkyl having 2-4 substituents independently selected from $C_{1-4}$ straight or branched alkyl; a $C_{10}$ straight chain alkyl having 2-4 substituents independently selected from $C_{1-4}$ straight or branched alkyl; a $C_{11-12}$ straight chain alkyl having 2-4 substituents independently selected from $C_{1-4}$ straight or branched alkyl; a $C_{12-16}$ straight chain alkyl having 2-5 substituents independently selected from $C_{1-4}$ straight or branched alkyl; a $C_{16-20}$ straight chain alkyl having 2-6 substituents independently selected from $C_{1-4}$ straight or branched alkyl; and a $C_{20-40}$ straight chain alkyl having 2-12 substituents independently selected from $C_{1-4}$ straight or branched alkyl.

In certain embodiments, the moiety

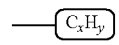

is derived from a branched fatty alcohol. Commercially available materials that are particularly suitable for use as the branched fatty alcohol include the following materials alone or in combination: Isalchem 123, Isofol 28, or Lialchem 123 produced by Sasol Ltd.

In certain embodiments, branched fatty alcohols conform to the structure (II) below where $R^1$ and $R^2$ are each independently $C_6$ to $C_{20}$ linear alkyl chains.

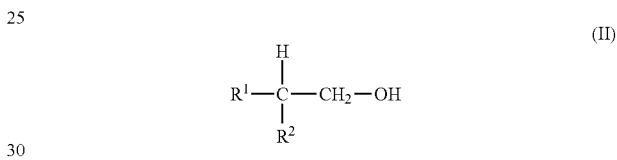

In certain embodiments, where a fatty alcohol conforms to formula (II), $R^1$ and $R^2$ are each independently $C_6$ to $C_{20}$ linear alkyl chains and each contains an even number of carbon atoms. In certain embodiments, where a fatty alcohol conforms to formula (II), $R^1$ and $R^2$ are each independently $C_6$ to $C_{20}$ linear alkyl chains where each contains an even number of carbon atoms. In certain embodiments, where a fatty alcohol conforms to formula (II), $R^1$ and $R^2$ are each independently $C_6$ to $C_{20}$ linear alkyl chains where $R^1$ has two more carbon atoms than $R^2$.

In certain embodiments,

comprises an aliphatic group derived from an alcohol in Table 2a.

TABLE 2a

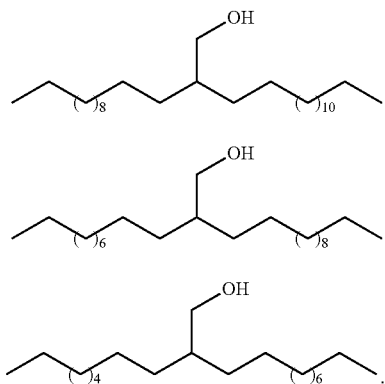

TABLE 2a-continued

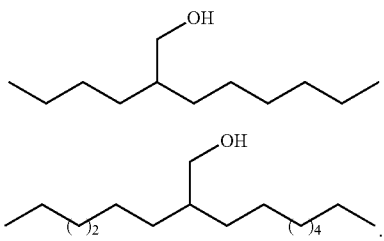

In certain embodiments, the branched fatty alcohol may be a so-called "Guerbet alcohol," i.e., an alcohol that is formed by converting a primary aliphatic alcohol into its β-alkylated dimer alcohol with loss of one equivalent of water via an aldol condensation. This may be particularly suitable for forming branched fatty alcohols from naturally derived fats or oils. One suitable example of a Guerbet alcohol is Isofol 20 (octyl-2-dodecanol) also available from Sasol Ltd. Octyl-2-dodecanol can be expressed using structure (II) for where $R^1$ is n-$C_{10}H_{25}$, and $R^2$ is n-$C_8H_{17}$.

In certain embodiments,

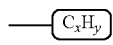

comprises a chain derived from a methyl branched FT alcohol. Suitable methyl branched primary alcohols are available commercially from Sasol Ltd. under the trade names Isalchem®, Lial®, and Alchem®, Marlipal®, and Safol®.

In certain embodiments,

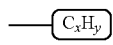

comprises an aliphatic group derived from an alcohol in

TABLE 2b

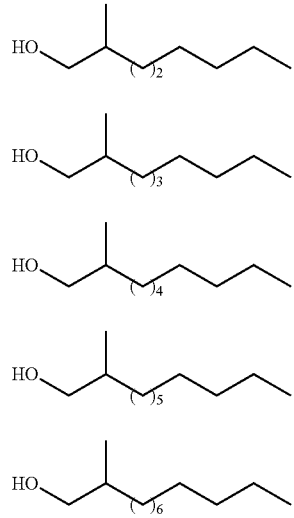

TABLE 2b-continued

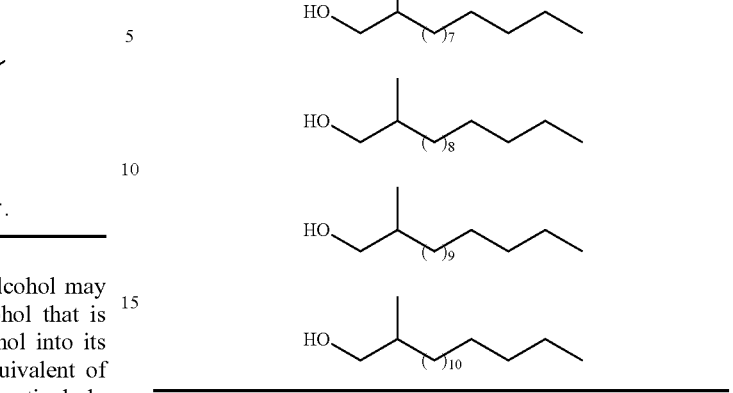

In certain embodiments,

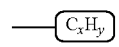

comprises an aliphatic group derived from an alcohol in Table 2c.

TABLE 2c

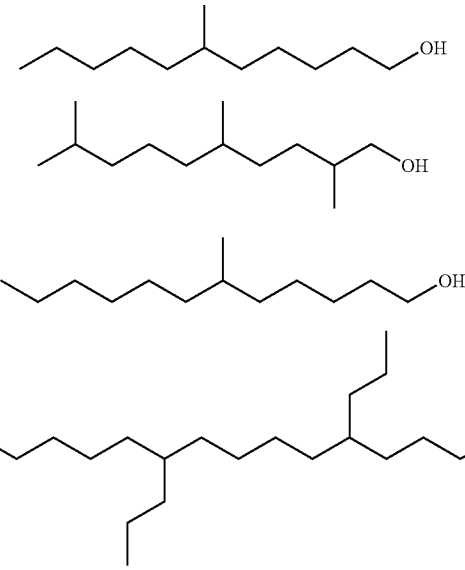

In certain embodiments, the moiety

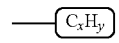

in surface active agents of the present invention is derived from a mixture of FT alcohols and therefore

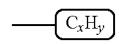

represents a mixture of hydrocarbons. Suitable alcohol mixtures are available commercially and sold by SASOL Ltd. as SAFOL™ 23, SAFOL™ 25, and SAFOL™ 45. These alcohols are derived from the hydroformylation of C11 to C12 olefins, C13 to C14 olefins, or their mixtures respectively obtained from high temperature Fischer-Tropsch reaction.

In certain embodiments, a $C_{12}$ to $C_{13}$ Fischer-Tropsch alcohol (SAFOL™ 23 alcohol) is used as the source of the

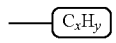

moiety. SAFOL 23 is a primary alcohol and consists of ca. 50% by mass linear alcohol isomers, ca. 30% mono-methyl branched alcohol isomers and ca. 20% by mass by mass of other isomeric alcohols.

In certain embodiments, a

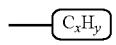

moiety comprises

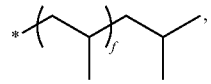

where * represents the site of attachment of the

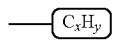

moiety to the polycarbonate moiety, and f is an integer from 1 to 12.

In certain embodiments, a

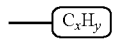

moiety comprise

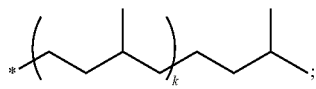

where * represents the site of attachment of the

moiety to the polycarbonate segment, and k is an integer from 1 to 7.

In certain embodiments, a

moiety can be derived from a secondary alcohol. In these cases, a branch point in the hydrocarbon moiety occurs at the site of its attachment to the aliphatic polycarbonate moiety.

In embodiments, where a branch occurs at the site of attachment of the

moiety to the aliphatic polycarbonate moiety, such a compound can conform to formula P2a:

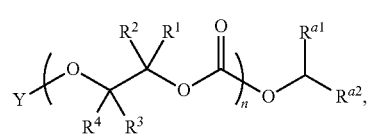

where each of $R^1$, $R^2$, $R^3$, $R^4$, and n is as defined above and in the classes and subclasses herein, and $R^{a1}$ and $R^{a2}$ are each independently a $C_{1-38}$ aliphatic group.

In certain embodiments for compounds conforming to formula P2a, each of $R^{a1}$ and $R^{a2}$ comprises a straight chain saturated aliphatic group. In certain embodiments each of $R^{a1}$ and $R^{a2}$ is independently selected from the group consisting of $C_{1-38}$ aliphatic groups, wherein $R^{a1}$ and $R^{a2}$ taken together with the carbon atom to which they are attached contain more than 4 carbon atoms. In certain embodiments, $R^{a1}$ and $R^{a2}$ together with the carbon atom to which they are attached contain between 4 and 40 carbon atoms. In certain embodiments, $R^{a1}$ and $R^{a2}$ and the carbon atom to which they are attached comprise at least 6, at least 8, at least 10, at least 12, at least 16, at least 20, at least 24, at least 30, at least 34 or at least 38 carbon atoms.

In certain embodiments,

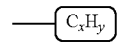

is selected from the group consisting of: 2-butyl, 2-pentyl, 3-pentyl, 2-hexyl, 3-hexyl, 2-heptyl, 3-heptyl, 4-heptyl, 2-octyl, 3-octyl, 4-octyl, 2-nonyl, 3-nonyl, 4-nonyl, 5-nonyl, 2-decyl, 3-decyl, 4-decyl, 5-decyl, 2-undecyl, 3-undecyl, 4-undecyl, 5-undecyl, 6-undecyl, 2-dodecyl, 3-dodecyl, 4-dodecyl, 5-dodecyl, 6-dodecyl, and combinations of any two or more of these.

For avoidance of doubt with respect to interpretation of chemical structures, if

in a compound of formula P2a were chosen from the group above to be 4-heptyl, then the compound would have a structure:

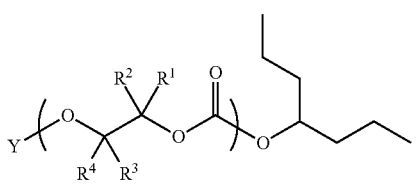

In certain embodiments for compounds conforming to formula P3a, at least one of $R^{a1}$ and $R^{a2}$ comprises one or more branch points. In certain embodiments, one or more of $R^{a1}$ and $R^{a2}$ comprises methyl or ethyl substituents. In certain embodiments, $R^{a1}$ and $R^{a2}$ are independently selected from the group consisting of: methyl, ethyl, propyl, butyl, n-pentyl, n-hexyl, n-heptyl, n-octyl, any $C_{9-38}$ n-alkyl, isopropyl, isobutyl, sec-butyl, 2-methylbutyl, 3-methylbutyl, 2-methylpentyl, 3-methylpentyl, 4-methylpentyl, 2-methylhexyl, 3-methylhexyl, 4-methylhexyl, 5-methylhexyl, 2-methylheptyl, 3-methylheptyl, 4-methylheptyl, 5-methylheptyl, 6-methylheptyl, 2-methyloctyl, 3-methyloctyl, 4-methyloctyl, 5-methyloctyl, 6-methyloctyl, 7-methyloctyl, 2-methylnonyl, 3-methylnonyl, 4-methylnonyl, 5-methylnonyl, 6-methylnonyl, 7-methylnonyl, 8-methylnonyl, 2-methyldecyl, 3-methyldecyl, 4-methyldecyl, 5-methyldecyl, 6-methyldecyl, 7-methyldecyl, 8-methyldecyl, 9-methyldecyl, 2-methylundecyl, 3-methylundecyl, 4-methylundecyl, 5-methylundecyl, 6-methylundecyl, 7-methylundecyl, 8-methylundecyl, 9-methylundecyl, 10-methylundecyl, 2-methyldodecyl, 3-methyldodecyl, 4-methyldodecyl, 5-methyldodecyl, 6-methyldodecyl, 7-methyldodecyl, 8-methyldodecyl, 9-methyldodecyl, 10-methyldodecyl, 11-methyldodecyl, 2-ethylbutyl, 2-ethylpentyl, 3-ethylpentyl, 2-ethylhexyl, 3-ethylhexyl, 4-ethylhexyl, 2-ethylheptyl, 3-ethylheptyl, 4-ethylheptyl, 5-ethylheptyl, 2-ethyloctyl, 3-ethyloctyl, 4-ethyloctyl, 5-ethyloctyl, 6-ethyloctyl, 2-ethylnonyl, 3-ethylnonyl, 4-ethylnonyl, 5-ethylnonyl, 6-ethylnonyl, 7-ethylnonyl, 2-ethyldecyl, 3-ethyldecyl, 4-ethyldecyl, 5-ethyldecyl, 6-ethyldecyl, 7-ethyldecyl, 8-ethyldecyl, 2-ethylundecyl, 3-ethylundecyl, 4-ethylundecyl, 5-ethylundecyl, 6-ethylundecyl, 7-ethylundecyl, 8-ethylundecyl, 9-ethylundecyl, 2-ethyldodecyl, 3-ethyldodecyl, 4-ethyldodecyl, 5-ethyldodecyl, 6-ethyldodecyl, 7-ethyldodecyl, 8-ethyldodecyl, 9-ethyldodecyl, 10-ethyldodecyl, and combinations of any two or more of these; wherein $R^{a1}$ and $R^{a2}$ together with the carbon atom to which they are attached comprise at least 4 carbon atoms. In certain embodiments, $R^{a1}$ and $R^{a2}$ together with the carbon atom to which they are at attached comprise at least 6, at least 8, at least 10, at least 12, at least 16, at least 20, at least 24, at least 30, at least 34 or at least 38 carbon atoms.

For avoidance of doubt with respect to interpretation of chemical structures, in a compound of formula P1 where the

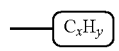

comprises

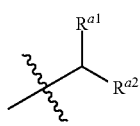

and $R^{a1}$ and $R^{a2}$ are selected from the group above such that $R^{a1}$ is n-butyl and $R^{a2}$ is 3-methylhexyl, then the compound would have a structure:

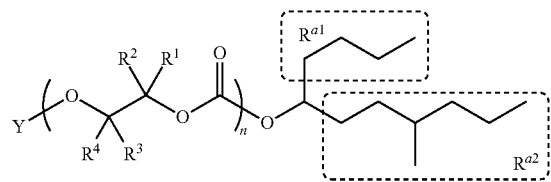

In certain embodiments for compounds conforming to formula P2a, at least one of $R^{a1}$ and $R^{a2}$ is selected from the group consisting of: a $C_5$ straight chain alkyl having 1 or 2 substituents independently selected from $C_1$-4 straight or branched alkyl; a $C_6$ straight chain alkyl having 1-3 substituents independently selected from $C_{1-4}$ straight or branched alkyl; a $C_7$ straight chain alkyl having 1-3 substituents independently selected from $C_{1-4}$ straight or branched alkyl; a $C_8$ straight chain alkyl having 1-4 substituents independently selected from $C_{1-4}$ straight or branched alkyl; a $C_6$ straight chain alkyl having 1-4 substituents independently selected from $C_{1-4}$ straight or branched alkyl; a $C_{10}$ straight chain alkyl having 1-4 substituents independently selected from $C_{1-4}$ straight or branched alkyl; a $C_{11-12}$ straight chain alkyl having 1-4 substituents independently selected from $C_{1-4}$ straight or branched alkyl; a $C_{12-16}$ straight chain alkyl having 1-5 substituents independently selected from $C_1$-4 straight or branched alkyl; a $C_{16-20}$ straight chain alkyl having 1-6 substituents independently selected from $C_{1-4}$ straight or branched alkyl; and a a $C_{20-40}$ straight chain alkyl having 1-12 substituents independently selected from $C_{1-4}$ straight or branched alkyl.

As mentioned above, another category of compounds encompassed by the present invention contains unsaturated hydrocarbon moieties.

In certain embodiments, for compounds of formulae I, P1, and P1a, the moiety

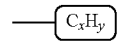

comprises a mono- or multiply-unsaturated aliphatic group containing 4 to 40 carbon atoms. In certain embodiments, for materials of formulae I, P1, and P1a, the moiety

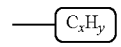

comprises a straight-chain unsaturated $C_4$ to $C_{40}$ aliphatic group. In certain embodiments, the moiety

comprises an unsaturated analog of any of the saturated hydrocarbon moieties described in the previous section. Such unsaturated analogs include those that would be obtained by removing two hydrogen atoms from any pair or pairs of adjacent carbon atoms.

In embodiments, where for compounds of formulae I, P1, and P1a,

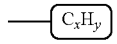

comprises a straight-chain unsaturated aliphatic group, such aliphatic groups contain 6 to 40 carbon atoms and contain 1 to 6 sites of unsaturation. In certain embodiments, In embodiments where

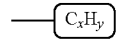

comprises unsaturated straight aliphatic chain, suitable chains include, but are not limited to those corresponding to unsaturated fatty acids. In certain embodiments suitable chains include, but are not limited to those shown in Table 2:

TABLE 2

Examples of Unsaturated Fatty Acids

| Common name of fatty acid | Corresponding Aliphatic Group | $\Delta^x$ |
|---|---|---|
| Myristoleic acid | $CH_3(CH_2)_3CH=CH(CH_2)_7—$ | cis-$\Delta^9$ |
| Palmitoleic acid | $CH_3(CH_2)_5CH=CH(CH_2)_7—$ | cis-$\Delta^9$ |
| Sapienic acid | $CH_3(CH_2)_8CH=CH(CH_2)_4—$ | cis-$\Delta^6$ |
| Oleic acid | $CH_3(CH_2)_7CH=CH(CH_2)_7—$ | cis-$\Delta^9$ |
| Elaidic acid | $CH_3(CH_2)_7CH=CH(CH_2)_7—$ | trans-$\Delta^9$ |
| Vaccenic acid | $CH_3(CH_2)_5CH=CH(CH_2)_9—$ | trans-$\Delta^{11}$ |
| Linoleic acid | $CH_3(CH_2)_4CH=CHCH_2CH=CH(CH_2)_7—$ | cis,cis-$\Delta^9,\Delta^{12}$ |
| Linoelaidic acid | $CH_3(CH_2)_4CH=CHCH_2CH=CH(CH_2)_7—$ | trans,trans-$\Delta^9,\Delta^{12}$ |
| α-Linolenic acid | $CH_3CH_2CH=CHCH_2CH=CHCH_2CH=CH(CH_2)_7—$ | cis,cis,cis-$\Delta^9,\Delta^{12},\Delta^{15}$ |
| Arachidonic acid | $CH_3(CH_2)_4CH=CHCH_2CH=CHCH_2CH=CHCH_2CH=CH(CH_2)_3—$ | cis,cis,cis,cis-$\Delta^5,\Delta^8,\Delta^{11},\Delta^{14}$ |
| Eicosapentaenoic acid | $CH_3CH_2CH=CHCH_2CH=CHCH_2CH=CHCH_2CH=CHCH_2CH=CH(CH_2)_3—$ | cis,cis,cis,cis,cis-$\Delta^5,\Delta^8,\Delta^{11},\Delta^{14},\Delta^{17}$ |
| Erucic acid | $CH_3(CH_2)_7CH=CH(CH_2)_{11}—$ | cis-$\Delta^{13}$ |
| Docosahexaenoic acid | $CH_3CH_2CH=CHCH_2CH=CHCH_2CH=CHCH_2CH=CHCH_2CH=CHCH_2CH=CH(CH_2)_2—$ | cis,cis,cis,cis,cis,cis-$\Delta^4,\Delta^7,\Delta^{10},\Delta^{13},\Delta^{16},\Delta^{19}$ |

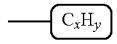

comprises a $C_{7-12}$ straight-chain aliphatic group containing 1 or 2 sites of unsaturation. In certain embodiments,

comprises a $C_{12-16}$ straight-chain aliphatic group containing 1-4 sites of unsaturation. In certain embodiments,

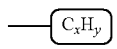

comprises a $C_{16-20}$ straight-chain aliphatic group containing 1-4 sites of unsaturation. In certain embodiments,

comprises a $C_{20-24}$ straight-chain aliphatic group containing 1-4 sites of unsaturation, a $C_{24-28}$ straight-chain aliphatic group containing 1-4 sites of unsaturation, a $C_{28-36}$ straight-chain aliphatic group containing 1-6 sites of unsaturation, or a $C_{36-40}$ straight-chain aliphatic group containing 1-8 sites of unsaturation. In certain embodiments, such groups comprise or are derived from the chain of an unsaturated primary aliphatic alcohol.

In certain embodiments,

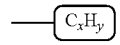

comprises a semi synthetic derivative of a fatty acid. Numerous processes are known in the art for the chemical modification of fatty acid feedstocks, such processes include, but are not limited to: complete or partial hydrogenation, olefin isomerization, olefin metathesis, hydride reduction and the like. Such semisynthetic materials and processes will be readily apprehended by the skilled artisan and can be utilized to make inventive compounds of formulae I, P1, and P1a.

In certain embodiments, a

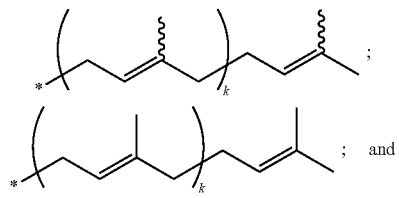

moiety is selected from the group consisting of:

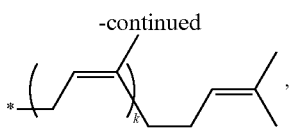

where * represents the site of attachment of the

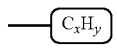

moiety to the polycarbonate moiety, and k is an integer from 0 to 6.

c. Description of the —Y Groups

Having described the APC segments and the hydrocarbon moieties in some detail, we turn now to the —Y group. As shown in Formula I above, the —Y group is attached to the terminal oxygen on the aliphatic polycarbonate segment.

In certain embodiments, —Y is a hydrogen atom and the aliphatic polycarbonate segment is —OH terminated. In other embodiments, —Y is other than —H.

In certain embodiments, —Y comprises a sulfate (e.g. Y=—SO$_3$H, or —SO$_3$M where M is a metal atom or cation), or a sulfonate ester (e.g. Y=—SO$_2$OR, where R is optionally substituted aliphatic or optionally substituted aryl).

In certain embodiments, —Y comprises an ester (e.g. Y=—C(O)OR$^q$, where R$^q$ is optionally substituted aliphatic, optionally substituted aryl, optionally substituted heteroaliphatic, or optionally substituted heteroaryl.

In certain embodiments, —Y comprises a phthalate ester formed from phthalic acid and two equivalents of an alcohol of formula I.

In certain embodiments, —Y comprises an —OH protecting group. By way of non-limiting example, hydroxyl protecting groups include methyl, methoxylmethyl (MOM), methylthiomethyl (MTM), t-butylthiomethyl, (phenyldimethylsilyl)methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethylsilyl)ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a,4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, allyl, p-chlorophenyl, p-methoxyphenyl, 2,4-dinitrophenyl, benzyl, p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2-picolyl N-oxido, diphenylmethyl, p,p'-dinitrobenzhydryl, 5-dibenzosuberyl, triphenylmethyl, a-naphthyldiphenylmethyl, p-methoxyphenyldiphenylmethyl, di(p-methoxyphenyl)phenylmethyl, tri (p-methoxyphenyl)methyl, 4-(4'-bromophenacyloxyphenyl) diphenylmethyl, 4,4',4"-tris(4,5-dichlorophthalimidophenyl)methyl, 4,4',4"-tris(levulinoyloxyphenyl)methyl, 4,4',4"-tris(benzoyloxyphenyl)methyl, 3-(imidazol-1-yl)bis (4',4"-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthryl, 1,3-benzodithiolan-2-yl, benzisothiazolyl S,S-dioxido, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBDMS), t-butyldiphenylsilyl (TBDPS), tribenzylsilyl, tri-p-xylylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), alkyl methyl carbonate, 9-fluorenylmethyl carbonate (Fmoc), alkyl ethyl carbonate, alkyl 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), alkyl isobutyl carbonate, alkyl vinyl carbonate alkyl allyl carbonate, alkyl p-nitrophenyl carbonate, alkyl benzyl carbonate, alkyl p-methoxybenzyl carbonate, alkyl 3,4-dimethoxybenzyl carbonate, alkyl o-nitrobenzyl carbonate, alkyl p-nitrobenzyl carbonate, alkyl S-benzyl thiocarbonate, 4-ethoxy-1-napthhyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1, 3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxycarbonyl)benzoate, a-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts). For protecting 1,2- or 1,3-diols, the protecting groups include methylene acetal, ethylidene acetal, 1-t-butylethylidene ketal, 1-phenylethylidene ketal, (4-methoxyphenyl)ethylidene acetal, 2,2,2-trichloroethylidene acetal, acetonide, cyclopentylidene ketal, cyclohexylidene ketal, cycloheptylidene ketal, benzylidene acetal, p-methoxybenzylidene acetal, 2,4-dimethoxybenzylidene ketal, 3,4-dimethoxybenzylidene acetal, 2-nitrobenzylidene acetal, methoxymethylene acetal, ethoxymethylene acetal, dimethoxymethylene ortho ester, 1-methoxyethylidene ortho ester, 1-ethoxyethylidine ortho ester, 1,2-dimethoxyethylidene ortho ester, a-methoxybenzylidene ortho ester, 1-(N,N-dimethylamino)ethylidene derivative, α-(N,N'-dimethylamino)benzylidene derivative, 2-oxacyclopentylidene ortho ester, di-t-butylsilylene group (DTBS), 1,3-(1,1,3,3-tetraisopropyldisiloxanylidene) derivative (TIPDS), tetra-t-butoxydisiloxane-1,3-diylidene derivative (TBDS), cyclic carbonates, cyclic boronates, ethyl boronate, and phenyl boronate.

In certain embodiments, the aliphatic polycarbonate segment is terminated with an ether. In certain embodiments, —Y is an optionally substituted moiety selected from the group consisting of: aliphatic, aromatic, heteroaliphatic, and heteroaryl.

In certain embodiments, —Y is a polyether chain. In certain embodiments, —Y consists of a polyethylene glycol chain. In certain embodiments, —Y consists of a polypropylene glycol chain. In certain embodiments, such polyether chains contain from about 2 to about 20 repeat units.

d. Description of Representative Surface Active Agents

Having described in some detail the structures and characteristics of each of the components which make up the aliphatic polycarbonate derivatives of the present invention, we now turn to combinations of those components. Broadly, the present invention encompasses materials of formula P1 with utility as surface active agents. These materials conform to formula P1 with any combination of the specific APC segments described above with any of the hydrocarbon moieties described above. The compounds are either —OH terminated (e.g. —Y=—H), or terminated with any of non-hydrogen —Y groups described above. In certain embodiments, the invention encompasses compositions with utility as surface active agents comprising mixtures of any two or more such materials.

Preferred surface active agents are those containing a poly(propylene carbonate) (PPC) or poly(ethylene carbonate) (PEC) segment bound to a hydrocarbon moiety derived from a monohydric alcohol. Such alcohols can be branched or linear.

Representative —OH-terminated surface active agents containing PPC and based on linear alcohols are shown in Table 3.

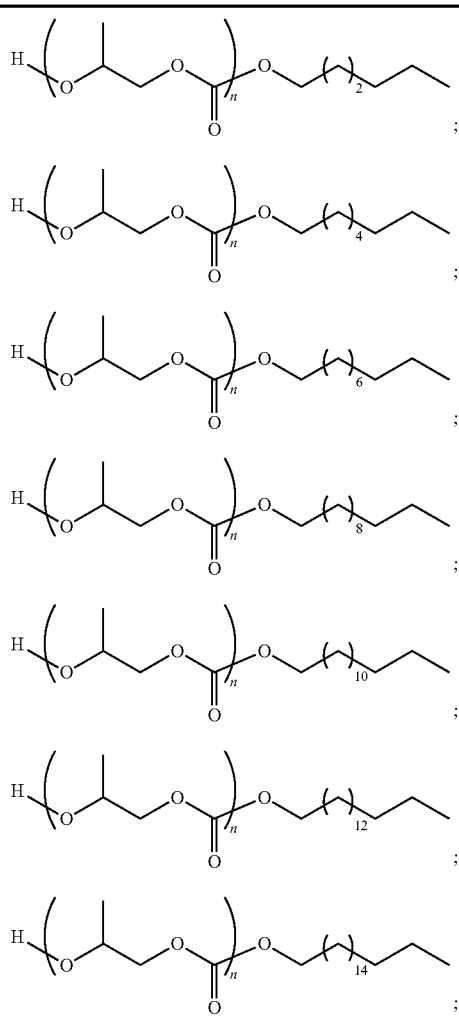

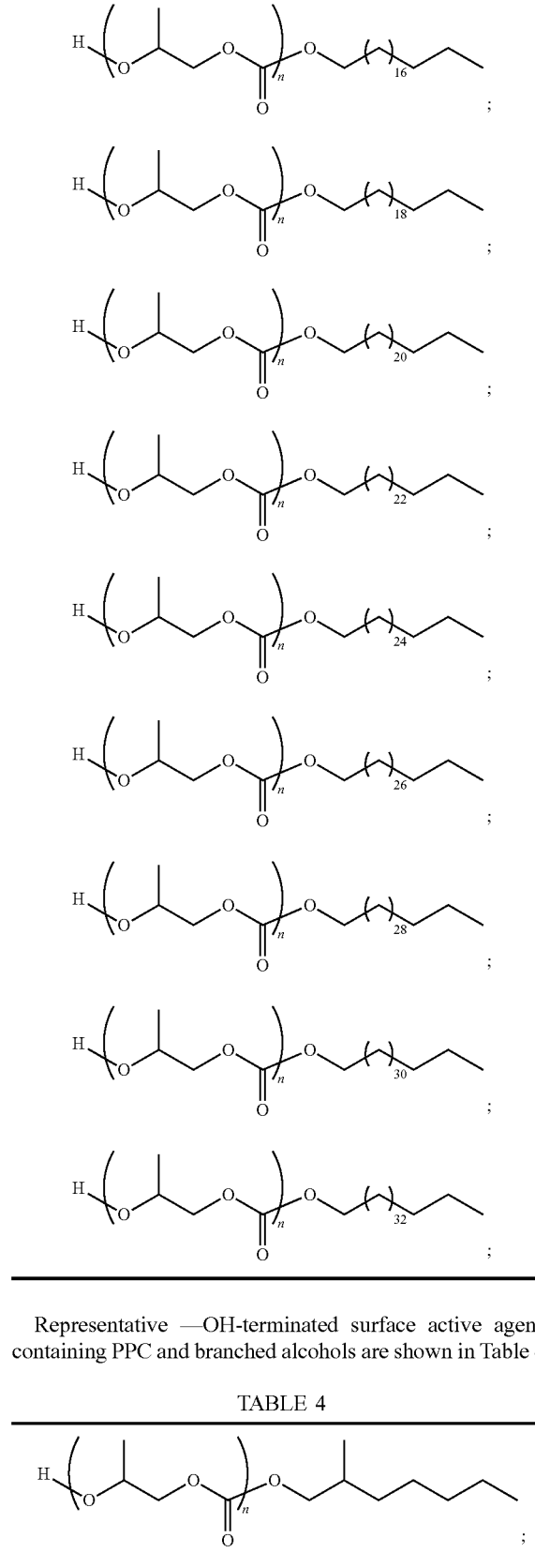

Representative —OH-terminated surface active agents containing PPC and branched alcohols are shown in Table 4.

TABLE 4

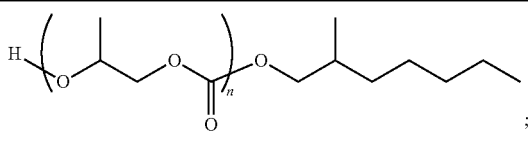

TABLE 4-continued

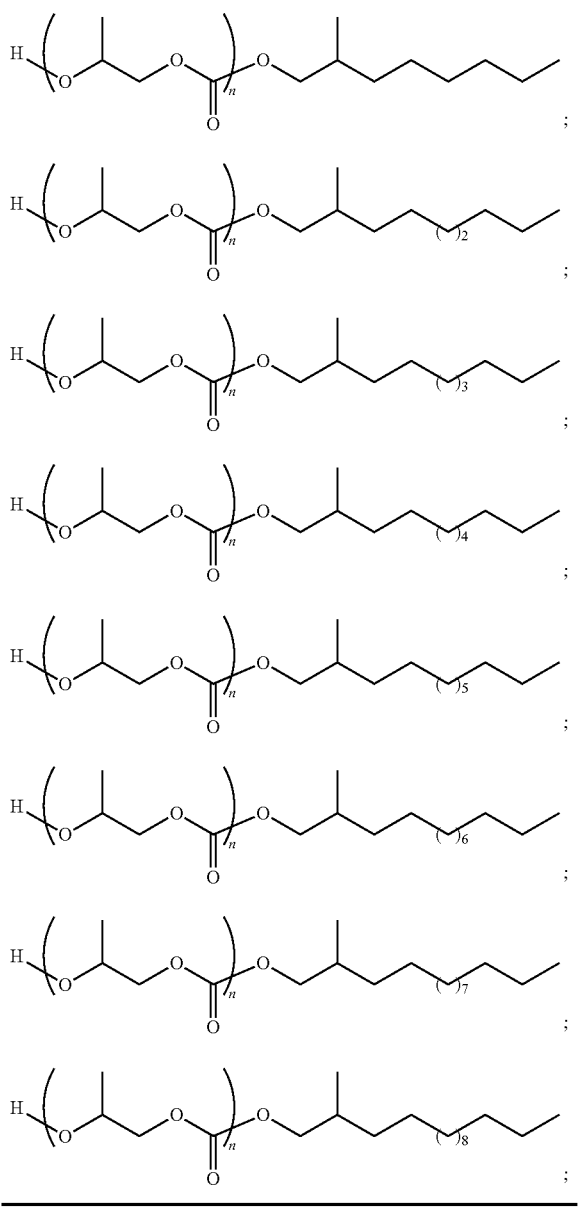

Additional —OH-terminated surface active agents containing PPC and branched alcohols are shown in Table 5.

TABLE 5

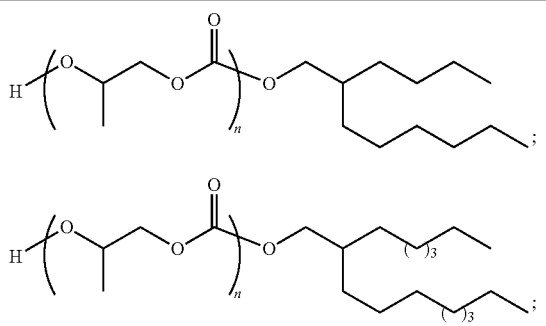

TABLE 5-continued

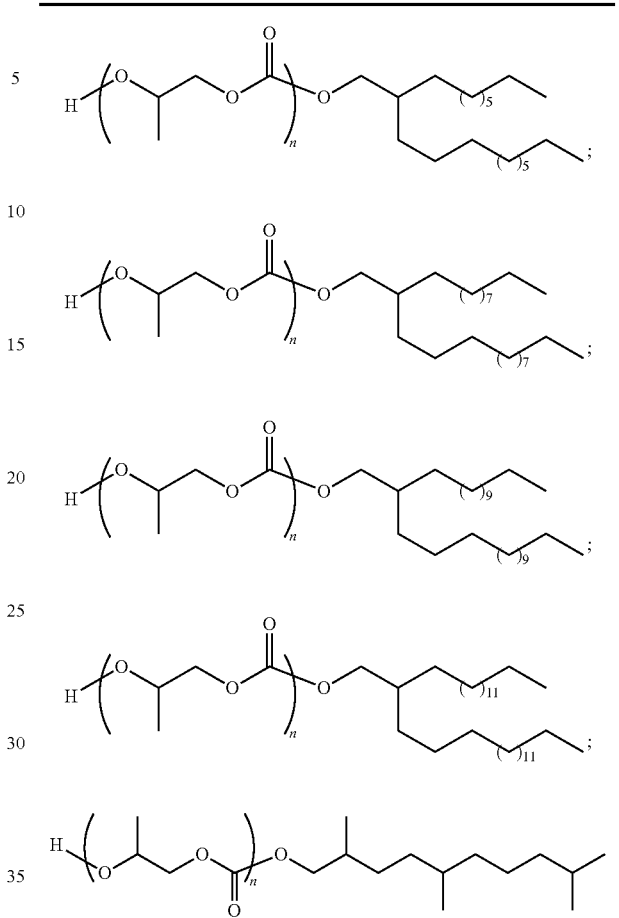

Additional —OH-terminated surface active agents containing PPC and branched alcohols are shown in Table 6.

TABLE 6

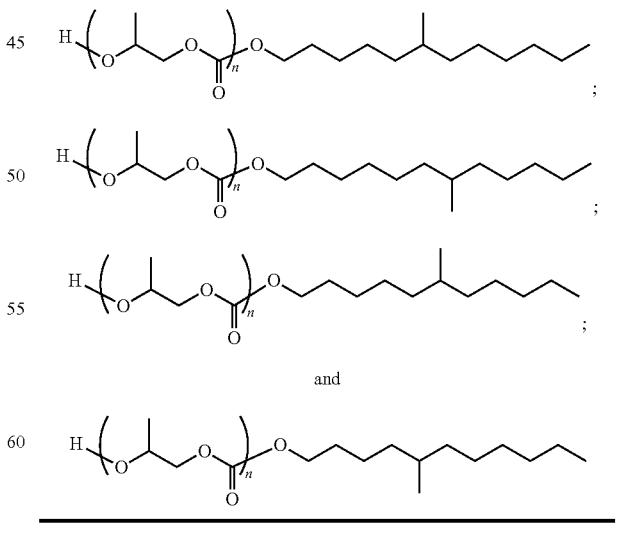

Representative —OH-terminated surface active agents containing PEC, and based on linear alcohols are shown in Table 7.

TABLE 7
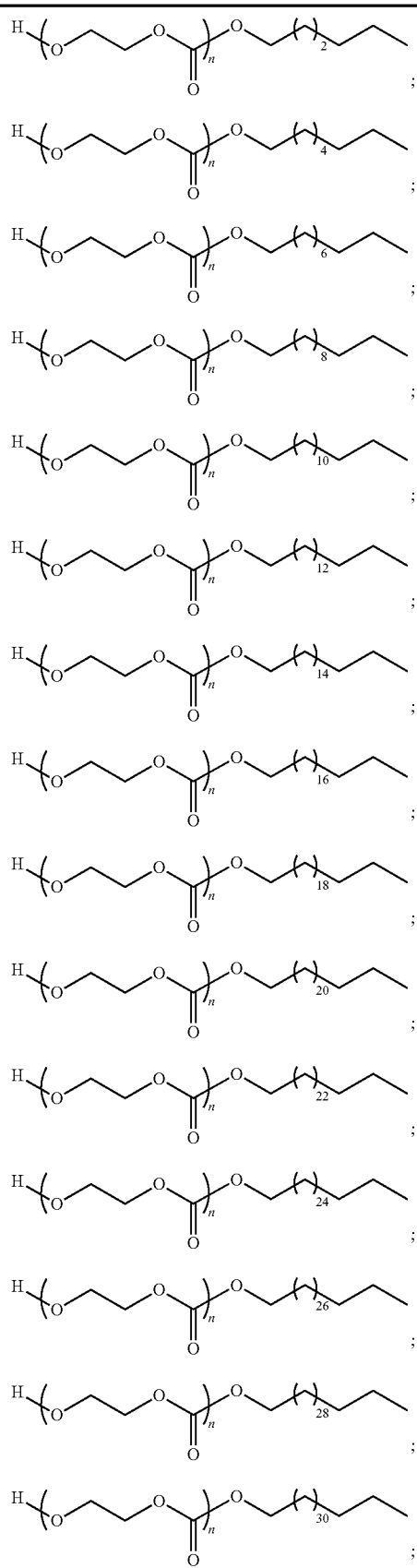
TABLE 7-continued
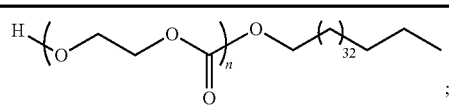
Representative —OH-terminated surface active agents containing PEC, and based on branched alcohols are shown in Table 8.
TABLE 8
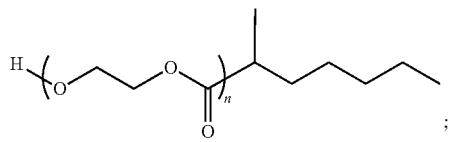
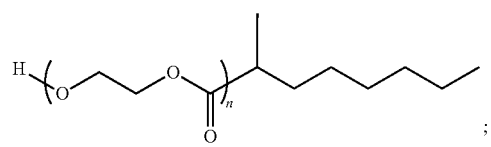
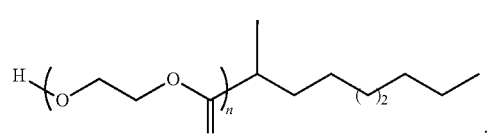
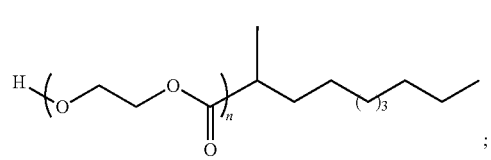
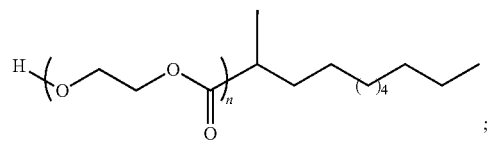
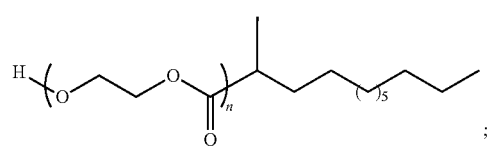
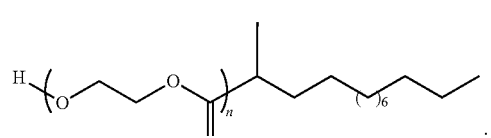
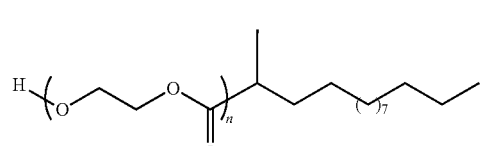
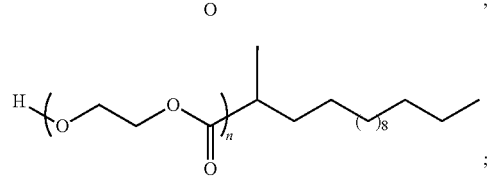

Additional —OH-terminated surface active agents containing PEC, and based on branched alcohols are shown in Table 9.

TABLE 9

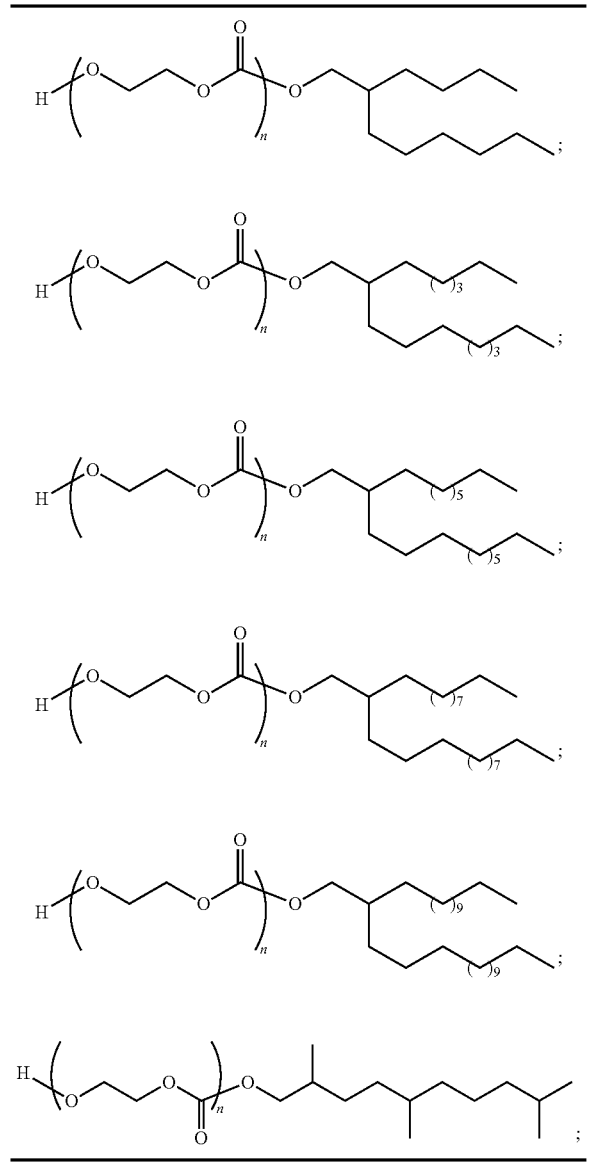

Additional —OH-terminated surface active agents containing PEC, and based on branched alcohols are shown in Table 10.

TABLE 10

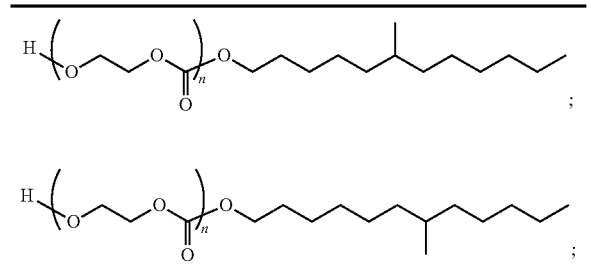

TABLE 10-continued

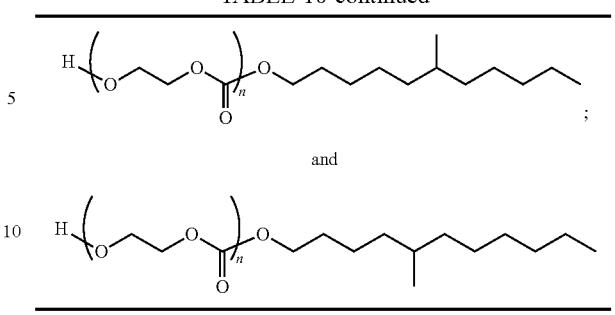

In certain embodiments, the present invention encompasses compositions containing any of the surface active agents shown in Tables 3-10, wherein n-which denotes the degree of polymerization in the PPC or PEC oligomer—is, on average in the composition, between about 2 and about 5. In certain embodiments, n is on average between about 5 and about 10. In certain embodiments, n is on average between about 1 0 and about 15. In certain embodiments, n is on average between about 15 and about 20. In certain embodiments, n is on average between about 20 and about 30. In certain embodiments n is about 3, about 4, about 5, about 6, about 7, about 8, or about 10.

In certain embodiments, the present invention encompasses compositions containing any of the surface active agents shown in Tables 3-6, wherein the terminal —H atom on the PPC or PEC chain is replaced with any of the Y-groups described hereinabove.

In certain embodiments, surface active agents of the present invention can be tuned for critical properties such as, but not limited to solubility, miscibility, surface activity by adjusting the relative masses of the APC and hydrocarbon segments. Additionally, other properties such as, but not limited to hydrophilicity, solubility, surface activity can be tuned by substituting Y-groups as described above.

In certain embodiments, surface active agents of the present invention are characterized by having defined ratios in the mass of hydrocarbon segment relative to the mass of the APC component. For certain applications, it is beneficial if the mass of the two components is approximately equal, while for other applications it is advantageous if the APC segment is larger than the hydrocarbon segment.

In certain embodiments, surface active agents of the present invention comprise any one or more compounds selected from Tables 3-6 and characterized in that the mass of the hydrocarbon moiety and the mass of the PPC or PEC segment are approximately equal (e.g. the average mass of the APC segment is within about +/−20% of the average mass of the hydrocarbon moiety). In general such molecules have PPC or PEC segments with approximately 2-5 repeat units.

In certain embodiments, surface active agents of the present invention comprise any one or more compounds selected from Tables 3-6 and characterized in that the mass of the PPC or PEC segment is approximately 1.5× the mass of the hydrocarbon segment. In certain embodiments, the mass of the PPC or PEC segment is approximately 2×, approximately 3×, approximately 4×, approximately 5×, or approximately 10× the mass of the hydrocarbon segment.

e. Surfactant Compositions

In certain embodiments, the surface active agents described hereinabove, have utility as $CO_2$ soluble surfactants for processes such as EOR. Therefore, in certain embodiments, the invention encompasses solutions of any of the surface active agents described above in liquid or supercritical $CO_2$. In certain embodiments, such solutions contain at least 0.1 weight percent of one or more of the surface active agents defined hereinabove. In certain embodiments, such a solution contains between 0.1 and 10 weight percent of one or more of the surface active agents defined hereinabove. In certain embodiments, such a solution contains between 0.1 and 1 weight percent, between 0.1 and 0.5 weight percent, between 0.25 and 2 weight percent, between 0.25 and 0.5 weight percent, between 1 and 5 weight percent, between 0.5 and 1 weight percent, between 1 and 2 weight percent or between 2 and 5 weight percent of one or more of the surface active agents defined hereinabove.

In certain embodiments, such a solution comprises any one or more compounds from Tables 3-6 dissolved in $CO_2$.

II. Methods of Making

In another aspect, the present invention encompasses methods of making surface active agents of formula I. In certain embodiments, the methods include the step of copolymerizing $CO_2$ and one or more epoxides in the presence of a chain transfer agent having the formula:

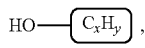

to provide a compound of formula

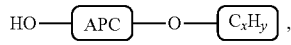

wherein, each of

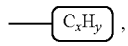

and

is as defined above and in the classes and subclasses herein. Suitable reaction conditions and catalysts for such reactions are disclosed in U.S. Pat. No. 8,247,520 the entirety of which is incorporated herein by reference.

In certain embodiments, the methods comprise a further step of modifying the —OH group of the compound of formula

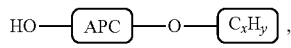

to provide a compound of formula

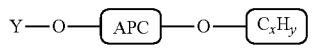

where —Y is as defined above and in the classes and subclasses herein, but is other than —H.

In certain embodiments, for any of the methods above, the epoxide has a formula:

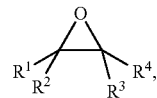

where each of $R^1$, $R^2$, $R^3$, and $R^4$, is as defined above and in the classes and subclasses herein.

In certain embodiments, for any of the methods above, the epoxide is selected from the group consisting of: ethylene oxide, propylene oxide, 1,2 butene oxide, 1,2 hexene oxide, oxides of higher alpha olefins (e.g. $C_{6-40}$ alpha olefins), butadiene monoepoxide, epichlorohydrin, ethers or esters of glycidol, cyclopentene oxide, cyclohexene oxide, 3 vinyl cyclohexene oxide, and 3-ethyl cyclohexene oxide, or with combinations of any two or more of these.

In certain embodiments, for any of the methods above, the epoxide comprises ethylene oxide. In certain embodiments, for any of the methods above, the epoxide comprises propylene oxide. In certain embodiments, for any of the methods above, the epoxide comprises cyclohexene oxide. In certain embodiments, for any of the methods above, the epoxide comprises 3-vinyl-cyclohexene oxide. In certain embodiments, for any of the methods above, the epoxide comprises 3-ethyl-cyclohexene oxide.

In certain embodiments for any of the methods above, the step of copolymerizing $CO_2$ and one or more epoxides in the presence of the chain transfer agent comprises contacting a mixture of these materials (the reaction mixture) with a metal complex.

In certain embodiments, a metal complex used in a method of the invention is a transition metal catalyst. In some embodiments, methods of making compounds of the present invention utilize transition metal catalysts capable of catalyzing the copolymerization of carbon dioxide and epoxides. In certain embodiments, methods of making compounds of the present invention include contacting the reaction mixture with any of the catalysts disclosed in U.S. Pat. Nos. 7,304,172, and 6,870,004; in PCT Publication Numbers WO2008136591A1, WO2008150033A1, WO2009137540; and WO2010022388 and in Chinese Patent Application Numbers CN200710010706, and CN200810229276, the entirety of each of which is hereby incorporated herein by reference. In certain embodiments, the methods include contacting the reaction mixture with any of the metal complexes described in Appendix 1 at the end of this specification.

In certain embodiments for any of the methods above, the step of copolymerizing $CO_2$ and one or more epoxides in the presence of the chain transfer agent is performed in the presence of one or more solvents. In certain other embodiments, the polymerization is performed neat without the addition of solvent.

In certain methods, where a solvent is present, the solvent is an organic solvent. In certain embodiments, the solvent is a hydrocarbon. In certain embodiments, the solvent is an aromatic hydrocarbon. In certain embodiments, the solvent is an aliphatic hydrocarbon. In certain embodiments, the solvent is a halogenated hydrocarbon.

In certain embodiments, the solvent is an ether. In certain embodiments, the solvent is an ester. In certain embodiments the solvent is a ketone.

In certain embodiments suitable solvents include, but are not limited to: Methylene Chloride, Chloroform, 1,2-Dichloroethane, Propylene Carbonate, Acetonitrile, Dimethylformamide, N-Methyl-2-pyrrolidone, Dimethyl Sulfoxide, Nitromethane, Caprolactone, 1,4-Dioxane, and 1,3-Dioxane.

In certain other embodiments, suitable solvents include, but are not limited to: Methyl Acetate, Ethyl Acetate, Acetone, Methyl Ethyl Ketone, Tetrahydrofuran, Monoglyme Triglyme, Propionitrile, 1-Nitropropane, and Cyclohexanone.

In certain embodiments, any of the above methods comprise epoxides present in concentrations between about 0.5 M to about 20 M or the neat concentration of the epoxide. In certain embodiments, epoxide is present in amounts between about 0.5 M to about 2 M. In certain embodiments, epoxide is present in amounts between about 2 M to about 5 M. In certain embodiments, epoxide is present in amounts between about 5 M to about 20 M. In certain embodiments, epoxide is present in an amount of about 20 M. In certain embodiments, liquid epoxide comprises the reaction solvent.

In certain embodiments for any of the methods above, the step of copolymerizing $CO_2$ and one or more epoxides in the presence of the chain transfer agent is performed in the presence $CO_2$ at a pressure of between about 30 psi to about 800 psi. In certain embodiments, $CO_2$ is present at a pressure of between about 30 psi to about 500 psi. In certain embodiments, $CO_2$ is present at a pressure of between about 30 psi to about 400 psi. In certain embodiments, $CO_2$ is present at a pressure of between about 30 psi to about 300 psi. In certain embodiments, $CO_2$ is present at a pressure of between about 30 psi to about 200 psi. In certain embodiments, $CO_2$ is present at a pressure of between about 30 psi to about 100 psi. In certain embodiments, $CO_2$ is present at a pressure of between about 30 psi to about 80 psi. In certain embodiments, $CO_2$ is present at a pressure of about 30 psi. In certain embodiments, $CO_2$ is present at a pressure of about 50 psi. In certain embodiments, $CO_2$ is present at a pressure of about 100 psi. In certain embodiments, the $CO_2$ is supercritical.

In certain embodiments for any of the methods above, the step of copolymerizing $CO_2$ and one or more epoxides in the presence of the chain transfer agent is conducted at a temperature of between about 0° C. to about 150° C. In certain embodiments, the reaction is conducted at a temperature of between about 23° C. to about 100° C. In certain embodiments, the reaction is conducted at a temperature of between about 23° C. and about 80° C. In certain embodiments, the reaction to be conducted at a temperature of between about 23° C. to about 50° C.

In certain embodiments, the above methods are characterized in that they produce cyclic carbonate as a byproduct in amounts of less than about 20%. In certain embodiments, cyclic carbonate is produced as a byproduct in amounts of less than about 15%. In certain embodiments, cyclic carbonate is produced as a byproduct in amounts of less than about 10%. In certain embodiments, cyclic carbonate is produced as a byproduct in amounts of less than about 5%. In certain embodiments, cyclic carbonate is produced as a byproduct in amounts of less than about 1%, less than 0.5%, less than 0.25%, or less than 0.1%. In certain embodiments, the reaction does not produce any detectable cyclic carbonate (e.g., as detectable by $^1$H-NMR and/or liquid chromatography (LC)).

In certain embodiments, a polymerization time is between about 30 minutes and about 48 hours. In some embodiments, the reaction is allowed to process for less than 24 hours. In some embodiments, the reaction is allowed to progress for less than 12 hours. In some embodiments, the reaction is allowed to process for between about 4 and about 12 hours.

In certain embodiments, a polymerization reaction is allowed to proceed until the number average molecular weight of the polymer or oligomer formed is between about 500 and about 400,000 g/mol. In certain embodiments, the number average molecular weight is allowed to reach a value between 500 and 40,000 g/mol. In other embodiments, the number average molecular weight is allowed to reach a value between 500 and 20,000 g/mol. In certain embodiments, the number average molecular weight is allowed to reach a value between 500 and 10,000 g/mol. In other embodiments, the number average molecular weight is allowed to reach a value between 500 and 5,000 g/mol. In other embodiments, the number average molecular weight is allowed to reach a value between 500 and 2,500 g/mol. In other embodiments, the number average molecular weight is allowed to reach a value between 1,000 and 5,000 g/mol.

In certain embodiments, provided methods further include the step of sampling the reaction and determining the molecular weight of the polymer at a given time. In certain embodiments, this sampling and molecular weight determination are performed at two or more time intervals. In certain embodiments a plot of molecular weight gain over time is constructed and the method further includes the step of determining from this plot the time at which a desired molecular weight polymer will be present. In certain embodiments, the time at which the polymerization is ended is determined by this method.

In certain embodiments, a polymerization reaction proceeds until between about 20% and about 100% of the provided epoxide is consumed. In certain embodiments, the conversion is between about 40% and about 90%. In certain embodiments, the conversion is at least 50%. In other embodiments, the conversion is at least 60%, at least 80% or at least 85%. In certain embodiments, at least 80% of the provided epoxide is converted to polymer.

In certain embodiments, the methods above include the step of allowing the copolymerization to proceed until a desired chain length of epoxide-$CO_2$ copolymer has been formed. In certain embodiments, the method includes a further step of terminating the polymerization reaction and isolating the product.

III. Applications

In another aspect, the present invention encompasses methods of modifying the interfacial tension between $CO_2$ (either liquid or supercritical $CO_2$) and an aqueous phase. In certain embodiments, the method comprises the step of adding an effective amount of a surface active agent of formula I to a mixture of $CO_2$ and the aqueous phase. In certain embodiments, the step of adding the surface active agent of formula I comprises dissolving it in liquid or supercritical $CO_2$ and then mixing the $CO_2$ solution with the aqueous phase. In certain embodiments, the methods include adding an effective amount of a surface active agent of formula I to an oil-bearing geological formation. In certain embodiments, the surface active agent is added to the oil-bearing geological formation as part of the process of flooding an oil well with $CO_2$ to recover petroleum.

EXEMPLIFICATION

Example 1

This example describes the preparation of a poly(propylene carbonate) derivative S1 based on n-hexanol. The product produced conforms to formula P1a where $R^{1a}$ is —$CH_3$, Y is —H,

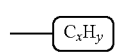

is n-hexyl, and n has an average value of about 5.3.

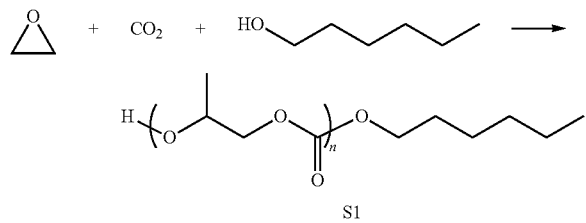

Synthesis:

A 300 mL Parr pressure reactor was charged with n-hexanol (Alfol® 6 obtained from Sasol North America Inc.) (27 g, 0.3 mol) and propylene oxide (75 g, 1.3 mol). The vessel was pressurized with 150 psi carbon dioxide (1.03 MPa) and heated to 25° C. After 30 min, a propylene oxide (PO) solution of a cobalt-salen catalyst (120 mg, in 8 g of PO) was charged to the vessel using $CO_2$ pressure. The reaction mixture was heated to 35° C. and pressurized to 300 psig (2.06 MPa) with $CO_2$. After 26 h, the reaction was vented and quenched with 0.2 M phosphoric acid in 2-butanone (4 mL).

Purification:

To remove excess epoxide, the crude reaction mixture was dissolved in 2-butanone (50 mL) and concentrated in vacuo, at 45° C. This step was repeated once more. The resulting polyol was dissolved in 2-butanone to ca. 70 wt % polyol and charged with Dowex® MSC resin (20 g). After 2 h, the solution was filtered through a bed of Celite® and concentrated in vacuo, at 40° C. to remove solvent. This provided S1 as a viscous liquid (130 g, 75% yield based on alcohol). See Table E1 for analytical data.

Example 2

This example describes the preparation of a series of poly(propylene carbonate) derivatives S2 of varying molecular weights based on a commercially available mixture of $C_{12}$ and $C_{14}$ alcohols. The compounds prepared in this example conform to formula P1a is —H, where Y is —H, $R^{1a}$ is —CH$_3$,

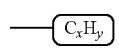

is a mixture of n-dodecyl and n-tetradecyl, and n has a value of approximately 4.9 (S2a), 7.5 (S2b), or 14.6 (S2c).

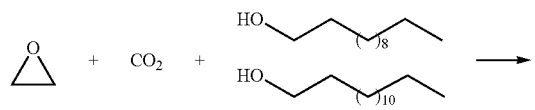

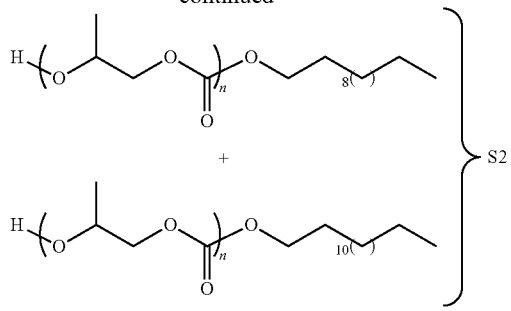

Preparation of Compound S2a.

A 300 mL Parr pressure reactor was charged with a mixture of linear $C_{12}$ and $C_{14}$ primary alcohols (Alfol® 1214 obtained from Sasol North America Inc.) (51 g, 0.3 mol) and propylene oxide (34 g, 0.6 mol). The vessel was pressurized to 150 psi with carbon dioxide (1.03 MPa) and heated to 25° C. After 30 min, a propylene oxide (PO) solution of a cobalt-salen catalyst (60 mg, in 8 g of PO) was charged to the vessel using $CO_2$ pressure. The reaction was heated to 35° C. and pressurized with $CO_2$ to a pressure of 300 psig (2.06 MPa). After stirring for 19 h at this pressure and temperature, the reaction mixture was vented to atmospheric pressure and quenched with 0.2 M phosphoric acid in 2-butanone (2 mL).

The crude reaction mixture was purified as described in Example 1 to provide S2a as a colorless viscous liquid (111 g, 90% yield based on alcohol). See Table E1 for analytical data.

Preparation of Compound S2b.

A 300 mL Parr pressure reactor was charged with a mixture of linear $C_{12}$ and $C_{14}$ primary alcohols (Alfol® 1214 obtained from Sasol North America Inc.) (51 g, 0.3 mol) and propylene oxide (75 g, 1.3 mol). The vessel was pressurized to 150 psi with carbon dioxide (1.03 MPa) and heated to 25° C. After 30 min, a propylene oxide (PO) solution of a cobalt-salen catalyst (120 mg, in 8 g of PO) was charged to the vessel using $CO_2$ pressure. The reaction was heated to 35° C. and pressurized with $CO_2$ to a pressure of 300 psig (2.06 MPa). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S2b as a colorless viscous liquid (169 g, 86% yield based on alcohol). See Table E1 for analytical data.

Preparation of Compound S2c.

A 300 mL Parr pressure reactor was charged with a mixture of linear $C_{12}$ and $C_{14}$ primary alcohols (Alfol® 1214 obtained from Sasol North America Inc.) (26 g, 0.1 mol) and propylene oxide (75 g, 1.3 mol). The vessel was pressurized to 150 psi with carbon dioxide (1.03 MPa) and heated to 25° C. After 30 min, a propylene oxide (PO) solution of a cobalt-salen catalyst (110 mg, in 8 g of PO) was charged to the vessel using $CO_2$ pressure. The reaction was heated to 35° C. and pressurized with $CO_2$ to a pressure of 300 psig (2.06 MPa). After stirring for 19 h at this pressure and temperature, the reaction mixture was vented to atmospheric pressure and quenched with 0.2 M phosphoric acid in 2-butanone (2 mL).

The crude reaction mixture was purified as described in Example 1 to provide S2c as a colorless viscous liquid (123 g, 72% yield based on alcohol). See Table E1 for analytical data.

Example 3

This example describes the preparation of a pair of poly(propylene carbonate) derivatives S3 of varying molecular weights based on a commercially branched $C_{13}$ alcohol. The compounds prepared in this example conform to formula P1a is —H, where Y is —H, $R^{1a}$ is —$CH_3$, n has a value of approximately 4.4 (S3a), or 14.6 (S3b), and

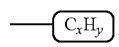

is a mixture of C13 alkyl isomers including

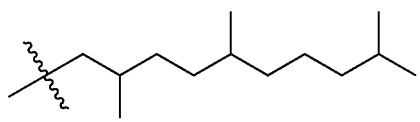 [SMILES: *CC(C)CCC(C)CCCC(C)C]

and related compounds.

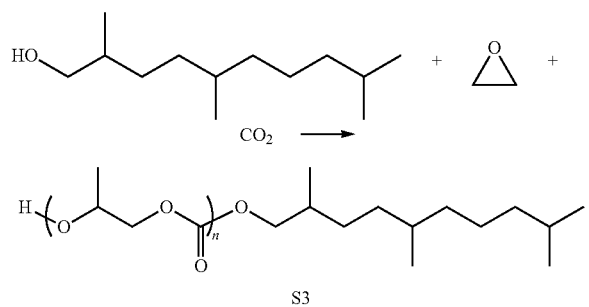

Preparation of Compound S3a.

A 300 mL Parr pressure reactor was charged with a branched C13 alcohol (Marlipal® 013 obtained from Sasol North America Inc.) (50 g, 0.3 mol) and propylene oxide (34 g, 0.6 mol). The vessel was pressurized to 150 psi with carbon dioxide (1.03 MPa) and heated to 25° C. After 30 min, a propylene oxide (PO) solution of a cobalt-salen catalyst (60 mg, in 8 g of PO) was charged to the vessel using $CO_2$ pressure. The reaction was heated to 35° C. and pressurized with $CO_2$ to a pressure of 300 psig (2.06 MPa). After stirring for 19 h at this pressure and temperature, the reaction mixture was vented to atmospheric pressure and quenched with 0.2 M phosphoric acid in 2-butanone (2 mL).

The crude reaction mixture was purified as described in Example 1 to provide S3a as a colorless viscous liquid (112 g, 91% yield based on alcohol). See Table E1 for analytical data.

Preparation of Compound S3b.

A 300 mL Parr pressure reactor was charged with a branched C13 alcohol (Marlipal® 013 obtained from Sasol North America Inc.) (50 g, 0.3 mol) and propylene oxide (34 g, 0.6 mol). The vessel was pressurized to 150 psi with carbon dioxide (1.03 MPa) and heated to 25° C. After 30 min, a propylene oxide (PO) solution of a cobalt-salen catalyst (120 mg, in 8 g of PO) was charged to the vessel using $CO_2$ pressure. The reaction was heated to 35° C. and pressurized with $CO_2$ to a pressure of 300 psig (2.06 MPa). After stirring for 19 h at this pressure and temperature, the reaction mixture was vented to atmospheric pressure and quenched with 0.2 M phosphoric acid in 2-butanone (4 mL).

The crude reaction mixture was purified as described in Example 1 except dichloromethane was used in place of 2-butanone as the processing solvent to provide S3a as a viscous yellow liquid (176 g, 90% yield based on alcohol). See Table E1 for analytical data.

Example 4

This example describes the preparation of a poly(propylene carbonate) derivative S4 based on a commercially branched $C_{32}$ branched alcohol. The compound prepared conforms to formula P1a is —H, where Y is —H, $R^{1a}$ is —$CH_3$, n has a value of approximately 4.8, and

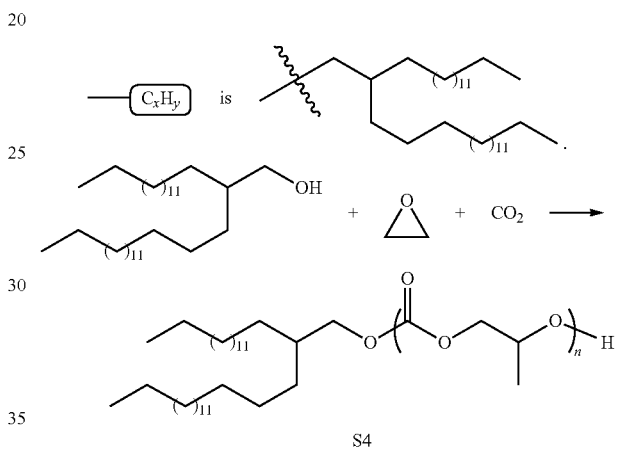

A 300 mL Parr pressure reactor was charged with a branched C32 alcohol (Isofol® 32 obtained from Sasol North America Inc.) (85 g, 0.3 mol) and propylene oxide (75 g, 1.3 mol). The vessel was pressurized 150 psi carbon dioxide (1.03 MPa) and heated to 25° C. After 30 min, a propylene oxide (PO) solution of a cobalt-salen catalyst (120 mg, in 8 g of PO) was charged to the vessel using $CO_2$ pressure. The reaction was heated to 35° C. and pressurized with $CO_2$ to a pressure of 300 psig (2.06 MPa). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S4 as a colorless viscous liquid (234 g, 88% yield based on alcohol). See Table E1 for analytical data.

Example 5

This example describes the preparation of a poly(propylene carbonate) derivative S5 based on a $C_{22}$ linear alcohol. The compound prepared in this example conforms to formula P1a is —H, where Y is —H, $R^{1a}$ is —$CH_3$, n has a value of approximately 5.0, and

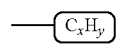

is —$(CH_2)_{21}CH_3$.

A 300 mL Parr pressure reactor was charged with 1-docosanol (Nacol® 22-98 obtained from Sasol North America Inc.) (85 g, 0.3 mol) and propylene oxide (75 g, 1.3 mol). The vessel was pressurized 150 psi carbon dioxide (1.03 MPa) and heated to 25° C. After 30 min, a propylene oxide (PO) solution of a cobalt-salen catalyst (120 mg, in 8 g of PO) was charged to the vessel using $CO_2$ pressure. The reaction was heated to 35° C. and pressurized with $CO_2$ to a pressure of 300 psig (2.06 MPa). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 except dichloromethane was used in place of 2-butanone as the processing solvent to provide S5 as a white waxy solid (198 g, 86% yield based on alcohol). See Table E1 for analytical data.

Example 6

This example describes the preparation of a poly(ethylene carbonate) derivative S6 based on n-hexanol. The compound prepared conforms to formula P1a is —H, where Y is —H, $R^{1a}$ is —H, n has a value of approximately 5, and

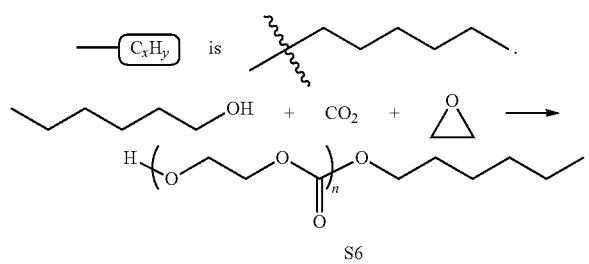

A 300 mL Parr stirred pressure reactor was charged with C6 alcohol (ALFOL® 6 obtained from Sasol North America Inc.) (38 g, 0.37 mol) and cobalt-salen catalyst (0.25 wt % based on alcohol charge). The reactor was closed and purged with dry nitrogen to remove any residual oxygen or moisture. Ethylene oxide (82 g, 1.86 mol) was added to the reactor at 25° C. using positive displacement (nitrogen @60 psi). The vessel was pressurized to greater than 250 psi carbon dioxide (1.03 MPa) and maintained at 25° C. Pressure was maintained above 250 psi until all required $CO_2$ was added (1.86 mol). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S6 as a colorless viscous liquid. See Table E1 for analytical data.

Example 7

This example describes the preparation of a poly(butylene carbonate) derivative S7 based on n-octanol. The compound prepared conforms to formula P1a is —H, where Y is —H, $R^{1a}$ is —CH$_2$CH$_3$, n has a value of approximately 5, and is

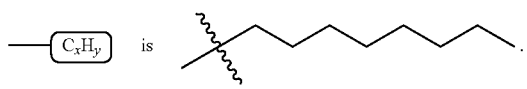

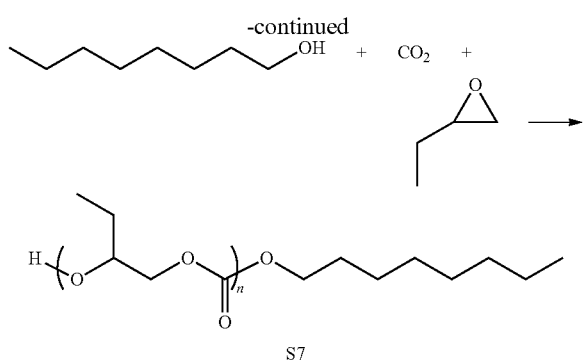

A 300 mL Parr stirred pressure reactor was charged with C8 alcohol (ALFOL® 8 obtained from Sasol North America Inc.) (40 g, 0.31 mol) and cobalt-salen catalyst (0.25 wt % based on alcohol charge). The reactor was closed and purged with dry nitrogen to remove any residual oxygen or moisture. Butylene oxide (110 g, 1.5 mol) was added to the reactor at 25° C. using positive displacement (nitrogen @60 psi). The vessel was pressurized to greater than 250 psi carbon dioxide (1.03 MPa) and maintained at 25° C. Pressure was maintained above 250 psi until all required $CO_2$ was added (1.5 mol). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S7 as a colorless viscous liquid. See Table E1 for analytical data.

Example 8

This example describes the preparation of a series of poly(ethylene carbonate) derivatives S8 of varying molecular weights based on a commercially available mixture of $C_{12}$ and $C_{14}$ alcohols. The compounds prepared in this example conform to formula P1a is —H, where Y is —H, $R^{1a}$ is —H,

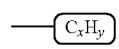

is a mixture of n-dodecyl and n-tetradecyl, and n has a value of approximately 2.0 (S8a), and 5.0 (S8b).

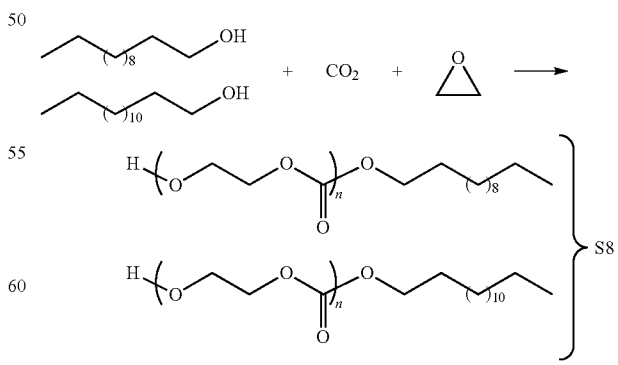

Preparation of Compound S8a.

A 300 mL Parr stirred pressure reactor was charged with $C_{12-14}$ alcohol (ALFOL® 1214 obtained from Sasol North America Inc.) (83 g, 0.38 mol) and cobalt-salen catalyst (0.25 wt % based on alcohol charge). The reactor was closed and purged with dry nitrogen to remove any residual oxygen or moisture. Ethylene oxide (36 g, 0.81 mol) was added to the reactor at 25° C. using positive displacement (nitrogen @60 psi). The vessel was pressurized to greater than 250 psi carbon dioxide (1.03 MPa) and maintained at 25° C. Pressure was maintained above 250 psi until all required $CO_2$ was added (0.81 mol). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S8a as a colorless viscous liquid. See Table E1 for analytical data.

Preparation of Compound S8b.

A 300 mL Parr stirred pressure reactor was charged with $C_{12-14}$ alcohol (ALFOL® 1214 obtained from Sasol North America Inc.) (60 g, 0.27 mol) and cobalt-salen catalyst (0.25 wt % based on alcohol charge). The reactor was closed and purged with dry nitrogen to remove any residual oxygen or moisture. Ethylene oxide (65 g, 1.48 mol) was added to the reactor at 25° C. using positive displacement (nitrogen @60 psi). The vessel was pressurized to greater than 250 psi carbon dioxide (1.03 MPa) and maintained at 25° C. Pressure was maintained above 250 psi until all required $CO_2$ was added (1.48 mol). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S8b as a colorless viscous liquid. See Table E1 for analytical data.

Example 9

This example describes the preparation of a series of poly(ethylene carbonate) derivatives S9 of varying molecular weights based on a commercially available isomeric mixture of $C_{13}$ alcohols. The compounds prepared in this example conform to formula P1a is —H, where Y is —H, $R^{1a}$ is —H,

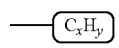

is a mixture of branched C13 isomers, and n has a value of approximately 2.0 (S9a), 5.0 (S9b) and 9.0 (S9c).

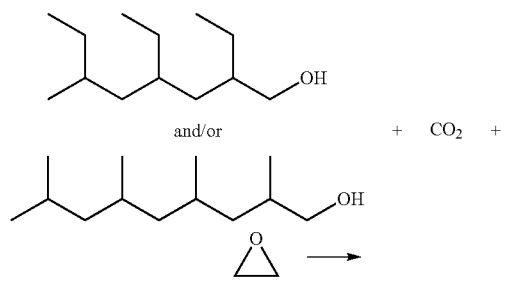

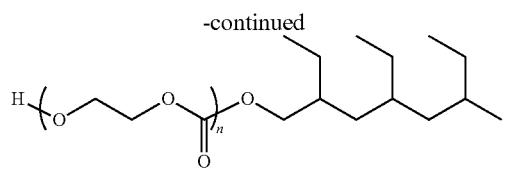

and/or

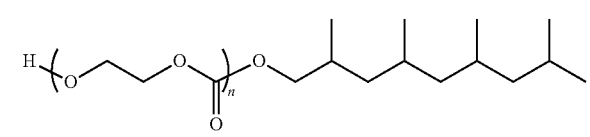

S9

Preparation of Compound S9a.

A 300 mL Parr stirred pressure reactor was charged with C13 alcohol (Marlipal® 013 obtained from Sasol Germany GHMB) (83 g, 0.38 mol) and cobalt-salen catalyst (0.25 wt % based on alcohol charge). The reactor was closed and purged with dry nitrogen to remove any residual oxygen or moisture. Ethylene oxide (36 g, 0.82 mol) was added to the reactor at 25° C. using positive displacement (nitrogen @60 psi). The vessel was pressurized to greater than 250 psi carbon dioxide (1.03 MPa) and maintained at 25° C. Pressure was maintained above 250 psi until all required $CO_2$ was added (0.82 mol). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S9a as a colorless viscous liquid. See Table E1 for analytical data.

Preparation of Compound S9b.

A 300 mL Parr stirred pressure reactor was charged with C13 alcohol (Marlipal® 013 obtained from Sasol Germany GHMB) (59 g, 0.27 mol) and cobalt-salen catalyst (0.25 wt % based on alcohol charge). The reactor was closed and purged with dry nitrogen to remove any residual oxygen or moisture. Ethylene oxide (65 g, 1.48 mol) was added to the reactor at 25° C. using positive displacement (nitrogen @60 psi). The vessel was pressurized to greater than 250 psi carbon dioxide (1.03 MPa) and maintained at 25° C. Pressure was maintained above 250 psi until all required $CO_2$ was added (1.48 mol). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S9b as a colorless viscous liquid. See Table E1 for analytical data.

Preparation of Compound S9c.

A 300 mL Parr stirred pressure reactor was charged with C13 alcohol (Marlipal® 013 obtained from Sasol Germany GHMB) (40 g, 0.18 mol) and cobalt-salen catalyst (0.25 wt % based on alcohol charge. The reactor was closed and purged with dry nitrogen to remove any residual oxygen or moisture. Ethylene oxide (79 g, 1.8 mol) was added to the reactor at 25° C. using positive displacement (nitrogen @60 psi). The vessel was pressurized to greater than 250 psi carbon dioxide (1.03 MPa) and maintained at 25° C. Pressure was maintained above 250 psi until all required $CO_2$ was added (1.8 mol). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S9c as a colorless viscous liquid. See Table E1 for analytical data.

Example 10

This example describes the preparation of a poly(butylene carbonate) derivative S10 based on n-lauric alcohol ($C_{12-14}$). The compound prepared conforms to formula P1a is —H, where Y is —H, $R^{1a}$ is —CH$_2$CH$_3$, n has a value of approximately 5, and

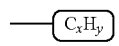

is a mixture of C13 branched isomers.

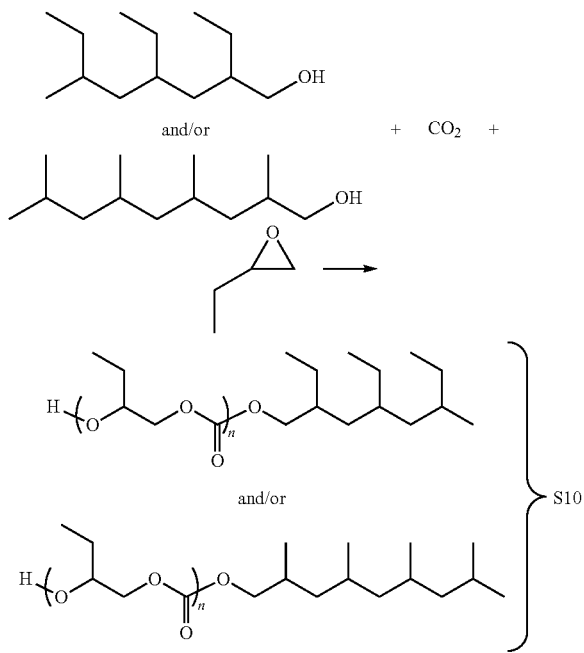

A 300 mL Parr stirred pressure reactor was charged with C13 alcohol (Marlipal® 013 obtained from Sasol Germany GHMB) (52 g, 0.24 mol) and cobalt-salen catalyst (0.25 wt % based on alcohol charge. The reactor was closed and purged with dry nitrogen to remove any residual oxygen or moisture. Butylene oxide (94 g, 1.3 mol) was added to the reactor at 25° C. using positive displacement (nitrogen @60 psi). The vessel was pressurized to greater than 250 psi carbon dioxide (1.03 MPa) and maintained at 25° C. Pressure was maintained above 250 psi until all required $CO_2$ was added (1.3 mol). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S10 as a colorless viscous liquid. See Table E1 for analytical data.

Example 11

This example describes the preparation of a poly(ethylene carbonate) derivative S11 based on cyclohexyl alcohol (C6). The compound prepared conforms to formula P1a is —H, where Y is —H, $R^{1a}$ is —H, n has a value of approximately 5, and

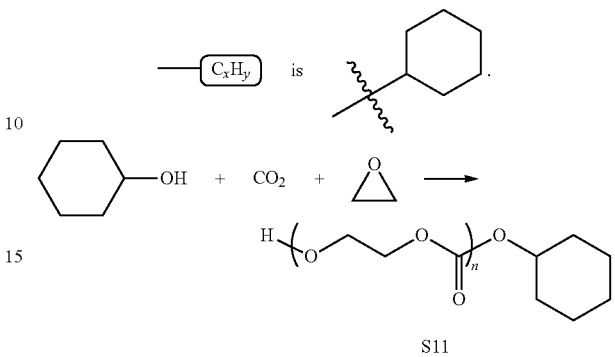

A 300 mL Parr stirred pressure reactor was charged with Cyclohexyl alcohol (obtained from Adrich.) (48 g, 0.48 mol) and cobalt-salen catalyst (0.25 wt % based on alcohol charge). The reactor was closed and purged with dry nitrogen to remove any residual oxygen or moisture. Ethylene oxide (105 g, 2.4 mol) was added to the reactor at 25° C. using positive displacement (nitrogen @60 psi). The vessel was pressurized to greater than 250 psi carbon dioxide (1.03 MPa) and maintained at 25° C. Pressure was maintained above 250 psi until all required $CO_2$ was added (2.4 mol). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S11 as a colorless viscous liquid. See Table E1 for analytical data.

Example 12

This example describes the preparation of a poly(propylene carbonate) derivative S12 based on cyclohexyl alcohol (C6). The compound prepared conforms to formula P1a is —H, where Y is —H, $R^{1a}$ is —CH$_3$, n has a value of approximately 5, and

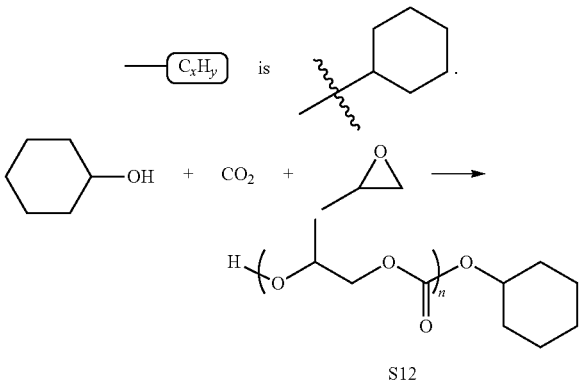

A 300 mL Parr stirred pressure reactor was charged with Cyclohexyl alcohol (obtained from Adrich.) (40 g, 0.40 mol) and cobalt-salen catalyst (0.25 wt % based on alcohol charge). The reactor was closed and purged with dry nitrogen to remove any residual oxygen or moisture. Pwwropylene oxide (116 g, 2 mol) was added to the reactor at 25° C. using positive displacement (nitrogen @60 psi). The vessel was pressurized to greater than 250 psi carbon dioxide (1.03 MPa) and maintained at 25° C. Pressure was maintained above 250 psi until all required $CO_2$ was added (2 mol). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S12 as a colorless viscous liquid. See Table E1 for analytical data.

Example 13

This example describes the preparation of a poly(ethylene carbonate) derivative S13 based on a commercially branched $C_{32}$ branched alcohol. The compound prepared conforms to formula P1a is —H, where Y is —H, $R^{1a}$ is —H, n has a value of approximately 4.8, and

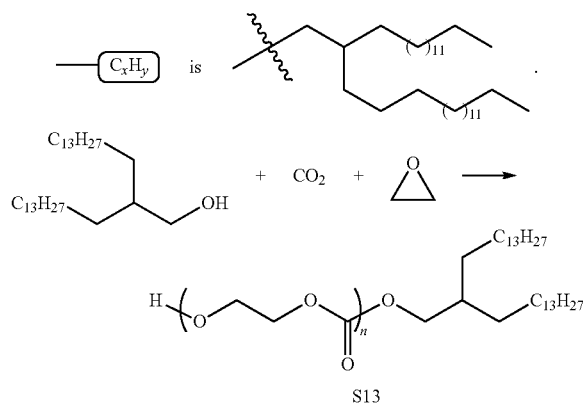

S13

A 300 mL Parr pressure reactor was charged with a branched C32 alcohol (Isofol® 32 obtained from Sasol Germany GHMB) (80 g, 0.17 mol) and cobalt-salen catalyst (0.25 wt % based on alcohol charge). The reactor was closed and purged with dry nitrogen to remove any residual oxygen or moisture. Ethylene oxide (38 g, 0.86 mol) was added to the reactor at 25° C. using positive displacement (nitrogen @60 psi). The vessel was pressurized to greater than 250 psi carbon dioxide (1.03 MPa) and maintained at 25° C. Pressure was maintained above 250 psi until all required $CO_2$ was added (0.86 mol). After stirring for 24 h at this pressure and temperature, the reaction mixture was vented to atmospheric pressure and quenched with 0.2 M phosphoric acid in 2-butanone (4 mL).

The crude reaction mixture was purified as described in Example 1 to provide S13 as a colorless viscous liquid. See Table E1 for analytical data.

TABLE E1

Analytical Data for Compounds of Examples 1-13

| Sample ID | MW (NMR), g/mol | Estimated Carbonate Repeats, n | Alcohol Length, # Carbons | Carbonate Side Chain Length | PDI |
|---|---|---|---|---|---|
| S1 | 491 | 3.8 | 6 | CH3 | 1.13 |
| S2a | 443 | 2.5 | 1214 | CH3 | 1.09 |
| S2b | 637 | 4.4 | 1214 | CH3 | 1.09 |
| S2c | 1111 | 8.9 | 1214 | CH3 | 1.04 |
| S3a | 477 | 2.7 | 13 | CH3 | 1.1 |
| S3b | 702 | 5.3 | 13 | CH3 | 1.1 |
| S4 | 960 | 4.8 | 32 | CH3 | 1.06 |
| S5 | 836 | 5 | 22 | CH3 | 1.08 |
| S6 | 416 | 3.5 | 6 | H | |
| S7 | 408 | 2.4 | 8 | CH2CH3 | |
| S8a | 301 | 0.9 | 1214 | H | |
| S8b | 534 | 3.6 | 1214 | H | |
| S9a | 337 | 1.3 | 13 | H | |
| S9b | 534 | 3.6 | 13 | H | |
| S9c | 821 | 6.8 | 13 | H | |
| S10 | 523 | 2.6 | 13 | CH2CH3 | |
| S11 | 523 | 4.8 | 6 | H | |
| S12 | | | 6 | CH3 | |
| S13 | 754 | 3.3 | 32 | H | |

Interfacial tension (IFT) measurements (Table E2) were performed using a spinning drop tensiometer where surfactants of the present invention were dissolved in hydrocarbon solutions (mineral oil) and introduced as a droplet into a de-ionized water medium. Measurement of the change in droplet shape can be correlated to a change in interfacial tension between the two fluids. The reduction in IFT values when compared to the blank (IFT with no surfactant present) indicate surface activity.

TABLE E2

Interfacial tension measurements.

| Sample | IFT, nM/m |
|---|---|
| S1 | 7.6 |
| S2a | 7.8 |
| S2b | 5.9 |
| S2c | 6.5 |
| S3a | 5.4 |
| S3b | 6.3 |
| S4 | 6.6 |
| S5 | 6.9 |
| S6 | 5.7 |
| S7 | 7.1 |
| S8a | 1.1 |
| S8b | 9.6 |
| S9a | 2.5 |
| S9b | 3.0 |
| S9c | |
| S10 | 6.2 |
| S11 | |
| S12 | |
| S13 | 7.2 |
| Mineral Oil/Water Blank | 12.5 |
| Mineral Oil/Air Blank | 10.3 |
| PAO/Water Blank | 10.6 |

It is generally accepted that as a surface active agent's hydrophobicity increases the rate of aerobic biodegradation decreases. For the compositions of this invention which are hydrophobic and water insoluble, the expectation would be for aerobic degradation to be slow, comparable to other hydrophobic non-ionics such as alcohol alkoxylates. Unexpectedly, when tested (Table E3) for aerobic biodegradation, materials of the present invention were rapidly degraded and many met the definition of "readily biodegradable". To achieve the label "readily biodegradable" a mixture must reach 60% ThOD by 28 days.

TABLE E3

Biodegradation results as a percentage of theoretical oxygen demand (ThOD).

| Sample | 28-day % ThOD | % ThOD sd | Molecular Weight/# of Repeats |
|---|---|---|---|
| S1 | 86.8 | 8.1 | 491/3.8 |
| S2a | 86.6 | 2.3 | 443/2.5 |
| S2b | 85.3 | 4.3 | 637/4.4 |
| S2c | 60.2 | 5.6 | 1111/8.9 |
| S3a | 81.4 | 2.4 | 477/2.7 |
| S3b | 72.2 | 1.5 | 702/5.3 |
| S4 | 38.9 | 4.6 | 836/5.0 |
| S5 | 33 | 2.1 | 960/4.8 |
| Benzoate Control | 84.8 | 3.9 | |

APPENDIX I

Representative Metal Complexes Suitable for Synthesis of Compounds of the Invention Note Unless otherwise indicated, the R groups in this Appendix I are to be regarded as independent of any R groups previously defined in the body of the specification hereinabove. If an R group in this appendix happens to have the same designation as an R group previously appearing in the specification, this is coincidental and does not imply the definition of the R group in this Appendix applies to any R group as used elsewhere in the Detailed Description or vice-versa.

As mentioned above, methods of making the novel compounds disclosed herein include the step of copolymerizing CO$_2$ and one or more epoxides in the presence of a chain transfer agent having the formula:

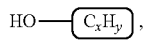

to provide a compound of formula

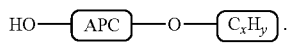

In certain embodiments, this step includes contacting these materials in the presence of a polymerization catalyst. For illustration, this appendix provides further description of metal complexes suitable for certain embodiments of these methods.

In certain embodiments, suitable polymerization catalysts include metal complexes having a formula $L_p$-M-$(L_I)_m$, where $L_p$ is a permanent ligand set, M is a metal atom, $L_I$ is a ligand that is a polymerization initiator, and m is an integer between 0 and 2 inclusive representing the number of initiating ligands present.

In some embodiments, a metal atom, M, is selected from periodic table groups 3-13, inclusive. In certain embodiments, M is a transition metal selected from periodic table groups 5-12, inclusive. In some embodiments, M is a transition metal selected from periodic table groups 4-11, inclusive. In certain embodiments, M is a transition metal selected from periodic table groups 5-10, inclusive. In certain embodiments, M is a transition metal selected from periodic table groups 7-9, inclusive. In some embodiments, M is selected from the group consisting of Cr, Mn, V, Fe, Co, Mo, W, Ru, Al, and Ni. In some embodiments, M is a metal atom selected from the group consisting of: cobalt; chromium; aluminum; titanium; ruthenium, Iron, and manganese. In some embodiments, M is cobalt. In some embodiments, M is chromium. In some embodiments, M is aluminum. In some embodiments, M is iron.

In certain embodiments, a metal complex is a zinc, cobalt, chromium, aluminum, titanium, ruthenium, or manganese complex. In certain embodiments, a metal complex is an aluminum complex. In other embodiments, a metal complex is a chromium complex. In yet other embodiments, a metal complex is a zinc complex. In certain other embodiments, a metal complex is a titanium complex. In still other embodiments, a metal complex is a ruthenium complex. In certain embodiments, a metal complex is a manganese complex. In certain embodiments, a metal complex is cobalt complex. In certain embodiments where a metal complex is a cobalt complex, the cobalt metal has an oxidation state of +3 (i.e., Co(III)). In other embodiments, the cobalt metal has an oxidation state of +2 (i.e., Co(II)).

A permanent ligand set '$L_p$' comprises one or more ligands that remain coordinated with a metal center throughout the catalytic cycle. This is in contrast to other ligands such as polymerization initiators, monomer molecules, polymer chains, and solvent molecules that may participate in the catalytic cycle or may be exchanged under the polymerization conditions.

In certain embodiments, a permanent ligand set comprises a single multidentate ligand that remains associated with the metal center during catalysis. In some embodiments, the permanent ligand set includes two or more ligands that remain associated with the metal center during catalysis. In some embodiments, a metal complex comprises a metal atom coordinated to a single tetradentate ligand while in other embodiments, a metal complex comprises a chelate containing a plurality of individual permanent ligands. In certain embodiments, a metal complex contains two bidentate ligands. In some embodiments, a metal complex contains a tridentate ligand.

In various embodiments, tetradentate ligands suitable for metal complexes of the present invention may include, but are not limited to: salen derivatives 1, derivatives of salan ligands 2, bis-2-hydroxybenzamido derivatives 3, derivatives of the Trost ligand 4, porphyrin derivatives 5, derivatives of tetrabenzoporphyrin ligands 6, derivatives of corrole ligands 7, phthalocyaninate derivatives 8, and dibenzotetramethyltetraaza[14]annulene (tmtaa) derivatives 9 or 9'.

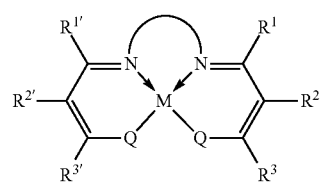

1

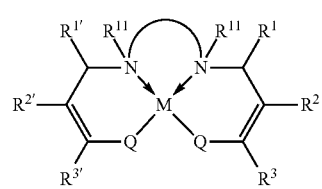

2

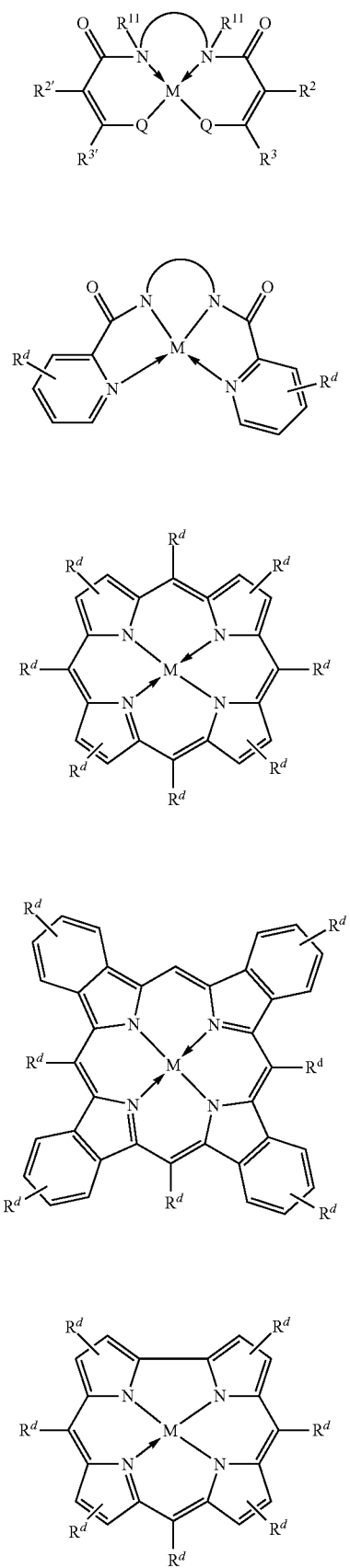

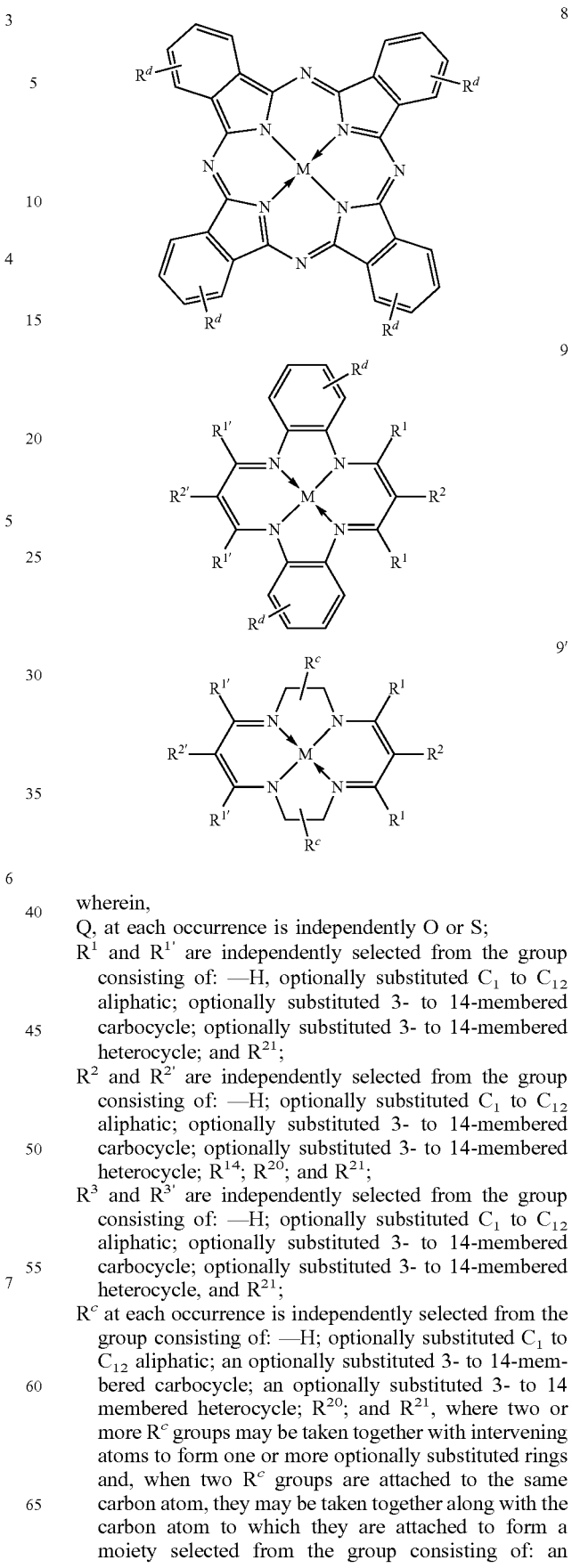

wherein,

Q, at each occurrence is independently O or S;

$R^1$ and $R^{1'}$ are independently selected from the group consisting of: —H, optionally substituted $C_1$ to $C_{12}$ aliphatic; optionally substituted 3- to 14-membered carbocycle; optionally substituted 3- to 14-membered heterocycle; and $R^{21}$;

$R^2$ and $R^{2'}$ are independently selected from the group consisting of: —H; optionally substituted $C_1$ to $C_{12}$ aliphatic; optionally substituted 3- to 14-membered carbocycle; optionally substituted 3- to 14-membered heterocycle; $R^{14}$; $R^{20}$; and $R^{21}$;

$R^3$ and $R^{3'}$ are independently selected from the group consisting of: —H; optionally substituted $C_1$ to $C_{12}$ aliphatic; optionally substituted 3- to 14-membered carbocycle; optionally substituted 3- to 14-membered heterocycle, and $R^{21}$;

$R^c$ at each occurrence is independently selected from the group consisting of: —H; optionally substituted $C_1$ to $C_{12}$ aliphatic; an optionally substituted 3- to 14-membered carbocycle; an optionally substituted 3- to 14 membered heterocycle; $R^{20}$; and $R^{21}$, where two or more $R^c$ groups may be taken together with intervening atoms to form one or more optionally substituted rings and, when two $R^c$ groups are attached to the same carbon atom, they may be taken together along with the carbon atom to which they are attached to form a moiety selected from the group consisting of: an optionally substituted 3- to 8-membered spirocyclic ring, a carbonyl, an oxime, a hydrazone, and an imine;

$R^d$ at each occurrence is independently selected from the group consisting of:

optionally substituted $C_1$ to $C_{12}$ aliphatic; optionally substituted 3- to 14-membered carbocycle; optionally substituted 3- to 14-membered heterocycle; $R^{20}$; and $R^{21}$, where two or more $R^d$ groups may be taken together with intervening atoms to form one or more optionally substituted rings; and ⌢ represents an optionally substituted moiety covalently linking two nitrogen atoms, where any of [$R^{2'}$ and $R^{3'}$], [$R^2$ and $R^3$], [$R^1$ and $R^2$], and [$R^{1'}$ and $R^{2'}$] may optionally be taken together with intervening atoms to form one or more rings which may in turn be substituted with one or more groups selected from $R^{14}$; $R^{20}$; and $R^{21}$; and where $R^{14}$ at each occurrence is independently selected from the group consisting of: halogen; optionally substituted $C_1$ to $C_{12}$ aliphatic; optionally substituted 3- to 14-membered carbocycle; optionally substituted 3- to 14-membered heterocycle; —$OR^{10}$; —$OC(O)R^{13}$; —$OC(O)OR^{13}$; —$OC(O)NR^{11}R^{12}$; —CN; —CNO; —$C(R^{13})_zH_{(3-z)}$; —$C(O)R^{13}$; —$C(O)OR^{13}$; —$C(O)NR^{11}R^{12}$; —$NR^{11}R^{12}$; —$NR^{11}C(O)R^{13}$; —$NR^{11}C(O)OR^{13}$; —$NR^{11}SO_2R^{13}$; —$NR^{11}R^{12}R^{13}X^-$; —$P^+(R^{11})_3X^-$; —$P(R^{11})_3=N^+=P(R^{11})_3X^-$; —$As^+R^{11}R^{12}R^{13}X^-$; —NCO; —$N_3$; —$NO_2$; —$S(O)_xR^{13}$; and —$SO_2NR^{11}R^{12}$, $R^{20}$ at each occurrence is independently selected from the group consisting of:

halogen; —$OR^{10}$; —$OC(O)R^{13}$; —$OC(O)OR^{13}$; —$N^+(R^{11})_3X^-$; —$P(R^{11})_3X^-$; —$P(R^{11})_3=N^+=P(R^{11})_3X^-$; —$As^+R^{11}R^{12}R^{13}X^-$; —$OC(O)NR^{11}R^{12}$; —CN; —CNO; —$C(O)R^{13}$; —$C(O)OR^{13}$; —$C(O)NR^{11}R^{12}$; —$C(R^{13})_zH_{(3-z)}$; —$NR^{11}R^{12}$; —$NR^{11}C(O)R^{13}$; —$NR^{11}C(O)OR^{13}$; —NCO; —$NR^{11}SO_2R^{13}$; —$S(O)_xR^{13}$; —$S(O)_2NR^{11}R^{12}$; —$NO_2$; —$N_3$; and —$Si(R^{13})_{(3-z)}[(CH_2)_kR^{14}]_z$, $R^{21}$ at each occurrence is independently selected from the group consisting of: —$(CH_2)_kR^{20}$; —$(CH_2)_k$—$Z^{11}$—$(CH_2)_kR^{20}$; —$C(R^{17})_zH_{(3-z)}$; —$(CH_2)_kC(R^{17})_zH_{(3-z)}$; —$(CH_2)_m$—$Z''$—$(CH_2)_mC(R^{17})_zH_{(3-z)}$; —$(CH_2)_k$—$Z''$—$R^{16}$;

$X^-$ is any anion, $Z''$ is a divalent linker selected from the group consisting of —(CH=CH)$_a$—; —(CH≡CH)$_a$—; —C(O)—; —C(=$NOR^{11}$)—; —C(=$NNR^{11}R^{12}$)—; —O—; —OC(O)—; —C(O)O—; —OC(O)O—; —$N(R^{11})$—; —$N(C(O)R^{13})$—; —$C(O)NR^{13}$—; —$N(C(O)R^{13})O$—; —$NR^{13}C(O)R^{13}N$—; —$S(O)_x$—; a polyether; and a polyamine, $R^{10}$ at each occurrence is independently selected from the group consisting of:

—H; optionally substituted $C_{1-12}$ aliphatic; an optionally substituted 3- to 14-membered carbocycle; an optionally substituted 3- to 14-membered heterocycle —$S(O)_2R^{13}$; —$Si(R^{15})_3$; —$C(O)R^{13}$; and a hydroxyl protecting group, $R^{11}$ and $R^{12}$ at each occurrence are independently selected from the group consisting of: —H; optionally substituted $C_1$ to $C_{12}$ aliphatic; an optionally substituted 3- to 14-membered carbocycle; an optionally substituted 3- to 14-membered heterocycle; where two or more $R^{11}$ or $R^{12}$ groups can optionally be taken together with intervening atoms to form an optionally substituted 3- to 10-membered ring, $R^{13}$ at each occurrence is independently selected from the group consisting of:

—H; optionally substituted $C_1$ to $C_{12}$ aliphatic; an optionally substituted 3- to 14-membered carbocycle; and optionally substituted 3- to 14-membered heterocycle, where two or more $R^{13}$ groups on the same molecule may optionally be taken together to form ring.

$R^{15}$ at each occurrence is independently selected from the group consisting of: optionally substituted $C_{1-12}$ aliphatic, an optionally substituted 3- to 14-membered carbocycle; and an optionally substituted 3- to 14-membered heterocycle, a is 1, 2, 3, or 4, k is independently at each occurrence an integer from 1 to 8, inclusive, m is 0 or an integer from 1 to 8, inclusive, q is 0 or an integer from 1 to 5, inclusive, x is 0, 1, or 2, and z is 1, 2, or 3.

In certain embodiments, of complexes 1 through 4, ⌢ is selected from the group consisting of a $C_{3-14}$ carbocycle, a $C_{6-10}$ aryl group, a 3- to 14-membered heterocycle, and a 5- to 10-membered heteroaryl group; a polyether group, or an optionally substituted $C_{2-20}$ aliphatic group, wherein one or more methylene units are optionally and independently replaced by —$NR^y$—, —$N(R^y)C(O)$—, —$C(O)N(R^y)$—, —$OC(O)N(R^y)$—, —$N(R^y)C(O)O$—, —$OC(O)O$—, —O—, —C(O)—, —OC(O)—, —C(O)O—, —S—, —SO—, —$SO_2$—, —C(=S)—, —C(=$NR^y$)—, —C(=$NOR^y$)— or —N=N—.

In some embodiments, one or more of the substituents on metal complexes 1 through 9' is an activating moiety —⌇(Z)$_p$, where "—⌇" represents a covalent linker containing one or more atoms selected from the group consisting of C, O, N, S, and Si; "Z" is an activating functional group having co-catalytic activity in epoxide $CO_2$ copolymerization, and p is an integer from 1 to 4 indicating the number of individual activating functional groups present on a given activating moiety.

In certain embodiments, the linker moiety "—⌇" is as described in co-pending PCT application number PCT/US09/54773. In some embodiments, the one or more Z group(s) present on the activating moiety is independently selected from the group consisting of PPN$^+$ derivatives (—$PR_2$=$N^+$=$PR_3$); ammonium salts; phosphonium salts; or an optionally substituted N-linked imidazolium, thiazolium, or oxazolium group. In certain embodiments, a Z group is an optionally substituted N-linked piperidine or N-linked pyrrolidine. In some embodiments, a Z group is an optionally substituted guanidine. In other embodiments, a Z group is any of those described in PCT/US09/54773.

In some embodiments, provided metal complexes have a structure selected from the group consisting of:

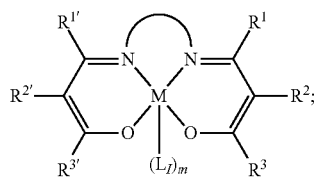

-continued

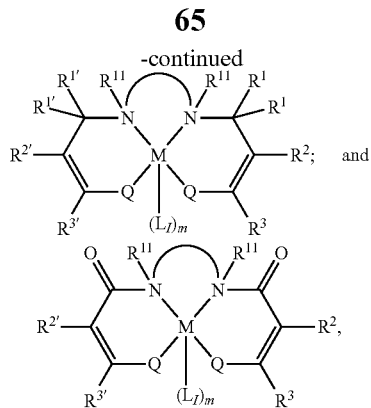

wherein:

M, $L_I$, m $R^1$, $R^{1'}$, $R^2$, $R^{2'}$, $R^3$, $R^{3'}$ and $R^{11}$ are as defined above.

In some embodiments, a permanent ligand set is a salen ligand. In certain embodiments, a metal complex is a metallosalenate. In certain embodiments, a metal complex is a cobalt salen complex. In certain embodiments, a metal complex is a chromium salen complex. In other embodiments, a metal complex is an aluminum salen complex.

In certain embodiments, metal complexes of the present invention have the formula:

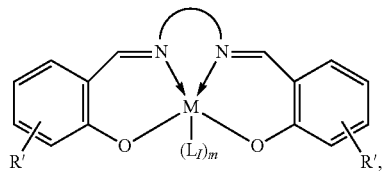

I wherein:

M is the metal atom;

$L_I$ is a nucleophile capable of ring opening an epoxide;

m is an integer from 0-2 inclusive; and

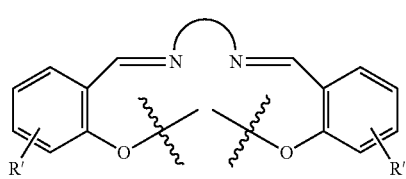

is the permanent ligand set;

wherein ⌒ is as defined previously and each R' independently represents one or more substituents optionally present on the phenyl rings.

In certain embodiments, each R' is independently an $R^d$ group or a —⁓$(Z)_p$ group, where two or more adjacent R' groups can be taken together to form an optionally substituted saturated, partially unsaturated, or aromatic 3- to 12-membered ring containing 0 to 4 heteroatoms, In certain embodiments, the ⌒ moiety is selected from the group consisting of:

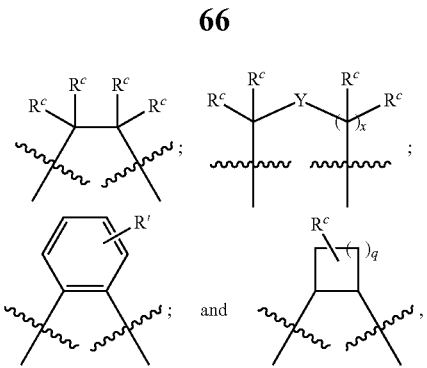

where $R^c$ and R' are as previously defined,

Y is a divalent linker selected from the group consisting of: —N($R^{11}$)—; —O—; —S(O)$_x$—; —(CH$_2$)$_k$—; —C(O)—; —C(=NO$R^{10}$)—; —C($R^c$)$_x$H$_{2-x}$—; a polyether; an optionally substituted 3- to 8-membered carbocycle; and an optionally substituted 3- to 8-membered heterocycle, q is 0 or an integer from 1 to 5 inclusive, and x is 0, 1, or 2, In certain embodiments provided metal complexes have a structure selected from the group consisting of:

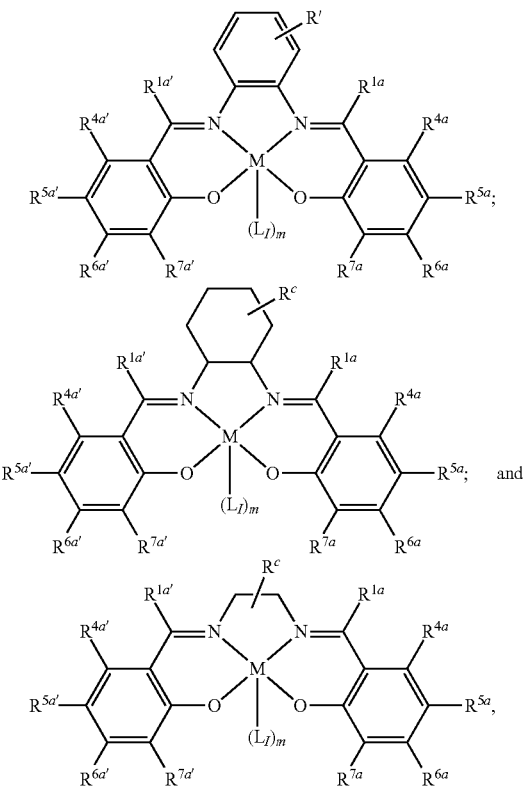

wherein:

M, $R^c$, R', $L_I$, and m are as defined above;

$R^{4a}$, $R^{4a'}$, $R^{5a}$, $R^{5a'}$, $R^{6a}$, $R^{6a'}$, $R^{7a}$, and $R^{7a'}$ are each independently hydrogen, a —⁓$(Z)_p$ group, halogen, —NO$_2$, —CN, —S$R^{13}$, —S(O)$R^{13}$, —S(O)$_2R^{13}$, —N$R^{11}$C(O)$R^{13}$, —OC(O)$R^{13}$, —CO$_2R^{13}$, —NCO, —N$_3$, —O$R^{10}$, —OC(O)N$R^{11}R^{12}$, —Si($R^{13}$)$_3$, —N$R^{11}R^{12}$, —N$R^{11}$C(O)$R^{13}$, and —N$R^{11}$C(O)O$R^{13}$;

or an optionally substituted radical selected from the group consisting of $C_{1-20}$ aliphatic; $C_{1-20}$ heteroaliphatic; 6- to 10-membered aryl; 5- to 10-membered heteroaryl; and 3- to 7-membered heterocyclic, where [Ria and $R^{4a}$], [$R^{1a'}$ and $R^{4A'}$] and any two adjacent $R^{4a}$, $R^{4a'}$, $R^{5a}$, $R^{5a'}$, $R^{6a}$, $R^{6a'}$, $R^{7a}$, and $R^{7a'}$ groups can be taken together with intervening atoms to form one or more optionally substituted rings optionally containing one or more heteroatoms;

n is 0 or an integer from 1 to 8, inclusive; and p is 0 or an integer from 1 to 4, inclusive.

In some embodiments, $R^{1a}$, $R^{1a'}$, $R^{4a}$, $R^{4a'}$, $R^{6a}$, and $R^{6a'}$ are each —H. In some embodiments, $R^{5a}$, $R^{5a'}$, $R^{7a}$ and $R^{7a'}$ are each optionally substituted $C_1$-$C_{12}$ aliphatic. In some embodiments, $R^{4a}$, $R^{4a'}$, $R^{5a}$, $R^{5a'}$, $R^{6a}$, $R^{6a'}$, $R^{7a}$, and $R^{7a'}$ are each independently selected from the group consisting of: —H, —$SiR_3$; methyl, ethyl, n-propyl, i-propyl, n-butyl, sec-butyl, t-butyl, isoamyl, t-amyl, thexyl, and trityl. In some embodiments, $R^{1a}$, $R^{1a'}$, $R^{4a}$, $R^{4a'}$, $R^{6a}$, and $R^{6a'}$ are each —H. In some embodiments, $R^{7a}$ is selected from the group consisting of —H; methyl; ethyl; n-propyl; i-propyl; n-butyl; sec-butyl; t-butyl; isoamyl; t-amyl; thexyl; and trityl. In some embodiments, $R^{5a}$ and $R^{7a}$ are independently selected from the group consisting of —H; methyl; ethyl; n-propyl; i-propyl; n-butyl; sec-butyl; t-butyl; isoamyl; t-amyl; thexyl; and trityl. In certain embodiments, one or more of $R^{5a}$, $R^{5a'}$, $R^{7a}$ and $R^{7a'}$ is a —⁓⁓(Z)$_p$ (Z) group. In some embodiments, $R^{5a}$ and $R^{5a'}$ are each a —⁓⁓(Z)$_p$ group. In some embodiments, $R^{5a}$ is a —⁓⁓(Z)$_p$ group and $R^{5a'}$ is $C_{1-8}$ aliphatic. In some embodiments, $R^{7a}$ and $R^{7a'}$ are each a —⁓⁓(Z)$_p$ group. In some embodiments, $R^{7a}$ is a —⁓⁓(Z)$_p$ group and $R^{7a'}$ is $C_{1-8}$ aliphatic.

In certain embodiments, provided metal complexes have a structure selected from the group consisting of:

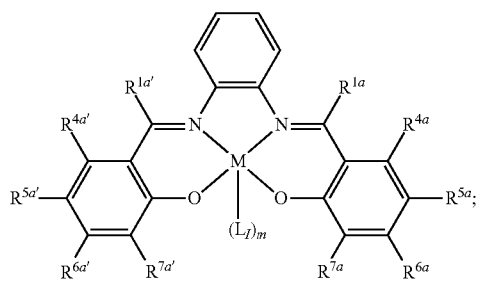

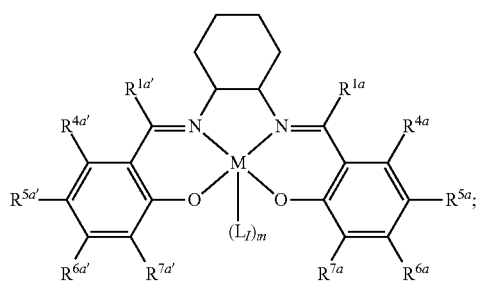

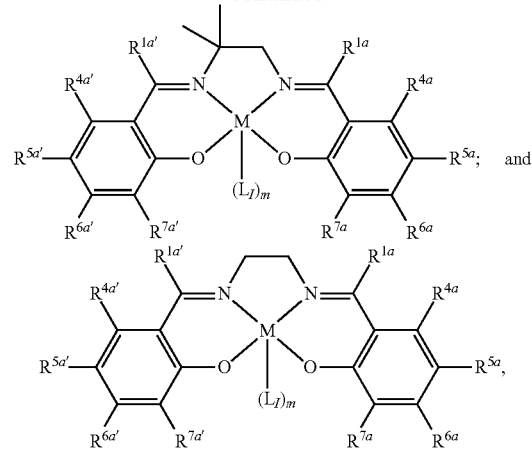

where $R^{1a}$ through $R^{7a'}$ are as defined above.

In certain embodiments, provided metal complexes have a structure selected from the group consisting of:

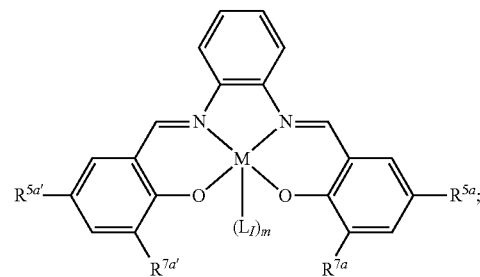

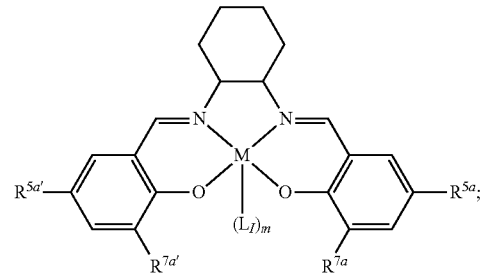

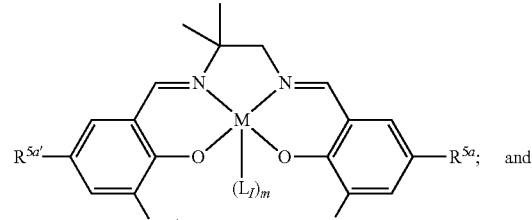

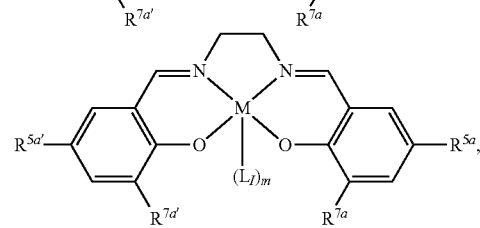

where $R^{5a}$, $R^{5a'}$, $R^{7a}$, and $R^{7a'}$ are as defined above. In certain embodiments, each pair of substituents on the salicaldehyde portions of the complexes above are the same (i.e. $R^{5a}$ & $R^{5a'}$ are the same and $R^{7a}$ & $R^{7a'}$ are the same). In other embodiments, at least one of $R^{5a}$ & $R^{5a'}$ or $R^{7a}$ & $R^{7a'}$ are different from one another.

In certain embodiments, a metal complex has formula III:

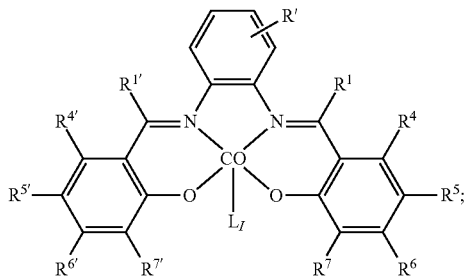

III

In certain embodiments, a metal complex has formula IV:

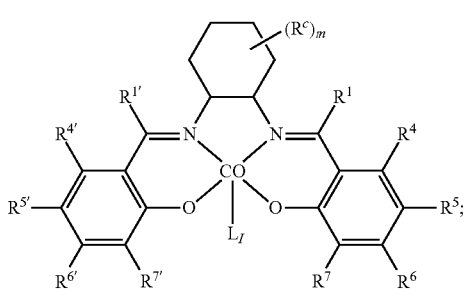

IV

In certain embodiments, wherein a metal complex has formula V:

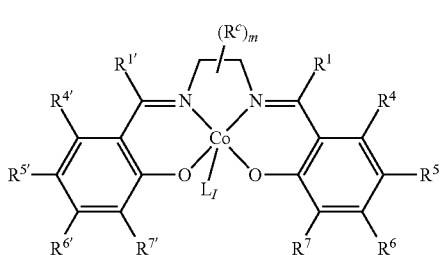

V wherein:
  $R^c$, $R^d$, $L_I$, m, and q are as described above, and
  $R^4$, $R^{4'}$, $R^5$, $R^{5'}$, $R^6$, $R^{6'}$, $R^7$, and $R^{7'}$ are each independently selected from the group consisting of: —H; —$R^{20}$; —$R^{21}$; optionally substituted $C_1$-$C_{12}$ aliphatic; optionally substituted 3- to 14-membered carbocycle; and optionally substituted 3- to 14-membered heterocycle;
  where [$R^1$ and $R^4$], [$R^{1'}$ and $R^{4'}$] and any two adjacent $R^4$, $R^{4'}$, $R^5$, $R^{5'}$, $R^6$, $R^{6'}$, $R^7$, and $R^{7'}$ groups can optionally be taken together with intervening atoms to form one or more rings optionally substituted with one or more $R^{20}$ groups.

In certain embodiments, wherein a metal complex has formula III, $R^1$, $R^{1'}$, $R^4$, $R^{4'}$, $R^6$, and $R^{6'}$ are each —H. In certain embodiments, wherein a metal complex has formula III, $R^5$, $R^{5'}$, $R^7$ and $R^{7'}$ are each optionally substituted $C_1$-$C_{12}$ aliphatic.

In certain embodiments, wherein a metal complex has formula III, $R^4$, $R^{4'}$, $R^5$, $R^{5'}$, $R^6$, $R^{6'}$, $R^7$, and $R^{7'}$ are each independently selected from the group consisting of: —H, —Si($R^{13}$)$_3$; —Si [(CH$_2$)$_k$R$^{22}$]$_z$(R$^{13}$)$_{(3-z)}$; methyl, ethyl, n-propyl, i-propyl, n-butyl, sec-butyl, t-butyl, isoamyl, t-amyl, thexyl, trityl, —C(CH$_3$)Ph$_2$, —(CH$_2$)$_p$C[(CH$_2$)$_p$R$^{22}$]$_z$H$_{(3-z)}$, and —Si(R$^{13}$)$_{(3-z)}$[(CH$_2$)$_k$R$^{22}$], where p is an integer from 0 to 12 inclusive and $R^{22}$ is selected from the group consisting of: a heterocycle; an amine; a guanidine; —N$^+$(R$^{11}$)$_3$X$^-$; —P$^+$(R$^{11}$)$_3$X$^-$; —P(R$^{11}$)$_2$=N$^+$=P(R$^{11}$)$_3$X$^-$; —As$^+$(R$^{11}$)$_3$X$^-$, and optionally substituted pyridinium.

In certain embodiments, wherein a metal complex has formula III, $R^7$ is selected from the group consisting of —H; methyl; ethyl; n-propyl; i-propyl; n-butyl; sec-butyl; t-butyl; isoamyl; t-amyl; thexyl; and trityl; and $R^5$ is selected from the group consisting of —(CH$_2$)$_p$CH$_{(3-2)}$[(CH$_2$)$_p$R$^{22}$]$_z$ and —Si(R$^{13}$)$_{(3-z)}$[(CH$_2$)$_k$R$^{22}$]$_z$.

In certain embodiments, a metal complex has formula IV, $R^1$, $R^{1'}$, $R^4$, $R^{4'}$, $R^6$, and $R^{6'}$ are each —H. In certain embodiments, wherein the complex is a metallosalenate complex of formula IV, $R^5$, $R^{5'}$, $R^7$ and $R^{7'}$ are each optionally substituted $C_1$-$C_{12}$ aliphatic.

In certain embodiments, wherein a metal complex has formula IV, $R^4$, $R^{4'}$, $R^5$, $R^{5'}$, $R^6$, $R^{6'}$, $R^7$, and $R^{7'}$ are each independently selected from the group consisting of: —H, —Si(R$^{13}$)$_3$; —Si(R$^{13}$)$_{(3-z)}$[(CH$_2$)$_k$R$^{22}$]$_z$; methyl, ethyl, n-propyl, i-propyl, n-butyl, sec-butyl, t-butyl, isoamyl, t-amyl, thexyl, trityl, —(CH$_2$)$_p$C[(CH$_2$)$_p$R$^{22}$]$_z$H$_{(3-z)}$.

In certain embodiments, wherein a metal complex has formula IV, $R^7$ is selected from the group consisting of —H; methyl; ethyl; n-propyl; i-propyl; n-butyl; sec-butyl; t-butyl; isoamyl; t-amyl; thexyl; and trityl; and $R^5$ is selected from the group consisting of —(CH$_2$)$_p$CH$_{(3-z)}$[(CH$_2$)$_p$R$^{22}$]$_z$ and —Si(R$^{13}$)$_{(3-z)}$[(CH$_2$)$_k$R$^{22}$]$_z$.

In certain embodiments, wherein a metal complex has formula V, $R^1$, $R^{1'}$, $R^4$, $R^{4'}$, $R^6$, and $R^{6'}$ are each —H. In certain embodiments, wherein a complex is a metallosalenate complex of formula V, $R^5$, $R^{5'}$, $R^7$ and $R^{7'}$ are each optionally substituted $C_1$-$C_{12}$ aliphatic.

In certain embodiments, wherein a metal complex has formula V, $R^4$, $R^{4'}$, $R^5$, $R^{5'}$, $R^6$, $R^{6'}$, $R^7$, and $R^{7'}$ are each independently selected from the group consisting of: —H, —Si(R$^{13}$)$_3$; —Si [(CH$_2$)$_k$R$^{21}$]$_z$(R$^{13}$)$_{(3-z)}$; methyl, ethyl, n-propyl, i-propyl, n-butyl, sec-butyl, t-butyl, isoamyl, t-amyl, thexyl, trityl, —(CH$_2$)$_p$CH$_{(3-z)}$[(CH$_2$)$_p$R$^{22}$]$_z$ and —Si(R$^{13}$)$_{(3-z)}$[(CH$_2$)$_k$R$^{22}$]$_z$.

In certain embodiments, wherein a metal complex has formula V, $R^7$ is selected from the group consisting of —H; methyl; ethyl; n-propyl; i-propyl; n-butyl; sec-butyl; t-butyl; isoamyl; t-amyl; thexyl; and trityl; and $R^5$ is selected from the group consisting of —(CH$_2$)$_p$CH$_{(3-z)}$[(CH$_2$)$_p$R$^{22}$]$_z$ and —Si(R$^{13}$)$_{(3-z)}$[(CH$_2$)$_k$R$^{22}$]$_z$.

In some embodiments, a metal complex has a structure $L_p$-M-($L_I$)$_m$, where $L_p$-M is selected from the group consisting of:

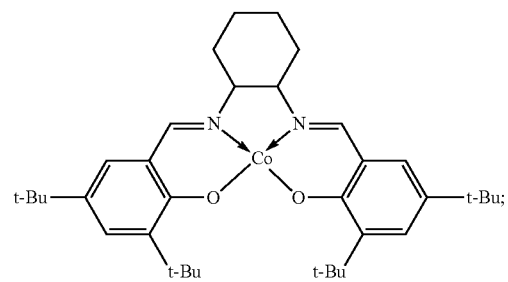

-continued
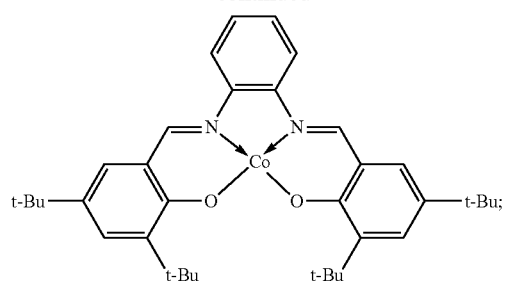
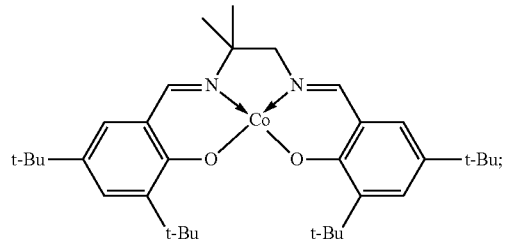
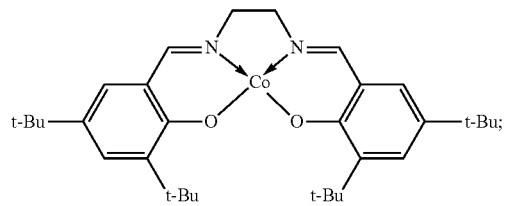
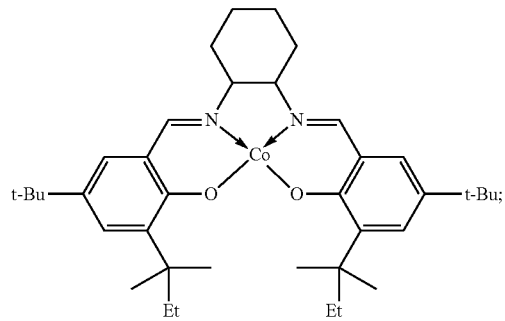
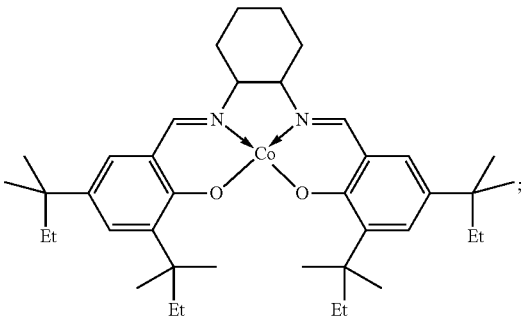
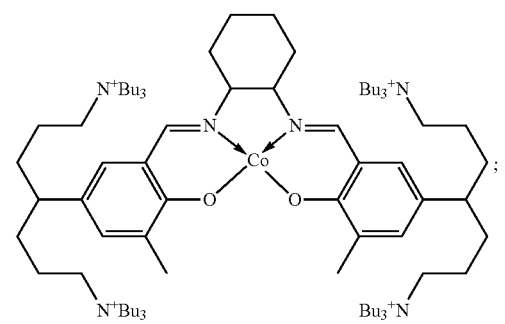
-continued
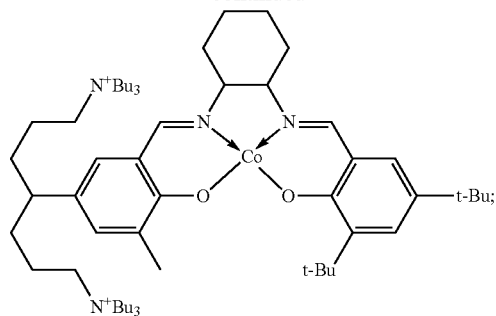
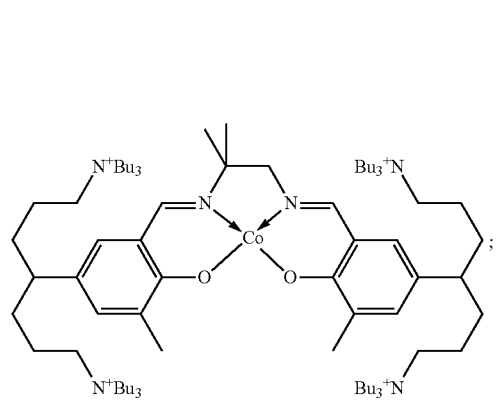
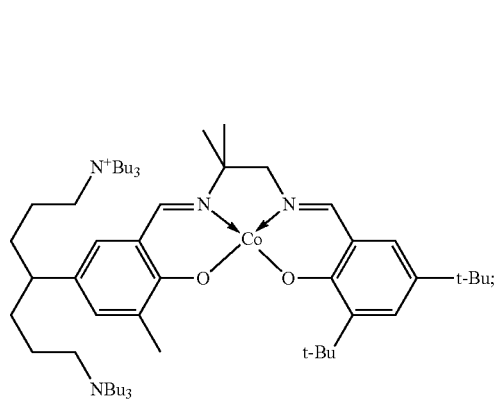
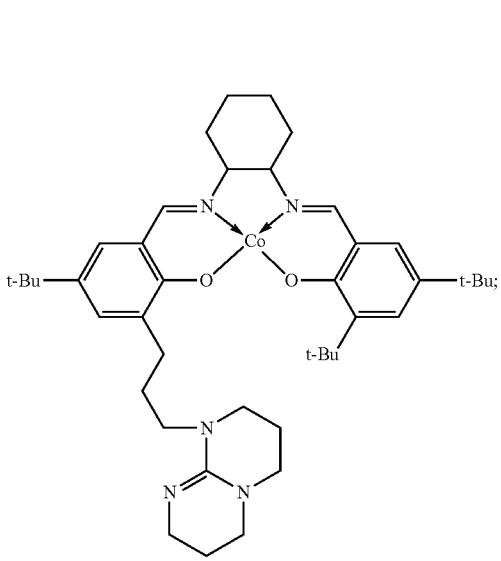

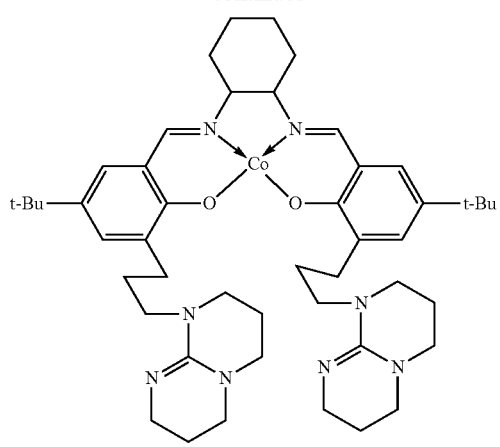

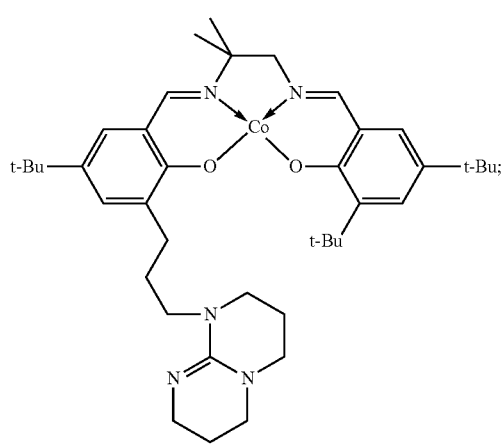

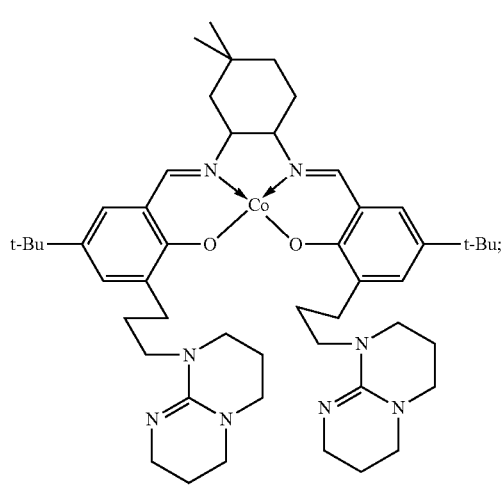

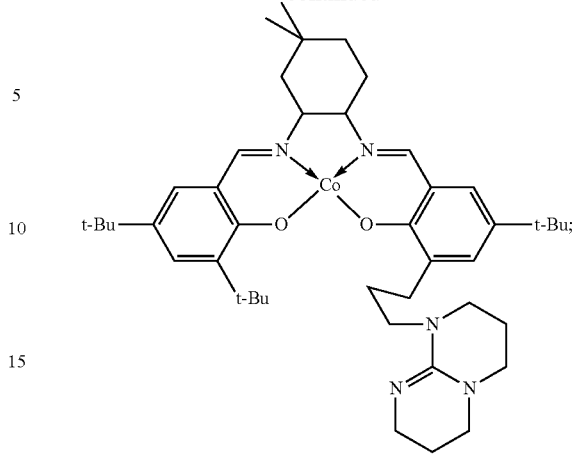

In other embodiments, the permanent ligand set comprises a porphyrin ring and $L_p$-M has the structure:

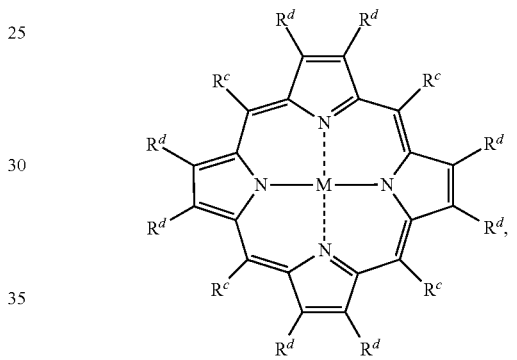

wherein:
M, $L_p$, $R^c$, and $R^d$ are as defined above and any two adjacent $R^c$ or $R^d$ groups can be taken together to form one or more rings optionally substituted with one or more $R^{20}$ groups In certain embodiments where the permanent ligand set comprises a porphyrin ring, M is a metal atom selected from the group consisting of: cobalt; chromium; aluminum; titanium; ruthenium, and manganese.

As noted above, in some embodiments herein, the permanent ligand set may comprise a plurality of discrete ligands. In certain embodiments the permanent ligand set includes two bidentate ligands. In certain embodiments, such bidentate ligands may have the structure

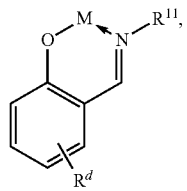

where $R^d$ and $R^{11}$ are as defined hereinabove. Metal complexes having two such ligands may adopt one of several geometries, and the present disclosure encompasses complex having any of the possible geometries, as well as mixtures of two or more geometrical isomers.

In certain embodiments, metal complexes including two bidentate ligands may have structures selected from the group consisting of:

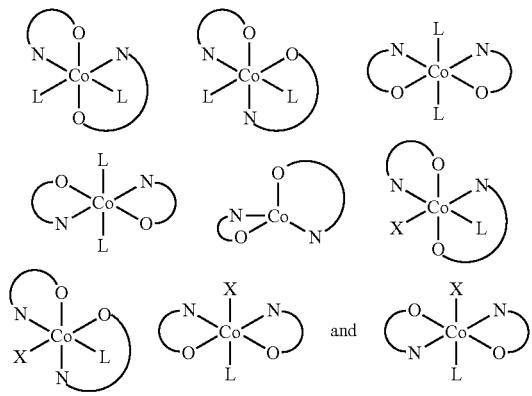

where each

represents a ligand:

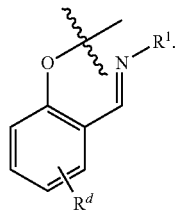

Other Embodiments

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A surface active agent comprising an aliphatic polycarbonate and a hydrocarbon moiety linked through an oxygen atom, the surface active agent comprising a compound of the formula:

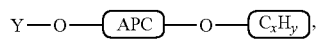

where the moiety

comprises an alternating copolymer of $CO_2$ and one or more epoxides;
the moiety

comprises a saturates or unsaturated hydrocarbon and is a terminal group in the compound; and
—Y is selected from the group consisting of —H, optionally substituted $C_{1-12}$ aliphatic, optionally substituted aryl, optionally substituted $C_{1-12}$ acyl, —$SO_2R$, —$SiR_3$, and a polyether chain, where R is, independently at each occurrence, optionally substituted aryl or optionally substituted $C_{1-12}$ aliphatic.

2. The surface active agent of claim 1, wherein the moiety

comprises repeating units having a structure:

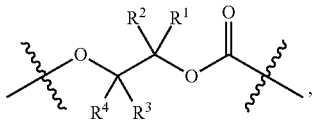

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with any intervening atoms to form one or more optionally substituted rings optionally containing one or more heteroatoms.

3. The surface active agent of claim 1, wherein the moiety

is derived from copolymerization of carbon dioxide with ethylene oxide, propylene oxide, 1,2 butene oxide, 2,3 butene oxide, 1,2 hexene oxide, oxides of higer alpha olefins (e.g. $C_{7-40}$ alpha olefins), butadiene monoepoxide, epichlorohydrin, ethers or esters of glycidol, cyclopentene oxide, cyclohexene oxide, 3 vinyl cyclohexene oxide, 3-ethyl cyclohexene oxide, limonene oxide, or combinations of any two or more of these.

4. The surface active agent of claim 1, having a formula:

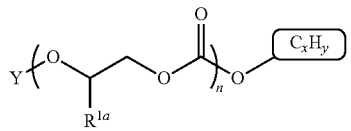

where n is an integer from 1 to 50, and
$R^{1a}$ is, independently at each occurrence in the polymer chain, selected from the group consisting of —H, —$CH_3$, —$CH_2CH_3$, —$CH_2Cl$, —$CH_2OR^x$, —$CH_2OC$ (O)R$^x$, and —(CH$_2$)$_q$CH$_3$, where each R$^x$ is independently an optionally substituted moiety selected from the group consisting of C$_{1-20}$ aliphatic, C$_{1-20}$ heteroaliphatic, 3- to 14-membered carbocyclic, 6- to 10-membered aryl, 5- to 10-membered heteroaryl, and 3- to 12-membered heterocyclic, and q is an integer from 2 to 40.

5. The surface active agent of claim 4 wherein R$^{1a}$ is, independently at each occurrence in the polymer chain, selected from the group consisting of —H, methyl, and ethyl.

6. The surface active agent of claim 5, wherein R$^{1a}$ is, at each occurrence,
methyl; or
wherein R$^{1a}$ is, at each occurrence, hydrogen; or
wherein R$^{1a}$ is, at each occurrence, ethyl.

7. The surface active agent of claim 4, wherein n is between 3 and 5; or
wherein n is between 5 and 10; or
wherein n is between 10 and 15; or
wherein n is between 15 and 25; or
wherein n is between 20 and 50.

8. The surface active agent of claim 1 wherein the moiety

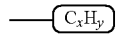

is a saturated hydrocarbon.

9. The surface active agent of claim 8, wherein the saturated hydrocarbon contains 6 to 12 carbon atoms; or
wherein the saturated hydrocarbon contains 8 to 18 carbon atoms; or
wherein the saturated hydrocarbon contains 12 to 24 carbon atoms; or
wherein the saturated hydrocarbon contains 20 to 30 carbon atoms; or
wherein the saturated hydrocarbon contains 30 to 40 carbon atoms.

10. The surface active agent of claim 9, wherein the saturated hydrocarbon comprises a branched hydrocarbon; or
wherein the saturated hydrocarbon comprises a straight chain hydrocarbon; or
wherein the saturated hydrocarbon comprises a cyclic hydrocarbon.

11. The surface active agent of claim 2, having a formula:

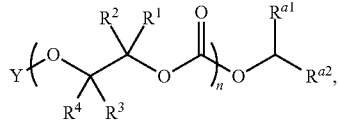

where R$^{a1}$ and R$^{a2}$ are each independently a C$_{2-12}$ aliphatic group, and n is an integer of from 1 to 50.

12. The surface active agent of claim 8, wherein the moiety is

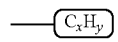

is derived from an aliphatic alcohol having between 6 and 20 carbon atoms.

13. The surface active agent of claim 4, wherein the moiety

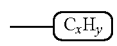

is selected from the group consisting of:

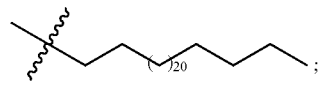

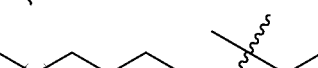

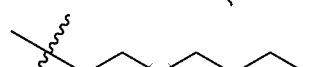

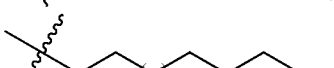

or
wherein the moiety

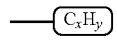

is selected from the group consisting of:

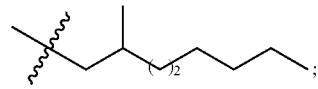

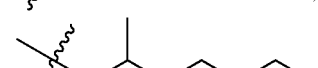

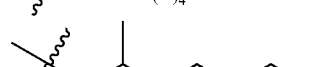

-continued
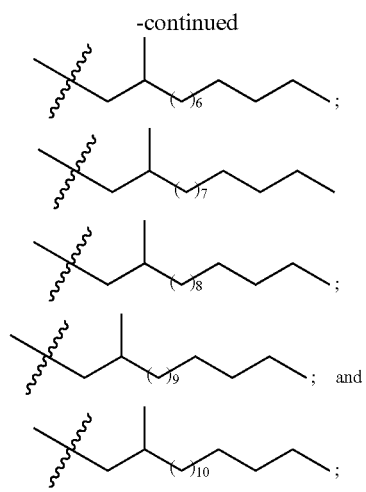
or
wherein the moiety
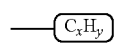
is selected from the group consisting of:
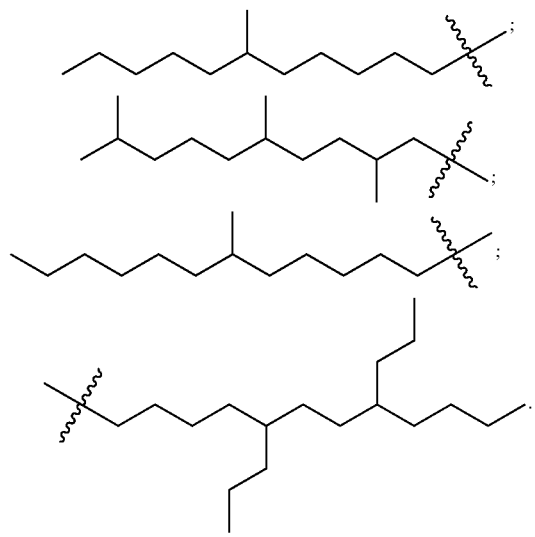
14. The surface active agent of claim 1, comprising a compound selected from the group consisting of:
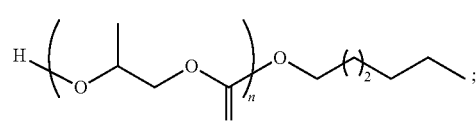
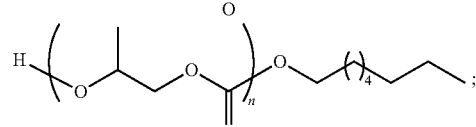
-continued
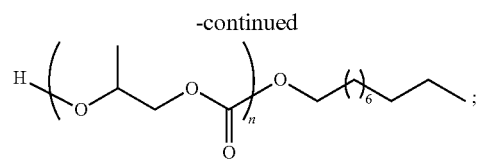
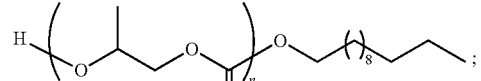
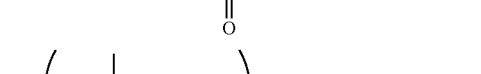
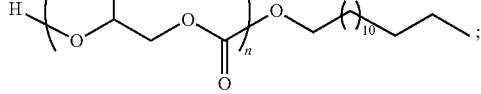
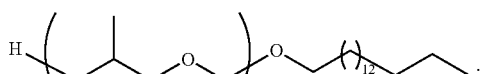
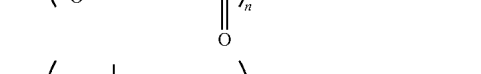
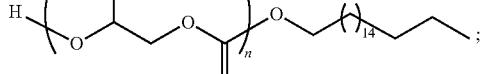
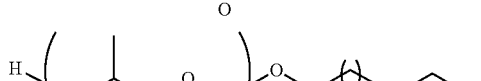
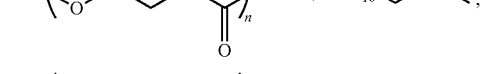
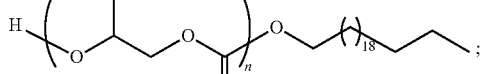
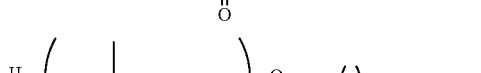
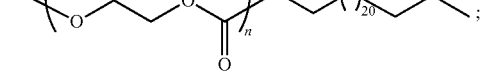
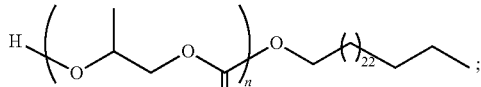
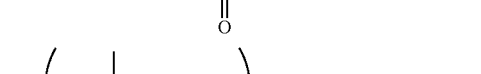
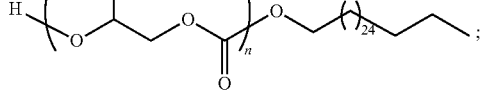
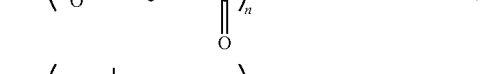
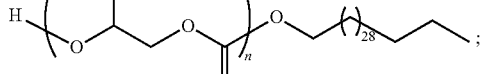
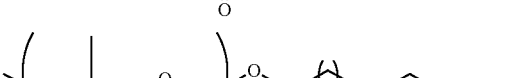

-continued
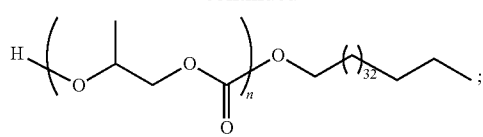
or selected from the group consisting of:
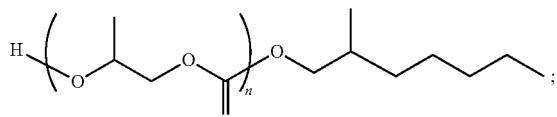
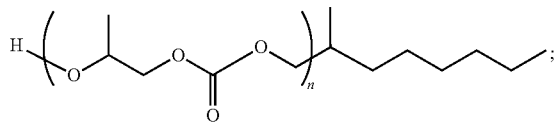
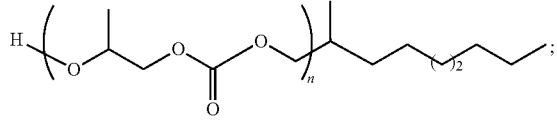
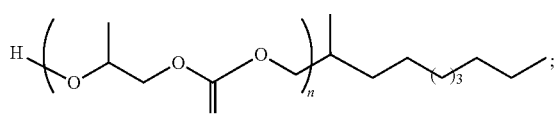
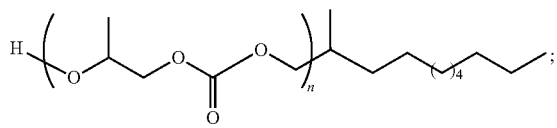
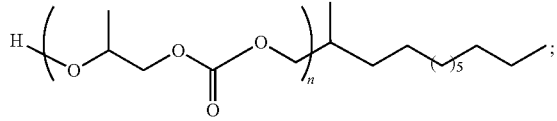
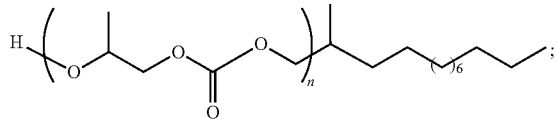
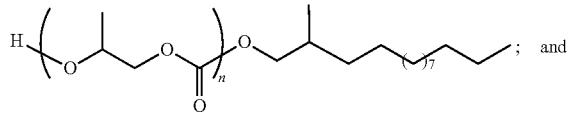
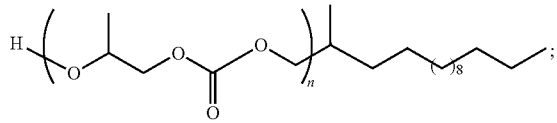
or selected from the group consisting of:
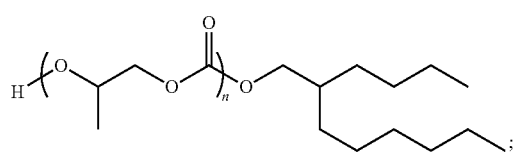
-continued
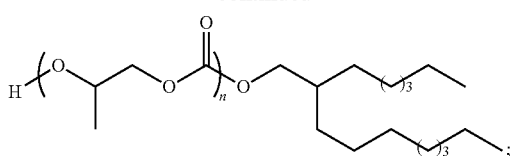
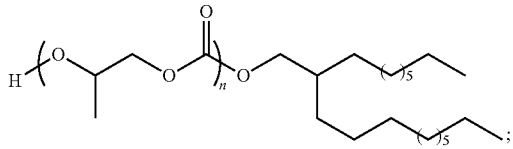
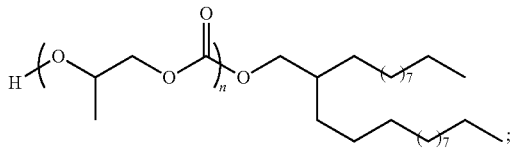
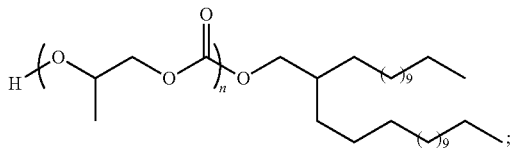
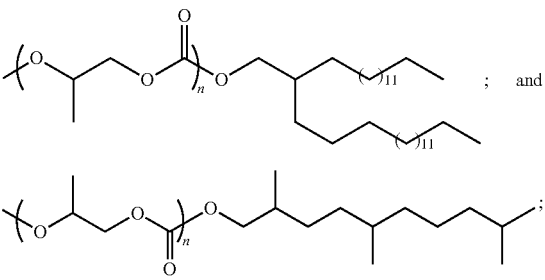
or selected from the group consisting of:
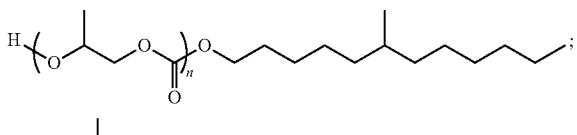
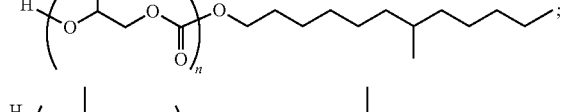
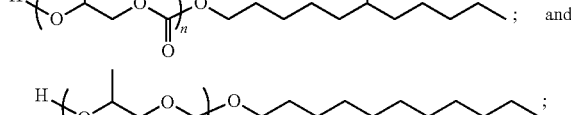
or selected from the group consisting of:
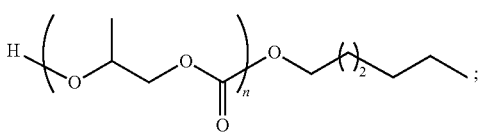

83
-continued
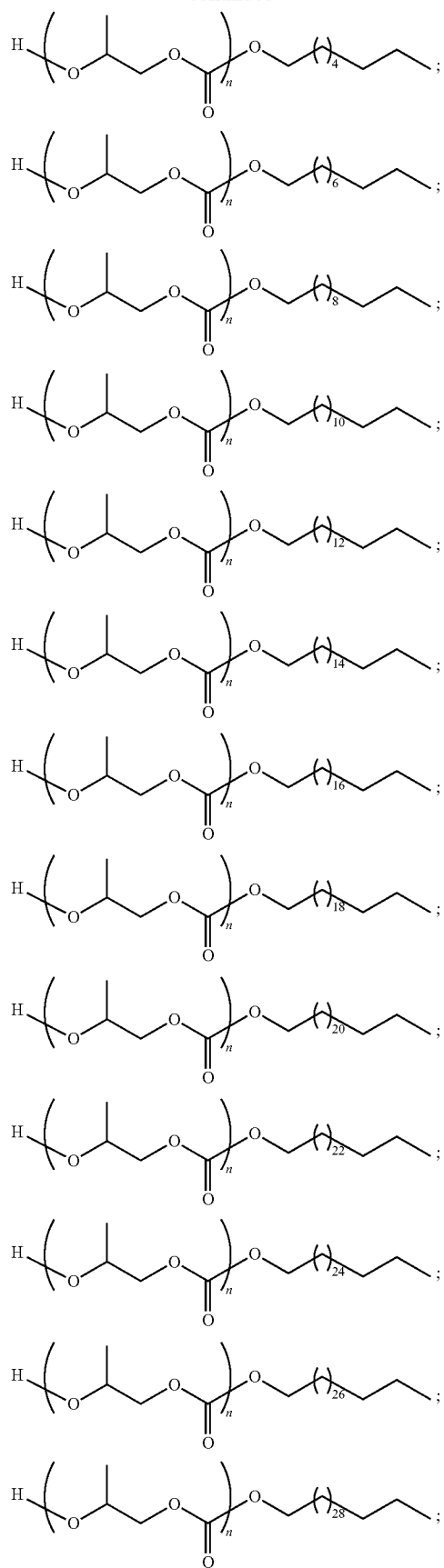
84
-continued
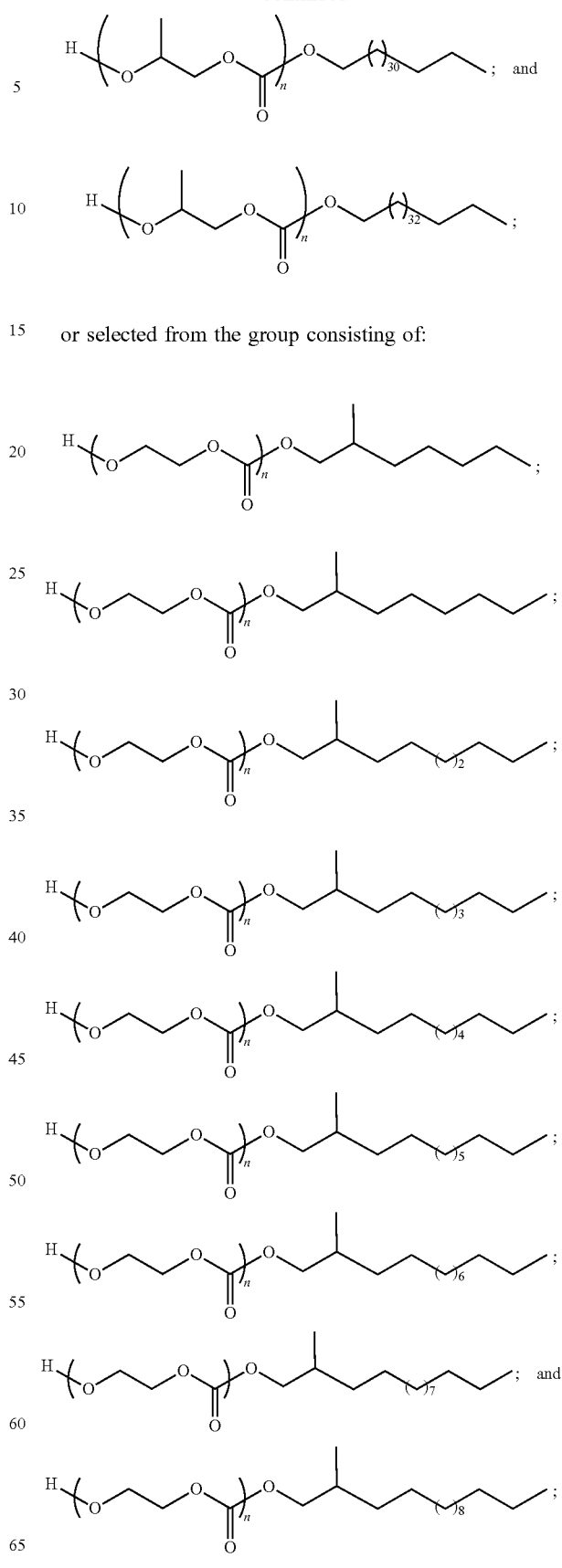
or selected from the group consisting of:

or selected from the group consisting of:
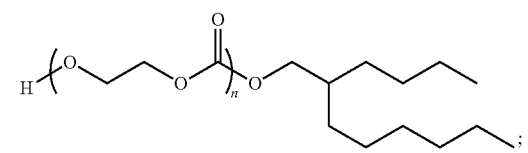
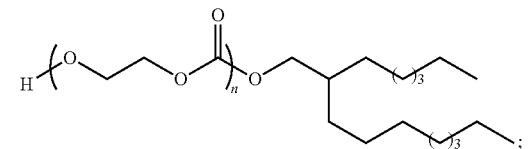
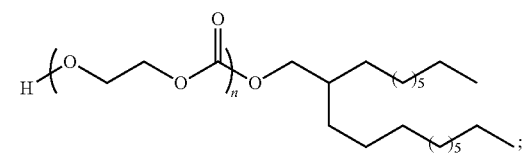
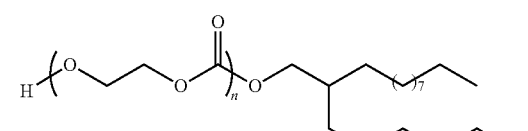
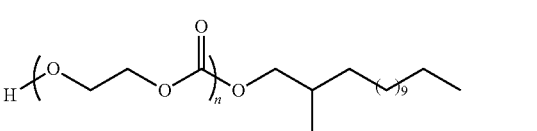
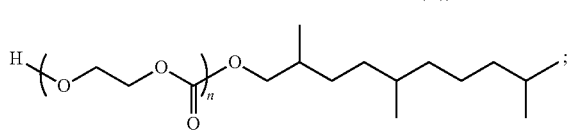; and
or selected from the group consisting of:
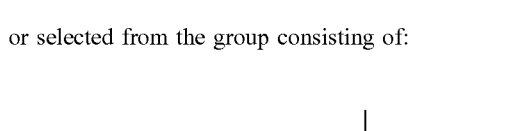
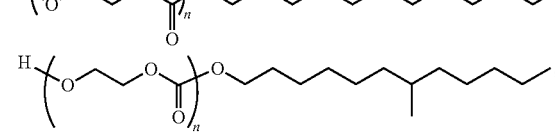
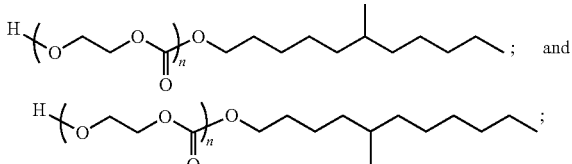; and
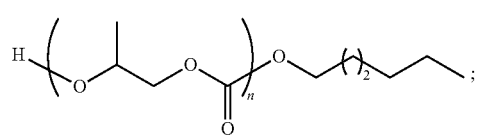;
or selected from the group consisting of:
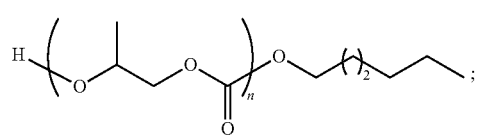
-continued
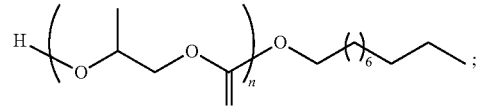
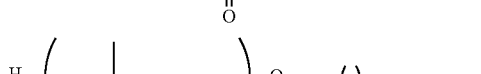
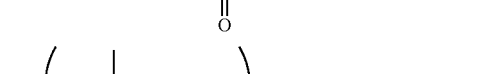
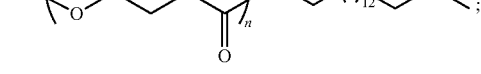
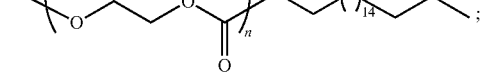
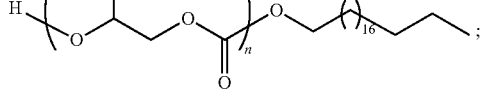
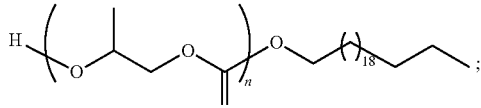
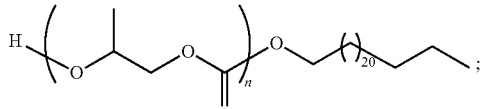
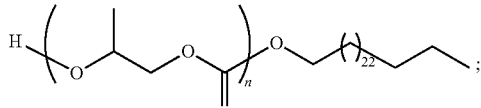
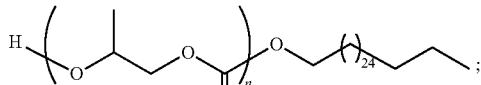
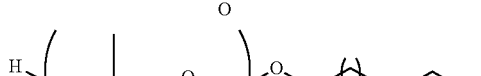

-continued
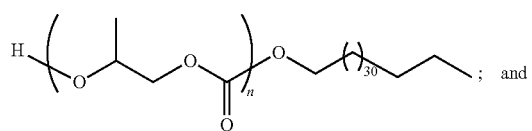 ; and
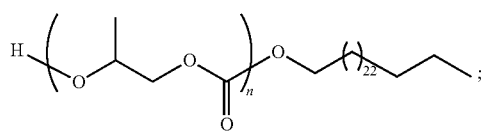 ;
or selected from the group consisting of:
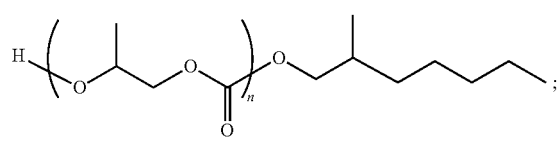 ;
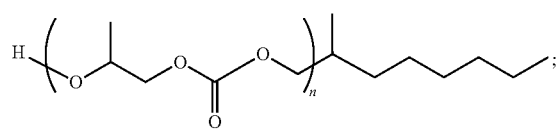 ;
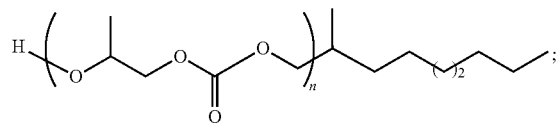 ;
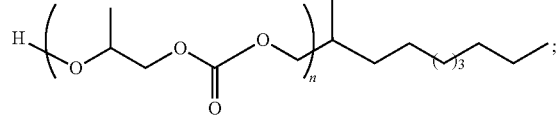 ;
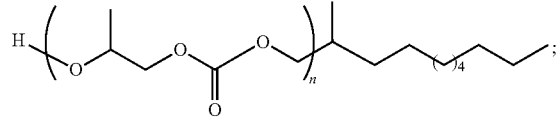 ;
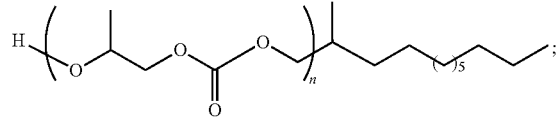 ;
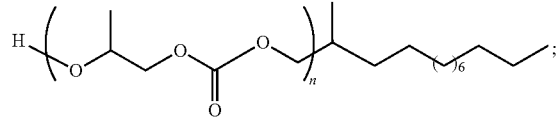 ;
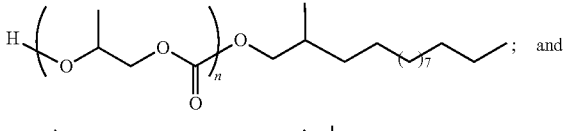 ; and
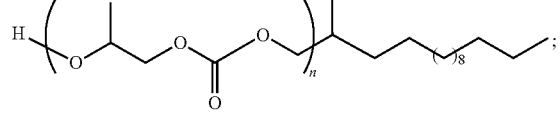 ;
or selected from the group consisting of:
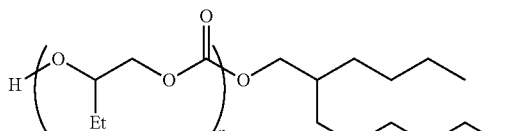 ;
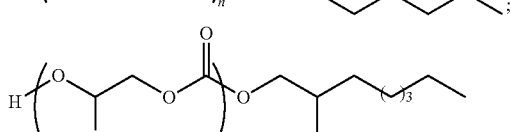 ;
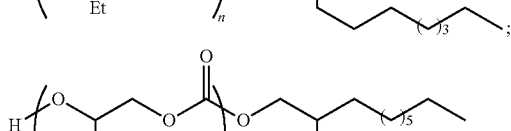 ;
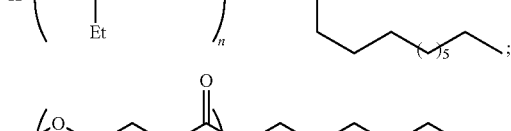 ;
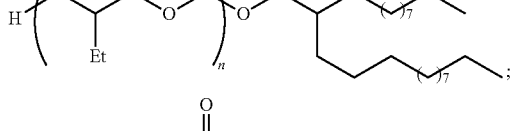 ;
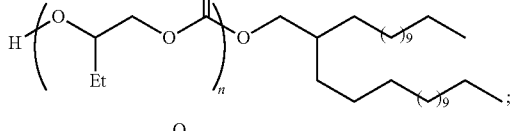 ; and
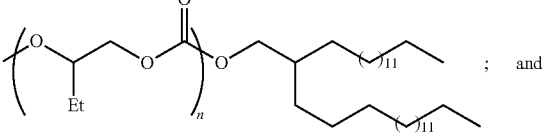 ;
or selected from the group consisting of:
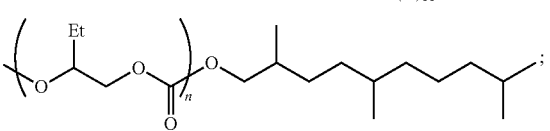 ;
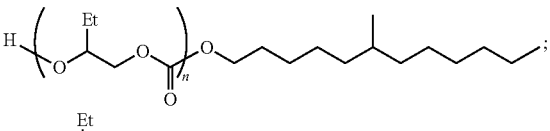 ;
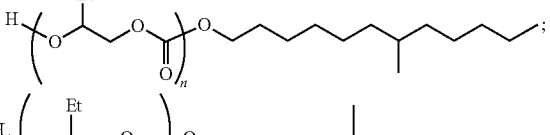 ; and
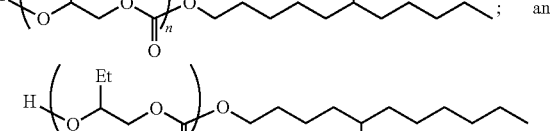 ;
wherein for any of the compounds n is, on average, between 2 and 5; or wherein for any of the compounds n is, on average, between 5 and 10; or wherein for any of the compounds n is, on average, between 10 and 15; or wherein for any of the compounds n is, on average, between 15 and 20; or wherein for any of the compounds n is, on average, between 20 and 30.

15. A method of modifying the viscosity of condensed phase $CO_2$ comprising the step of dissolving in the $CO_2$ the surface active agent of claim 4.

16. A method for enhanced oil recovery comprising the step of contacting an oil-containing geological formation with a $CO_2$ solution of the surface active agent of claim 4.

* * * * *

UNITED STATES PATENT AND TRADEMARK OFFICE
CERTIFICATE OF CORRECTION

PATENT NO. : 10,011,758 B2  
APPLICATION NO. : 14/912636  
DATED : July 3, 2018  
INVENTOR(S) : Kurt McWilliams et al.

Page 1 of 4

It is certified that error appears in the above-identified patent and that said Letters Patent is hereby corrected as shown below:

In the Claims

Column 81, Lines 16-56, Claim 14, please replace:

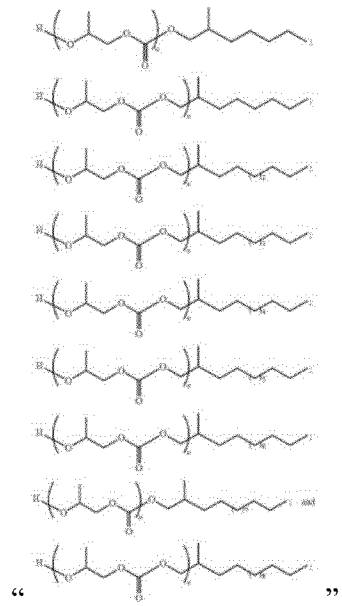

"

"

With:

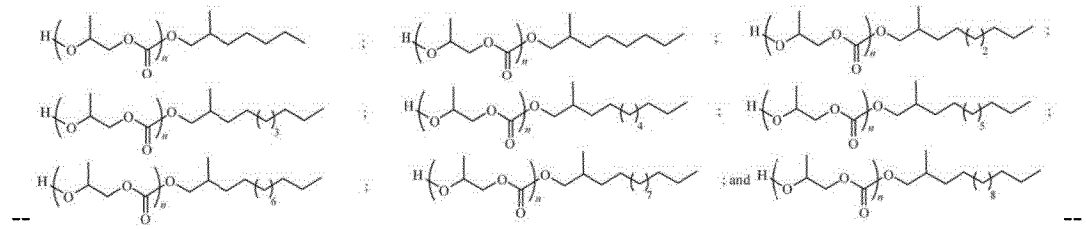

--                                                                                                                                                                                                                                                                                                    --

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*

Column 82, Line 61 through Column 84, Line 14, Claim 14, please replace:
"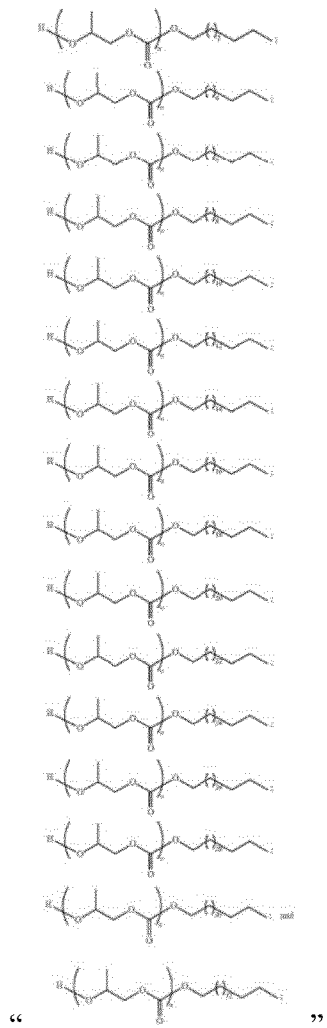"
With:
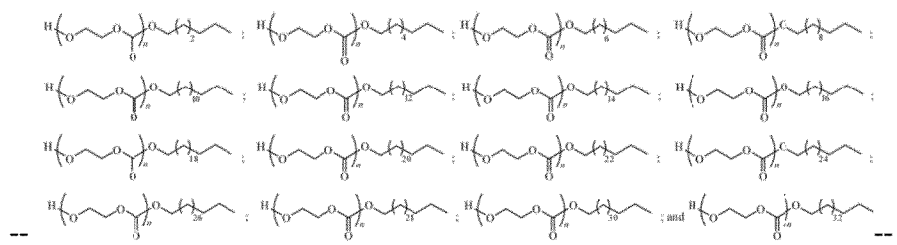
--

CERTIFICATE OF CORRECTION (continued)
U.S. Pat. No. 10,011,758 B2

Column 85, Line 60 through Column 87, Line 14, Claim 14, please replace:

"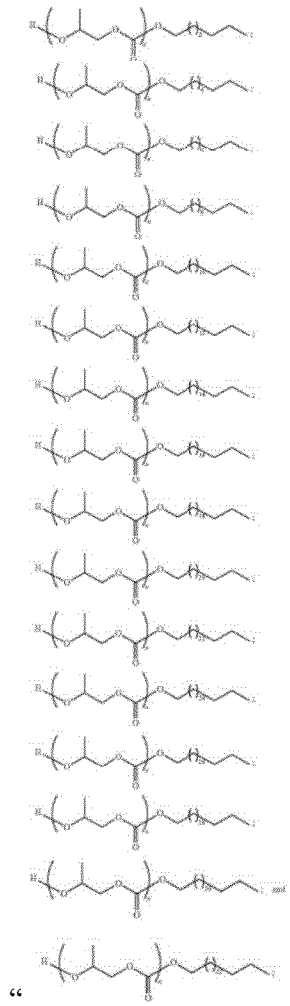"

With:

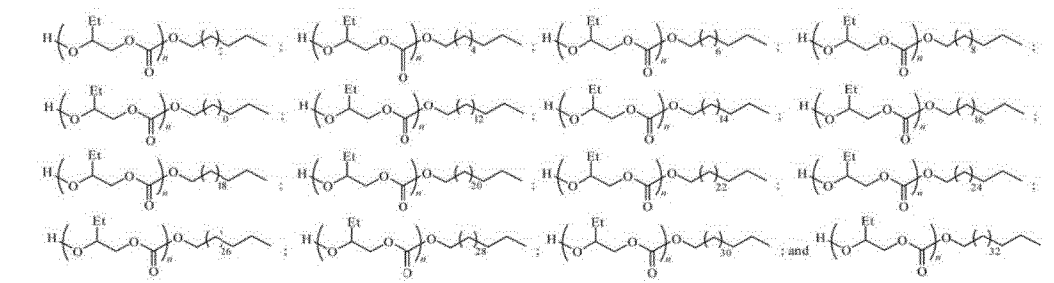

CERTIFICATE OF CORRECTION (continued)
U.S. Pat. No. 10,011,758 B2

Column 87, Lines 16 through 65, Claim 14, please replace:

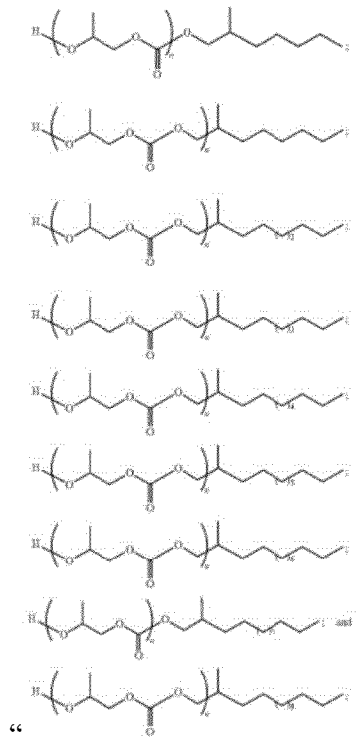

"   "

With:

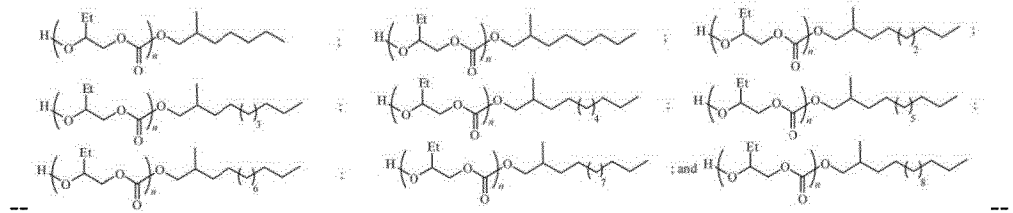

--